(12) United States Patent  (10) Patent No.: US 9,771,997 B2
Tsai  (45) Date of Patent: Sep. 26, 2017

(54) FRICTION-DAMPING ENERGY ABSORBER

(71) Applicant: Chong-Shien Tsai, Taichung (TW)

(72) Inventor: Chong-Shien Tsai, Taichung (TW)

( * ) Notice: Subject to any disclaimer, the term of this patent is extended or adjusted under 35 U.S.C. 154(b) by 4 days.

(21) Appl. No.: 14/845,668

(22) Filed: Sep. 4, 2015

(65) Prior Publication Data

US 2016/0169312 A1 Jun. 16, 2016

(30) Foreign Application Priority Data

Dec. 16, 2014 (TW) .............................. 103143861 A

(51) Int. Cl.
*F16M 5/00* (2006.01)
*F16F 7/08* (2006.01)
*F16F 1/40* (2006.01)

(52) U.S. Cl.
CPC . *F16F 7/08* (2013.01); *F16F 1/40* (2013.01)

(58) Field of Classification Search
CPC ...... F16F 1/40; F16F 7/08; F16F 7/082; F16F 2222/04; E04B 1/98; E04B 1/985
USPC ............ 267/140.3–140.4, 141, 141.1, 141.2, 267/292–294; 248/562, 636, 638; 52/167.4, 167.7, 167.8
See application file for complete search history.

(56) References Cited

U.S. PATENT DOCUMENTS

| 3,866,724 | A |   | 2/1975  | Hollnagel |                      |
|-----------|---|---|---------|-----------|----------------------|
| 4,593,502 | A | * | 6/1986  | Buckle    | E04B 1/98            |
|           |   |   |         |           | 52/167.7             |
| 4,713,917 | A | * | 12/1987 | Buckle    | E01D 19/041          |
|           |   |   |         |           | 248/565              |
| 4,899,323 | A | * | 2/1990  | Fukahori  | E04B 1/36            |
|           |   |   |         |           | 248/560              |

(Continued)

FOREIGN PATENT DOCUMENTS

CN  101484723   7/2009
JP  1998088854  4/1998

(Continued)

OTHER PUBLICATIONS

Proceedings of the ASME 2016 Pressure Vessels and Piping Conference, PVP2016, Jul. 17-21, 2016, Vancouver, British Columbia, Canada. PVP2016-63087, An Investigation of Adaptive Rubber Bearings, C. S. Tsai et al.

*Primary Examiner* — Christopher Schwartz
(74) *Attorney, Agent, or Firm* — patenttm.us

(57) ABSTRACT

A friction-damping energy absorber has two ends, at least one core post, two supporting boards, multiple first material layers, and multiple second material layers. The at least one core post has multiple sliding sheets stacked with each other. The two supporting boards are mounted on the ends of the friction-damping energy absorber. The first material layers and second material layers are alternately mounted between the two supporting boards and surround the at least one core post to enable the first material layers and the second (Continued)

material layers to alternately mount with at least one of the sliding sheets of the at least one core post. The friction-damping energy absorber can be used on buildings, bridges, large objects or equipments to absorb and isolate the three-directional vibration energy of earthquakes and environments, and can prevent the operation temperature from increasing and provide an automatic adjustment function of damping and stiffness.

107 Claims, 124 Drawing Sheets

(56) References Cited

U.S. PATENT DOCUMENTS

| | | | | |
|---|---|---|---|---|
| 5,182,888 | A * | 2/1993 | Miyamoto | F16F 3/093 |
| | | | | 52/167.2 |
| 5,201,155 | A * | 4/1993 | Shimoda | E01D 19/041 |
| | | | | 248/634 |
| 5,233,800 | A * | 8/1993 | Sasaki | E04H 9/022 |
| | | | | 52/167.1 |
| 5,373,670 | A * | 12/1994 | Sasaki | E04H 9/022 |
| | | | | 267/141.1 |
| 5,655,756 | A * | 8/1997 | Robinson | E04H 9/022 |
| | | | | 267/140.2 |
| 5,765,322 | A * | 6/1998 | Kubo | E04H 9/022 |
| | | | | 248/634 |
| 6,385,918 | B1 * | 5/2002 | Robinson | F16F 1/40 |
| | | | | 267/140.2 |
| 7,565,774 | B2 * | 7/2009 | Shizuku | E04H 9/022 |
| | | | | 248/565 |
| 2009/0313917 | A1 | 12/2009 | Takenoshita et al. | |
| 2013/0334749 | A1 * | 12/2013 | Tsai | E04B 1/98 |
| | | | | 267/140.11 |

FOREIGN PATENT DOCUMENTS

| | | |
|---|---|---|
| JP | 1999148246 | 6/1999 |
| JP | 2008121799 | 5/2008 |
| JP | 2010101383 | 5/2010 |
| JP | 2010255782 | 11/2010 |
| JP | 2014001845 | 1/2014 |
| JP | 2014059021 | 4/2014 |
| NZ | 201015 | 9/1986 |
| NZ | 212288 | 5/1989 |
| NZ | 227706 | 8/1992 |
| NZ | 245378 | 12/1992 |
| NZ | 240109 | 4/1993 |
| NZ | 502460 | 1/1999 |
| NZ | 605992 | 9/2013 |
| TW | 200918721 | 5/2009 |
| TW | 201007026 | 2/2010 |
| TW | 201333309 | 8/2013 |
| TW | M476158 | 4/2014 |
| WO | 2014/033986 | 3/2014 |
| WO | 2014/192289 | 12/2014 |

* cited by examiner

FRICTION-DAMPING ENERGY ABSORBER

BACKGROUND OF THE INVENTION

1. Field of the Invention

The present invention relates to an energy absorber, and more particularly to a friction-damping energy absorber that is used on buildings, bridges, other large objects, facilities or equipments to absorb and isolate the vibration energy of the earthquake and the environment, and can prevent the operation temperature from increasing and can provide an automatic adjustment function and adaptive characteristics of damping and stiffness to separately achieve optimum functions for multiple performance objects at multiple levels of vibrations.

2. Description of Related Art

Conventional energy absorbers are commonly mounted on large objects, such as buildings, bridges or machines to provide shock-absorbing and shock-suppressing effects to the objects and to absorb the energy and shocks generated during earthquakes. U.S. Pat. No. 5,655,756 (hereinafter referred to as a referenced case) discloses a conventional energy absorber (Lead Rubber Bearing, LRB) comprises a core post, two supporting boards, multiple metal layers, and multiple rubber layers. The supporting boards are mounted respectively on two ends of the core post, and are securely connected to the ground and a large object respectively. The metal layers and the rubber layers are alternately mounted between the supporting boards. When an earthquake occurs, a shock-absorbing effect can be provided by the deformations of the metal and the rubber layers to reduce the damage that is raised by the earthquake.

However, the core post of the conventional energy absorber of the referenced case is made of lead. The lead core post may be deformed during the earthquake to absorb the vibration energy of the earthquake, and the deformation of the lead core post will generate heat. Therefore, the temperature of the lead core post of the referenced case will rise to about 350° C. which exceeds the melting point of lead by the repeated deformation during the earthquake, about 327° C., and the high temperature easily causes the melting of the lead core post, and lead is a toxic heavy metal that will impact the environment. Furthermore, the rubber layers and the lead core post of the conventional energy absorber are easily damaged in the overheating event. In addition, the high temperature also easily decreases the structural strength of the energy absorber, such that the shock-absorbing effect of the conventional energy absorber is also reduced. In addition, even if the temperature does not reach the melting point of lead, the materials (including lead and rubber) are also softened by the temperature, and this will reduce the structural strength and the shock-suppressing and shock-absorbing effects of the conventional energy absorber.

In view of the above-mentioned problems and shortcomings of the conventional energy absorber, the energy absorber that is made of lead has gradually been banned or renounced from use, it is that the world has tried thinking about other shock-absorbing materials or energy absorption mechanism by which it needs to solve the energy absorption, the environmental protection, and other issues. One of the solutions is to remove the lead core post, but the shock-absorbing effect is inadequate and this will cause the energy absorber to have too large displacement. If the conventional energy absorber is used with other dampers such as a hydraulic damper, the cost is expensive. In addition, it isn't only cost-effective, but also requires a large space to accommodate the conventional energy and the other dampers, and this will cause problems of use and needs to be improved.

To overcome the shortcomings, the present invention tends to provide a friction-damping energy absorber to mitigate or obviate the aforementioned problems.

SUMMARY OF THE INVENTION

The main objective of the invention is to provide a friction-damping energy absorber having a capability of preventing the operation temperature of the friction-damping energy absorber from increasing and of providing an automatic adjustment function and adaptive characteristics of damping and stiffness to separately achieve optimum functions for multiple performance objects at multiple levels of vibrations.

The friction-damping energy absorber in accordance with the present invention has two ends, at least one core post, two supporting boards, multiple first material layers, and multiple second material layers. The at least one core post has multiple sliding sheets stacked with each other. The two supporting boards are mounted on the two ends of the friction-damping energy absorber. The first material layers and second material layers are alternately mounted between the two supporting boards and surround the at least one core post to enable the first material layers and the second material layers to alternately mount with at least one of the sliding sheets of the at least one core post. The friction-damping energy absorber can be used on buildings, bridges, large objects, facilities or equipments to absorb and isolate the three-directional vibration energy of the earthquake and environment, and can prevent the operation temperature from increasing and provide an automatic adjustment function and adaptive characteristics of damping and stiffness to achieve separate optimum functions for multiple performance objects at multiple levels of vibrations.

Other objects, advantages and novel features of the invention will become more apparent from the following detailed description when taken in conjunction with the accompanying drawings.

BRIEF DESCRIPTION OF THE DRAWINGS

FIG. 120 is a cross sectional top view of a one hundred and eighth embodiment of a friction-damping energy absorber in accordance with the present invention;

FIG. 121 is a cross sectional top view of a one hundred and ninth embodiment of a friction-damping energy absorber in accordance with the present invention;

FIG. 122 is a perspective and sectional view of a one hundred and tenth embodiment of a friction-damping energy absorber in accordance with the present invention;

FIG. 123 is a perspective and sectional view of a one hundred and eleventh embodiment of a friction-damping energy absorber in accordance with the present invention; and FIG. 124 is a cross sectional side view of a one hundred and twelfth embodiment of a friction-damping energy absorber in accordance with the present invention.

DETAILED DESCRIPTION OF PREFERRED EMBODIMENT

Figure 1:
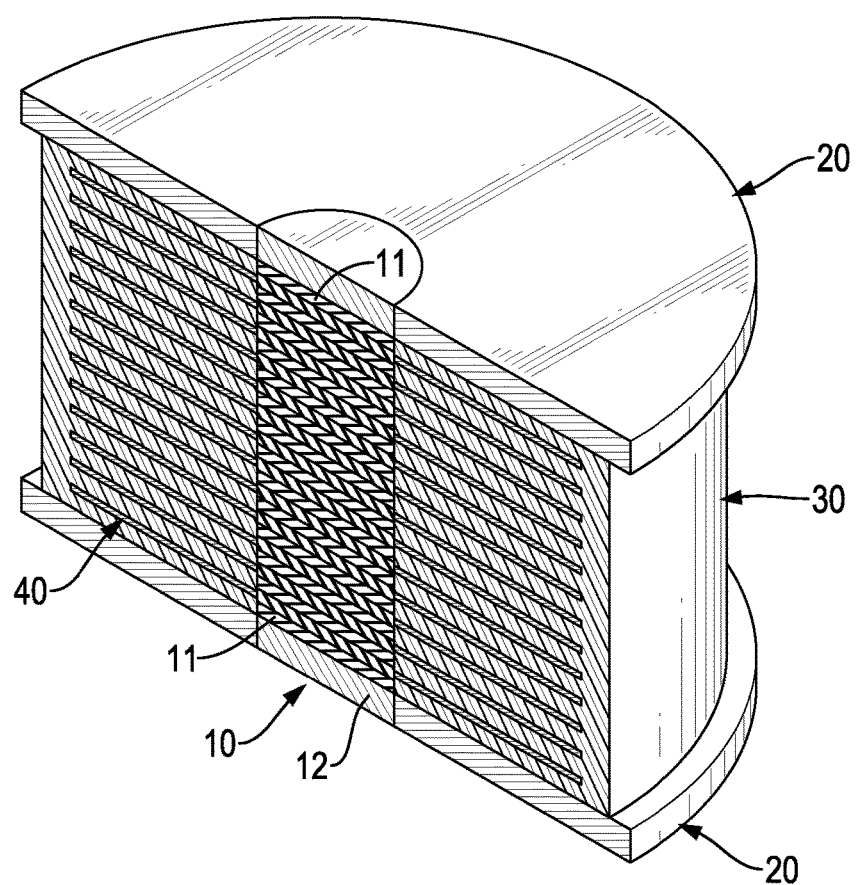
FIG. 1 is a perspective and sectional view of a first embodiment of a friction-damping energy absorber in accordance with the present invention.
Figure 2:
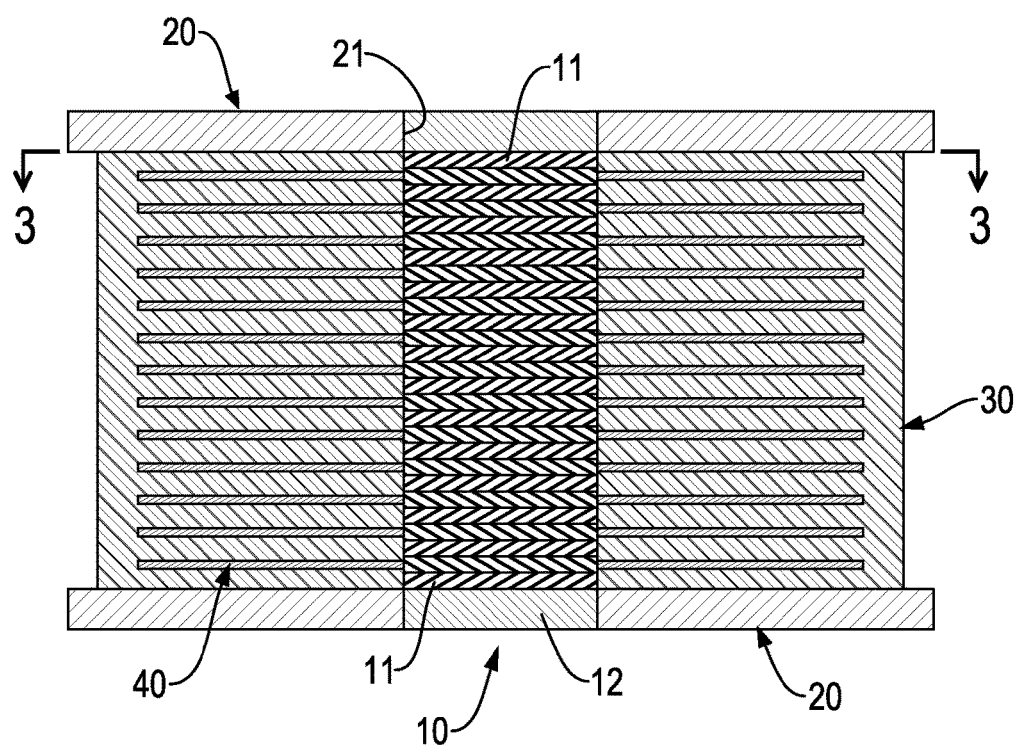
FIG. 2 is a cross sectional side view of the friction-damping energy absorber in FIG. 1.
Figure 3:
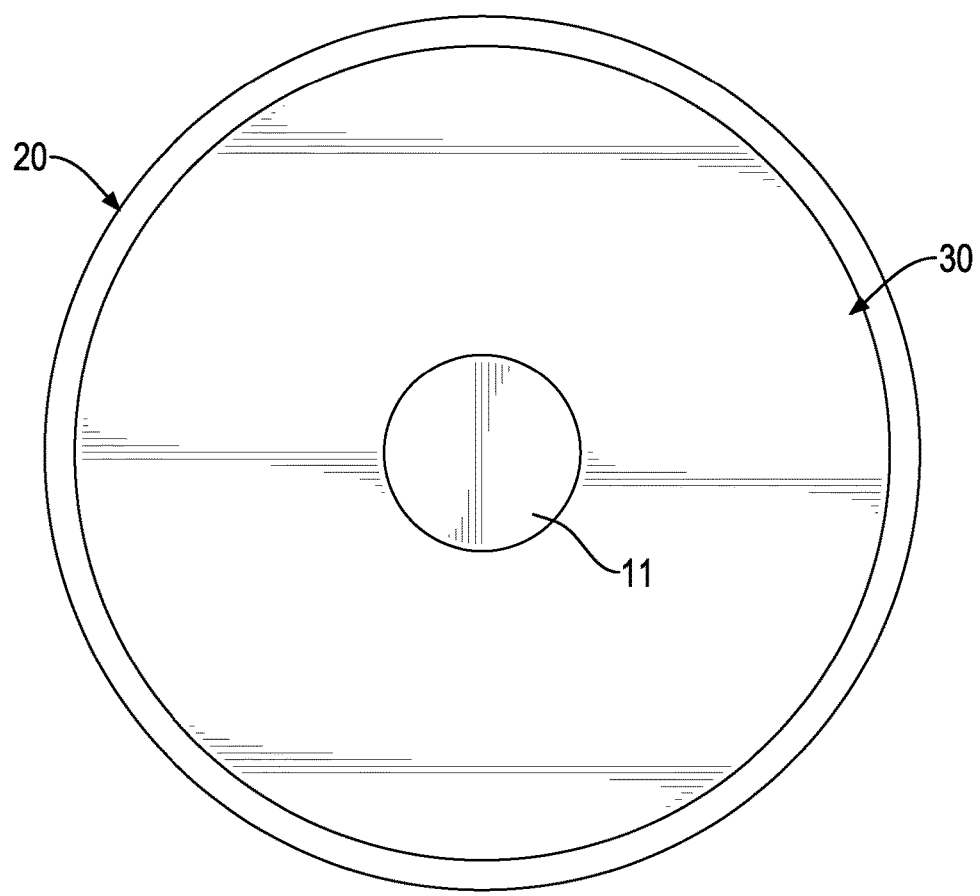
FIG. 3 is a cross sectional top view of the friction-damping energy absorber along line 3-3 in FIG. 2.

With reference to FIGS. 1 to 3, a first embodiment of a friction-damping energy absorber in accordance with the present invention is used on buildings, bridges, other large objects, facilities or equipments, and the friction-damping energy absorber comprises two ends, a core post 10, two supporting boards 20, multiple first material layers 30, and multiple second material layers 40.

The core post 10 has a cross section, two ends, multiple sliding sheets 11, and two end covers 12. The cross section of the core post 10 may be round, square or in other geometric shapes. The sliding sheets 11 are arranged in a stacked manner to form the core post 10, and any one of the sliding sheets 11 is made of the same or different hard materials such as iron, aluminum, copper or other metals, or is made of soft materials such as rubber, Polyoxymethylene (POM), Polyether Ether Ketone (PEEK), and Polymeric Materials. Preferably, the sliding sheets 11 are made of hard and soft materials and arranged alternately. Each one of the sliding sheets 11 has a thickness being the same or different. In the first embodiment of the friction-damping energy absorber, the thicknesses of the sliding sheets are the same. In addition, each one of the sliding sheets 11 is made of material with a high friction coefficient, or each one of the sliding sheets 11 is coated with a sliding-assistant layer such as Teflon on a top face, a bottom face or an external surface of each one of the sliding sheets 11. Furthermore, the end covers 12 are mounted on the two ends of the core post 10 to hold the sliding sheets 11 between the two end covers 12. Preferably, the stacked sliding sheets 11 of the core post 10 can form a vertical stiffness to share a vertical load of the friction-damping energy absorber to adjust the damping and friction of each one of the sliding sheets 11.

The two supporting boards 20 are connected to the two ends of the friction-damping energy absorber, are parallel with each other at an interval, and each one of the supporting boards 20 may be round, square or in any possible shapes. The two supporting boards 20 are respectively connected to the ground and a large object, such as a building, a bridge or a machine. Each one of the supporting boards 20 has a center and a receiving hole 21. The receiving hole 21 is formed through the center of the supporting board 20 and corresponding to and receiving one of the ends of the core post 10 or the corresponding end cover 12 inside.

The first material layers 30 and second material layers 40 are alternately mounted between the supporting boards 20 and surround the core post 10, and are alternately adjacent to the sliding sheets 11 of the core post 10. Each one of the first material layers 30 and the second material layers 40 has a shape corresponding to that of the supporting boards 20 and may be round, square and any possible shape. Alternatively, each one of the first material layers 30 and the second material layers 40 has a shape different from that of the supporting boards 20. For example, each one of the supporting boards 12 may be square, and each one of the first material layers 30 and the second material layers 40 may be round. The first material layers 30 and the second material layers 40 are made of flexible materials that are different from each other. Preferably, the first material layers 30 may be made of rubber, metal or composite materials. The second material layers 40 may be made of metal, rubber or composite materials.

In addition, the amount and the thicknesses of the sliding sheets 11 of the core post 10 are the same as or different from the amount and the thicknesses of the material layers 30, 40. In the first embodiment of the friction-damping energy absorber, the thickness of each one of the sliding sheets 11 of the core post 10 is between the thicknesses of the material layers 30, 40.

Furthermore, the end covers 12 may be made of deformable materials that are softer than the materials of the two supporting boards 20. Additionally, a height of the core post 10 is slightly lower than a total height of the material layers 30, 40, and this can reduce the deformation differences in a vertical direction between the core post 10 and the material layers 30, 40 to enable each one of the sliding sheets 11 to slide smoothly in a horizontal direction.

With such a friction-damping energy absorber in accordance with the present invention, the two supporting boards 20 are respectively connected to the ground or a floor and an object, the earthquake shock and energy can be efficiently absorbed and suppressed by the relative slide and friction between the sliding sheets 11 of the core post 10 and the deformation of the first and second material layers 30, 40, and the three-directional earthquake shock and energy can be kept from being transmitted to the object directly. Thus, an excellent shock-absorbing effect is provided to the object such as the buildings, bridges, facilities, or equipments to prevent the object from being damaged by earthquakes.

Furthermore, the core post 10 that is formed by the stacked and non-lead sliding sheets 11 can prevent the temperature rise induced by the heat that is generated by the repeated deformation from impairing the function of the core post 10 or even melting the core post 10 to form a significant impact and pollution to the environment. In addition, the friction-damping energy absorber in accordance with the present invention can provide a sufficient damping effect to the object without connecting with other dampers such as a hydraulic damper in use. Then, the cost of using the friction-damping energy absorber can be greatly reduced, and this is cost-effective, and it does not require additional space to install other dampers and this is convenient in use.

Additionally, a vertical load distribution of the friction-damping energy absorber can be adjusted according to a ratio between a vertical stiffness of the sliding sheets 11 and a vertical stiffness of the material layers 30, 40, and this can adjust the friction force and the damping force of the sliding sheets 11. Then, the sliding sheets 11 can slide relative to each other with different frictional forces and different time due to different coefficients of friction and the changes of sustained vertical loads of the sliding sheets 11 to achieve an automatic adjusting function and adaptive characteristics for the damping and stiffness of the friction-damping energy absorber, and this can achieve separate optimum functions for multiple performance objects at multiple levels of vibrations and enhance the damping effect of the friction-damping energy absorber.

Figure 4:
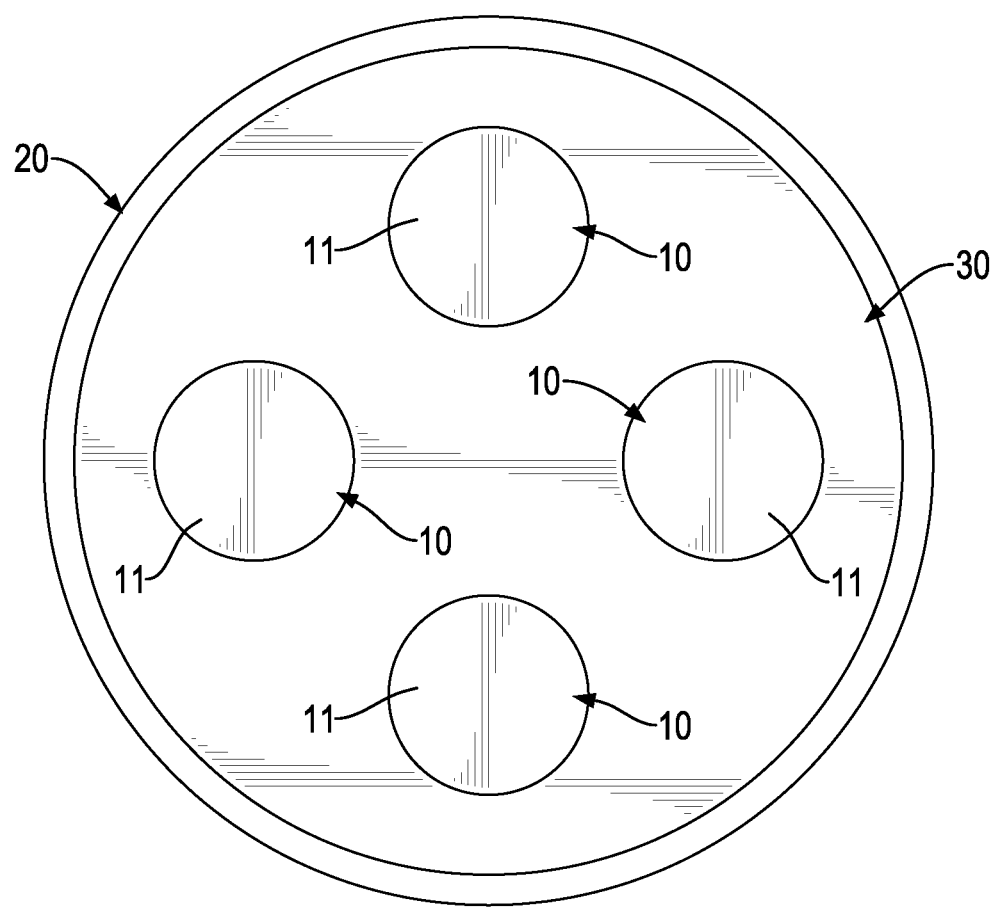
FIG. 4 is a cross sectional top view of a second embodiment of a friction-damping energy absorber in accordance with the present invention.

With reference to FIG. 4, a second embodiment of a friction-damping energy absorber in accordance with the present invention is substantially the same as the first embodiment as shown in FIGS. 1 to 3 except for the following features. The friction-damping energy absorber has multiple core posts 10, and the core posts 10 are implemented and are arranged at even intervals relative to a center of the friction-damping energy absorber. The sliding sheets 11 of the core posts 10 can provide a friction-damping effect to the friction-damping energy absorber.

Figure 5:
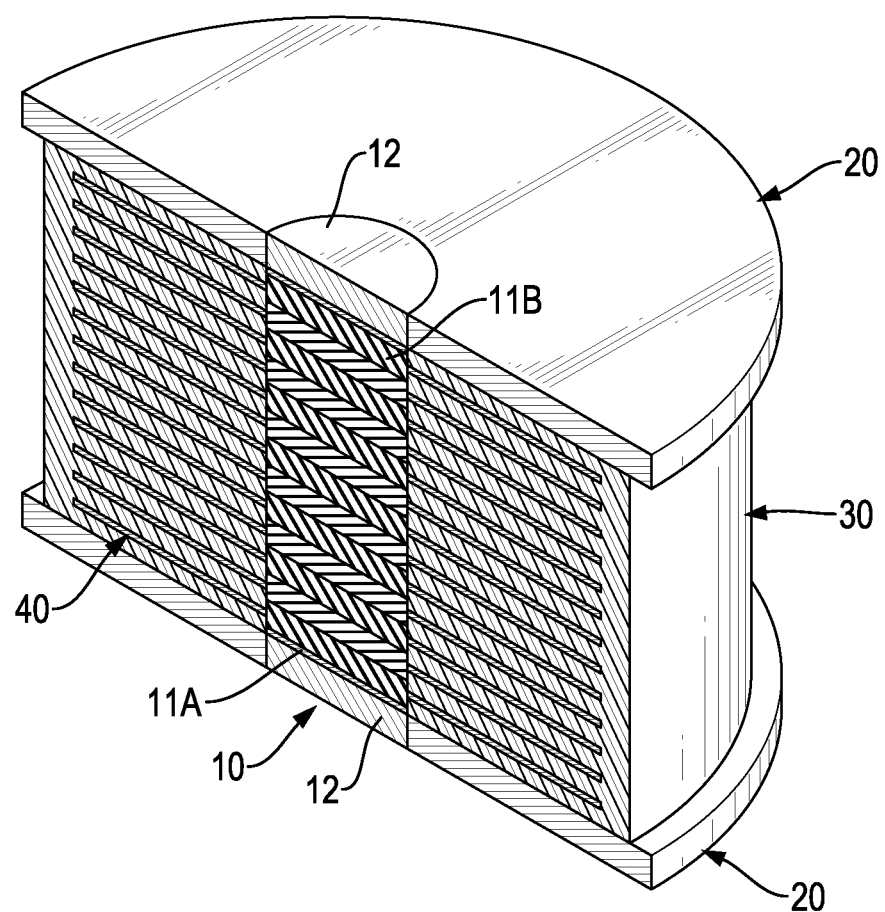
FIG. 5 is a perspective and sectional view of a third embodiment of a friction-damping energy absorber in accordance with the present invention.
Figure 6:
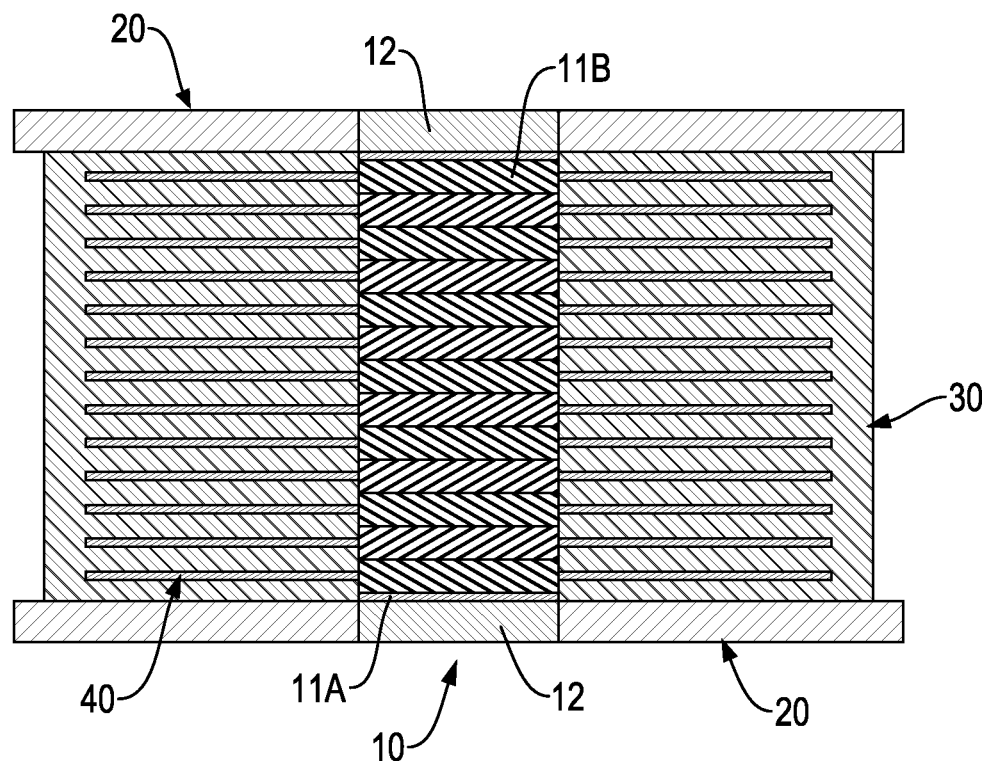
FIG. 6 is a cross sectional side view of the friction-damping energy absorber in FIG. 5.

With reference to FIGS. 5 and 6, a third embodiment of a friction-damping energy absorber in accordance with the present invention is substantially the same as the first embodiment as shown in FIGS. 1 to 3 except for the following features. The thicknesses of two of the sliding sheets 11A that respectively abut the two end covers 12 are thinner than the thicknesses of the other sliding sheets 11B of the core post 10. In addition, the thickness of each one of the sliding sheets 11B not including the two sliding sheets 11A is thicker than the thicknesses of the material layers 30, 40. Furthermore, the two sliding sheets 11A are made of a deformable material softer than a deformable material of the sliding sheets 11B, or are made of a deformable material as a material of the end covers 12 and are softer than materials of the supporting boards 20. Then, the deformation difference in the vertical direction that is formed by a horizontal movement between the core post 10 and the material layers 30, 40 can be reduced, and this can enable the sliding sheets 11B to move smoothly.

Figure 7:
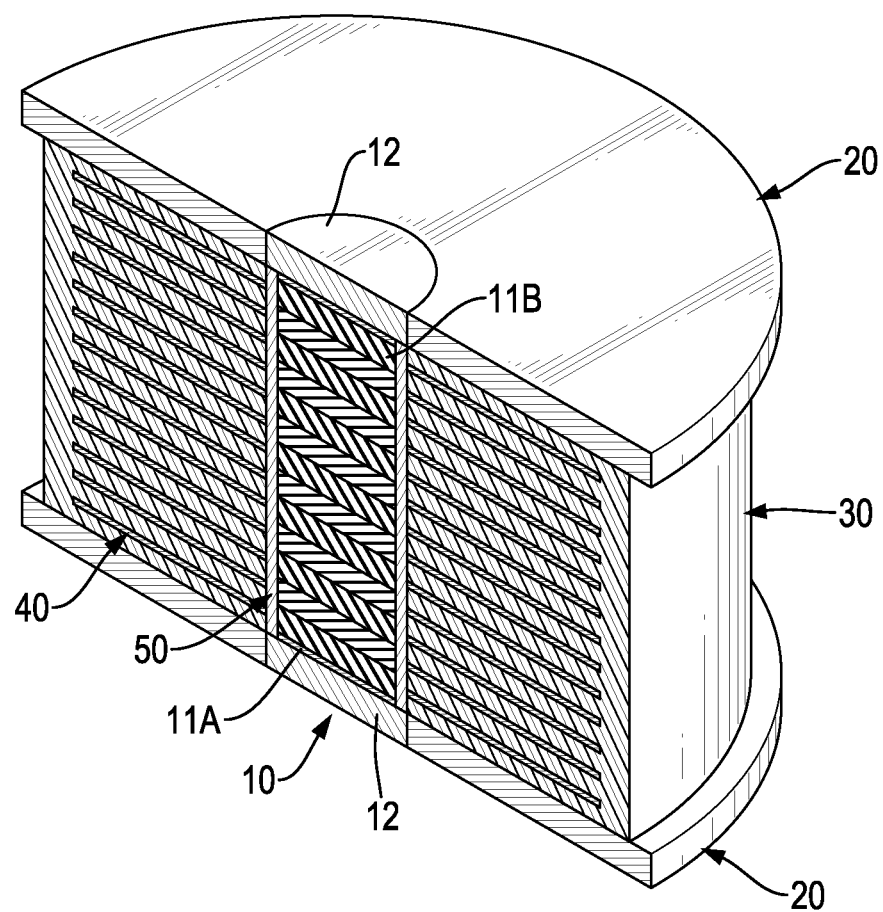
FIG. 7 is a perspective and sectional view of a fourth embodiment of a friction-damping energy absorber in accordance with the present invention.
Figure 8:
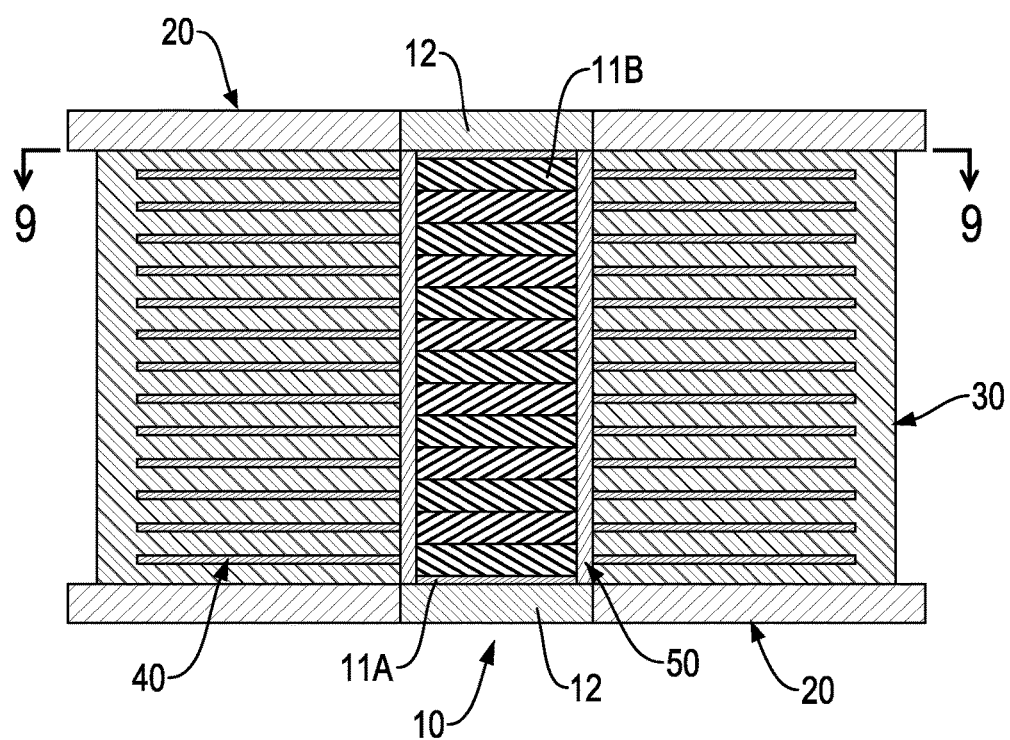
FIG. 8 is a cross sectional side view of the friction-damping energy absorber in FIG. 7.
Figure 9:
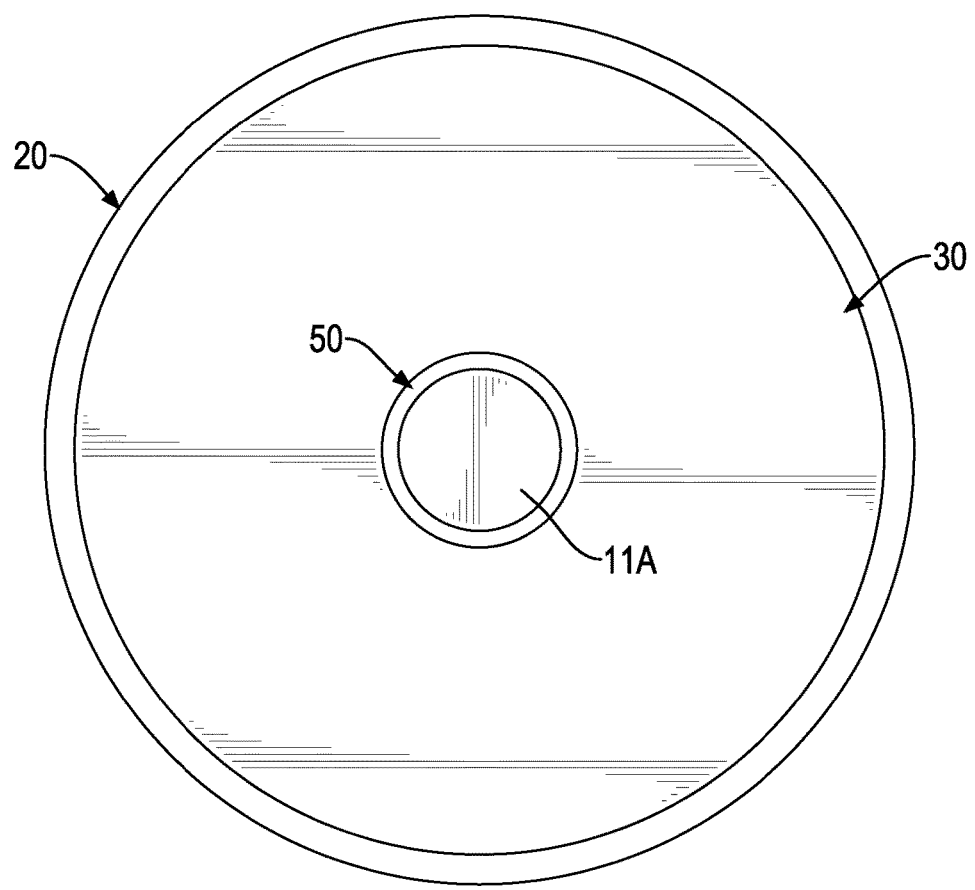
FIG. 9 is a cross sectional top view of the friction-damping energy absorber along line 9-9 in FIG. 8.

With reference to FIGS. 7 to 9, a fourth embodiment of a friction-damping energy absorber in accordance with the present invention is substantially the same as the third embodiment as shown in FIGS. 5 and 6 except for the following features. The friction-damping energy absorber has a restricting module 50 mounted around the sliding sheets 11A, 11B between the core post 10, the material layers 30, 40, and the two end covers 12. The restricting module 50 is made of a deformable material to provide a restricting effect and a deforming space to the sliding sheets 11A, 11B of the core post 10. Preferably, the restricting module 50 is made of a deformable soft material, or is a hollow cylinder or is a helical spring.

Figure 10:
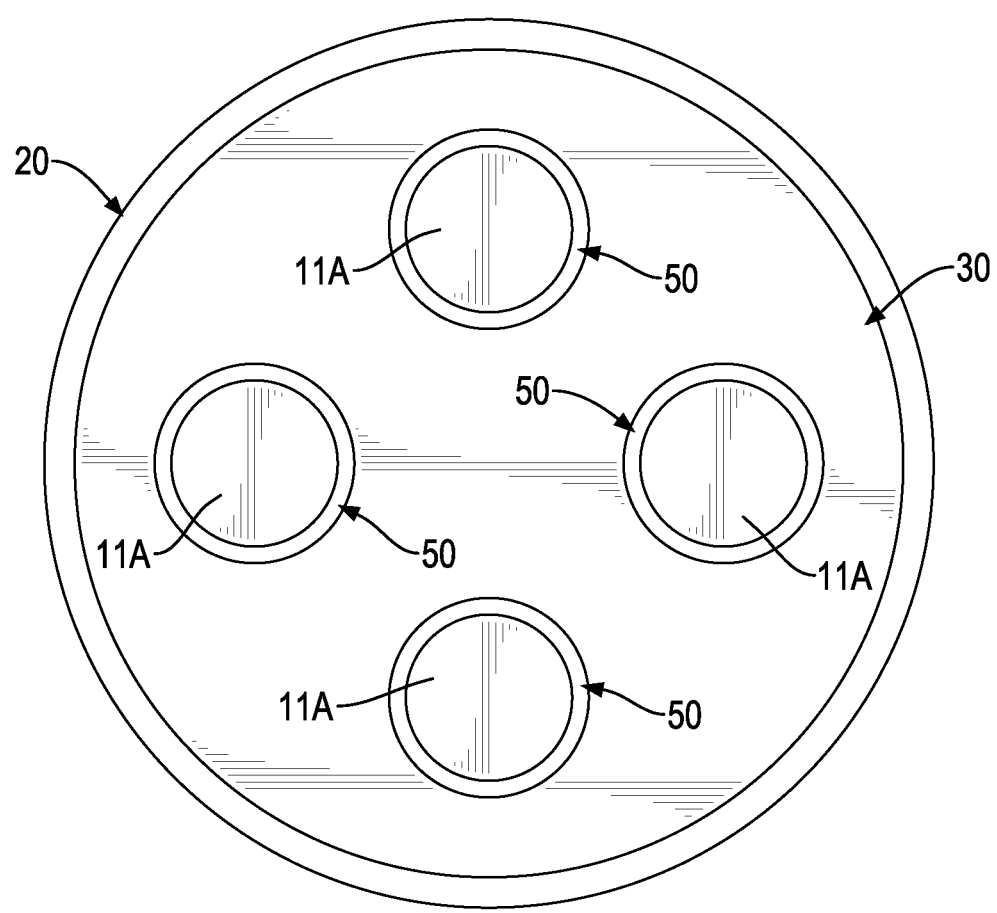
FIG. 10 is a cross sectional top view of a fifth embodiment of a friction-damping energy absorber in accordance with the present invention.

With reference to FIG. 10, a fifth embodiment of a friction-damping energy absorber in accordance with the present invention is substantially the same as the fourth embodiment as shown in FIGS. 7 to 9 except for the following features. The friction-damping energy absorber has multiple core posts 10, and the core posts 10 are implemented and are arranged at even intervals relative to a center of the friction-damping energy absorber. The sliding sheets 11A, 11B of the core posts 10 can provide a friction-damping effect to the friction-damping energy absorber.

Figure 11:
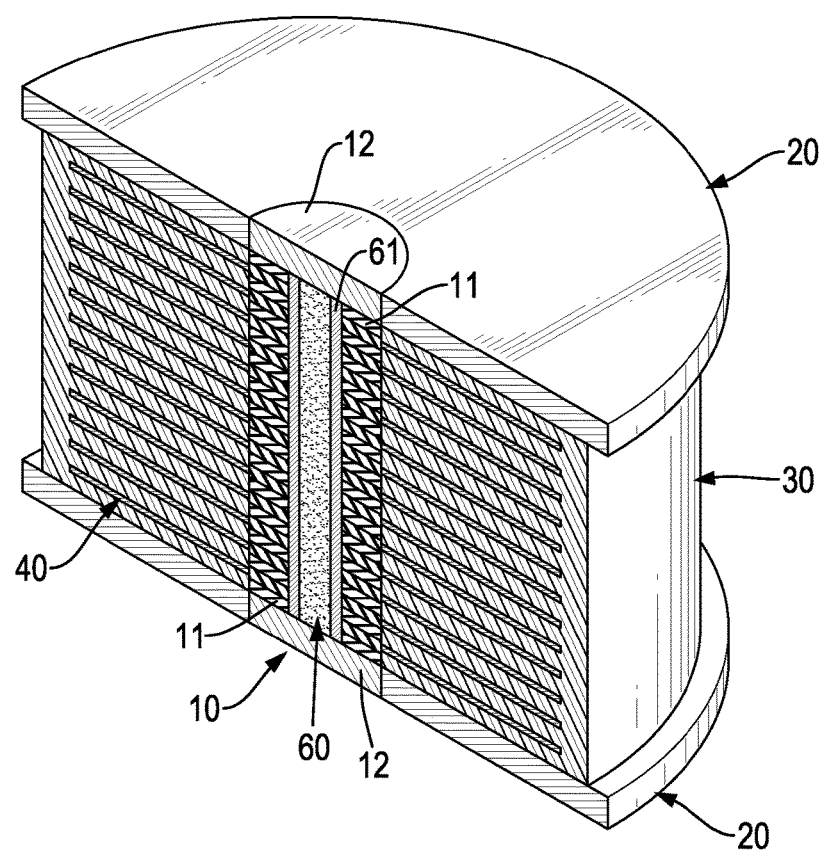
FIG. 11 is a perspective and sectional view of a sixth embodiment of a friction-damping energy absorber in accordance with the present invention.
Figure 12:
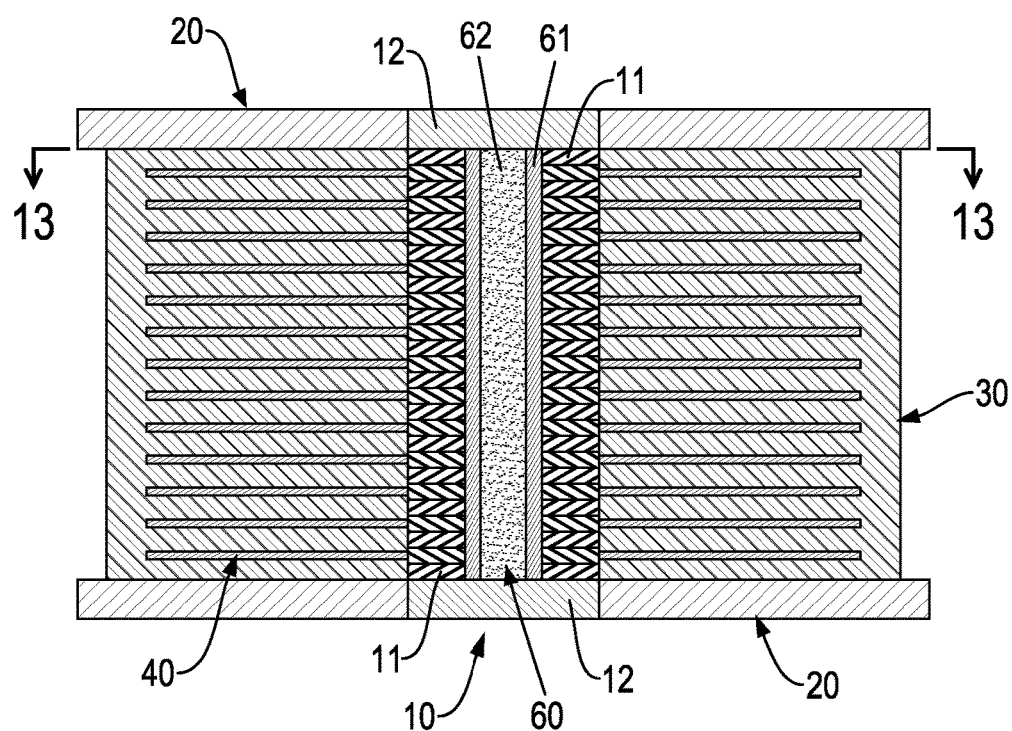
FIG. 12 is a cross sectional side view of the friction-damping energy absorber in FIG. 11.
Figure 13:
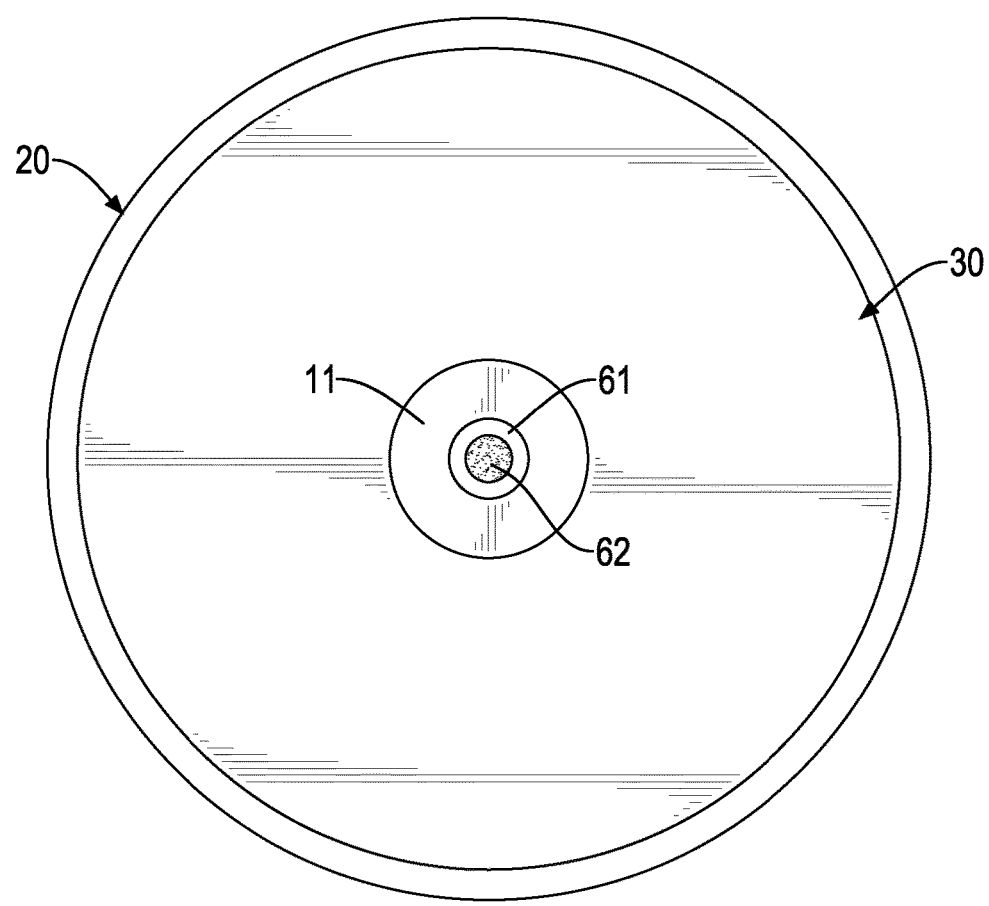
FIG. 13 is a cross sectional top view of the friction-damping energy absorber along line 13-13 in FIG. 12.

With reference to FIGS. 11 to 13, a sixth embodiment of a friction-damping energy absorber in accordance with the present invention is substantially the same as the first embodiment as shown in FIGS. 1 to 3 except for the following features. The friction-damping energy absorber has a cooling module 60 mounted in the core post 10 between the two end covers 12. The cooling module 60 has a sealed pipe 61 and a cooling agent 62. The sealed pipe 61 is a hollow tube, is mounted through the sliding sheets 11 of the core post 10, and has two ends. The two ends of the sealed pipe 61 are respectively closed by the two end covers 12. The cooling agent 62 is filled in the sealed pipe 61. Preferably, the cooling agent 62 may be a gas, liquid or solid coolant. The cooling module 60 in the core post 10 can reduce the temperature of the friction-damping energy absorber to prevent the temperature rise induced by the heat that is generated by the repeated deformation from impairing the function of the core post 10 and the material layers 30, 40 or even melting the core post 10, and this can maintain the structural strength of the friction-damping energy absorber to enhance the shock-absorbing effect of the friction-damping energy absorber.

Figure 14:
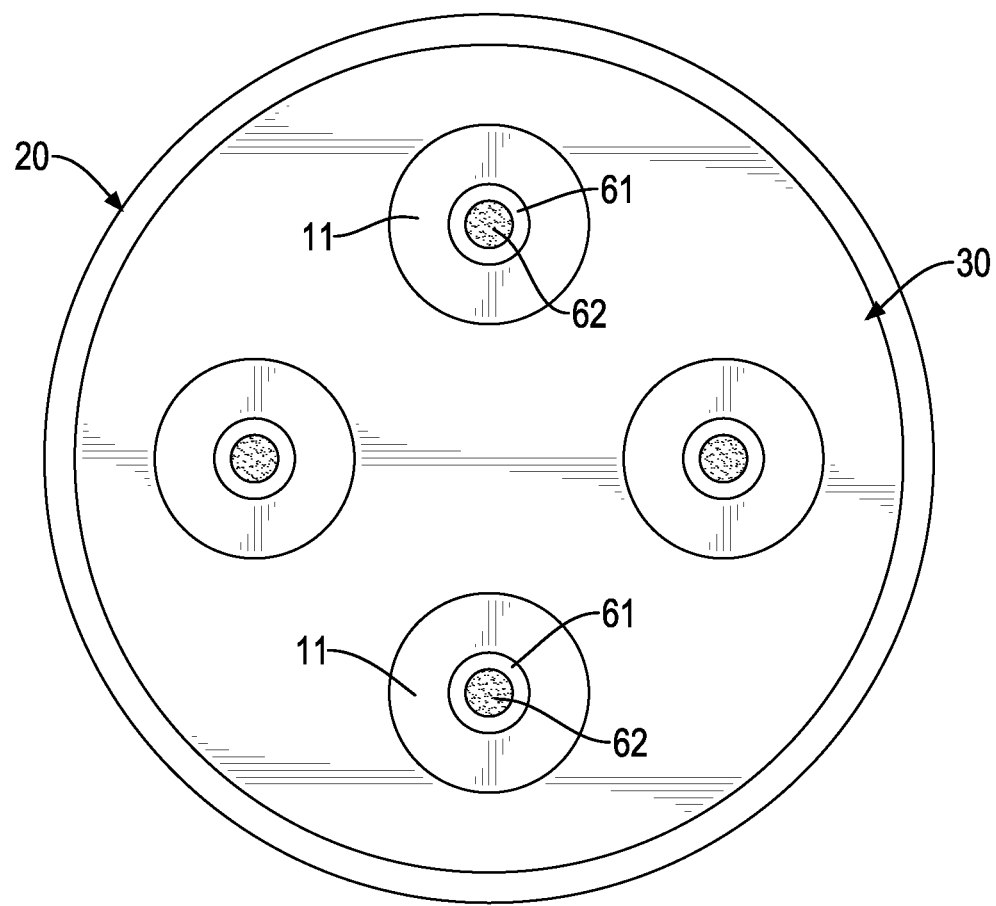
FIG. 14 is a cross sectional top view of a seventh embodiment of a friction-damping energy absorber in accordance with the present invention.

With reference to FIG. 14, a seventh embodiment of a friction-damping energy absorber in accordance with the present invention is substantially the same as the sixth embodiment as shown in FIGS. 11 to 13 except for the following features. The friction-damping energy absorber has multiple core posts 10, and the core posts 10 are implemented and are arranged at even intervals relative to a center of the friction-damping energy absorber. The sliding sheets 11 of the core posts 10 can provide a friction-damping effect to the friction-damping energy absorber.

Figure 15:
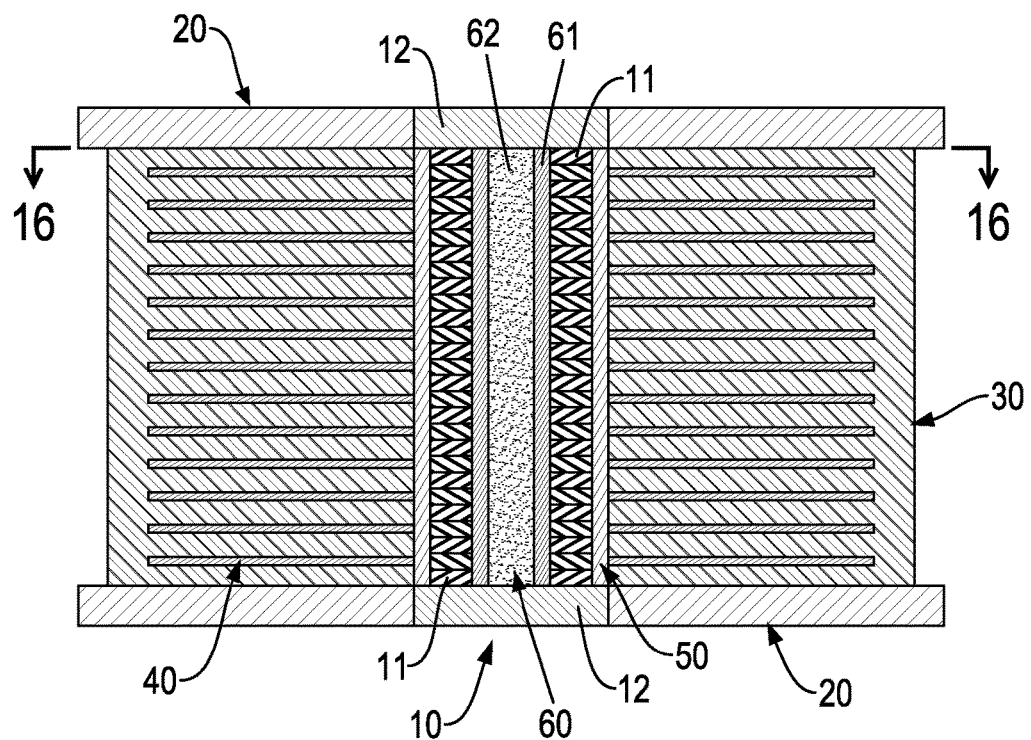
FIG. 15 is a cross sectional side view of an eighth embodiment of a friction-damping energy absorber in accordance with the present invention.
Figure 16:
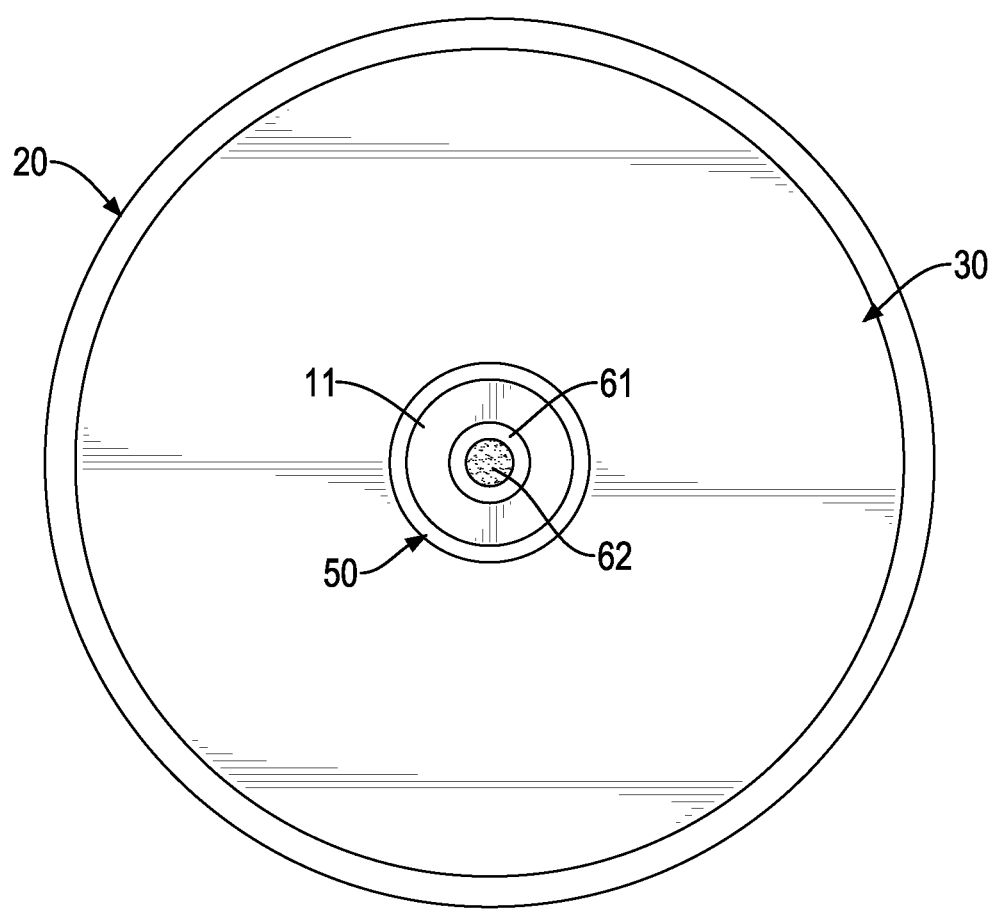
FIG. 16 is a cross sectional top view of the friction-damping energy absorber along line 16-16 in FIG. 15.

With reference to FIGS. 15 and 16, an eighth embodiment of a friction-damping energy absorber in accordance with the present invention is substantially the same as the fourth embodiment as shown in FIGS. 7 and 8 and the sixth embodiment as shown in FIGS. 11 to 13 except for the following features. The friction-damping energy absorber has a restricting module 50 and a cooling module 60 mounted between the material layers 30, 40, the core post 10, and the two end covers 12. The restricting module 50 is made of a deformable material to provide a restricting effect and a deforming space to the sliding sheets 11 of the core post 10. The cooling module 60 in the core post 10 can reduce the temperature of the friction-damping energy absorber to prevent the temperature rise induced by the heat that is generated by the repeated deformation from impairing the function of the core post 10 and the material layers 30, 40 or even melting the core post 10.

Figure 17:
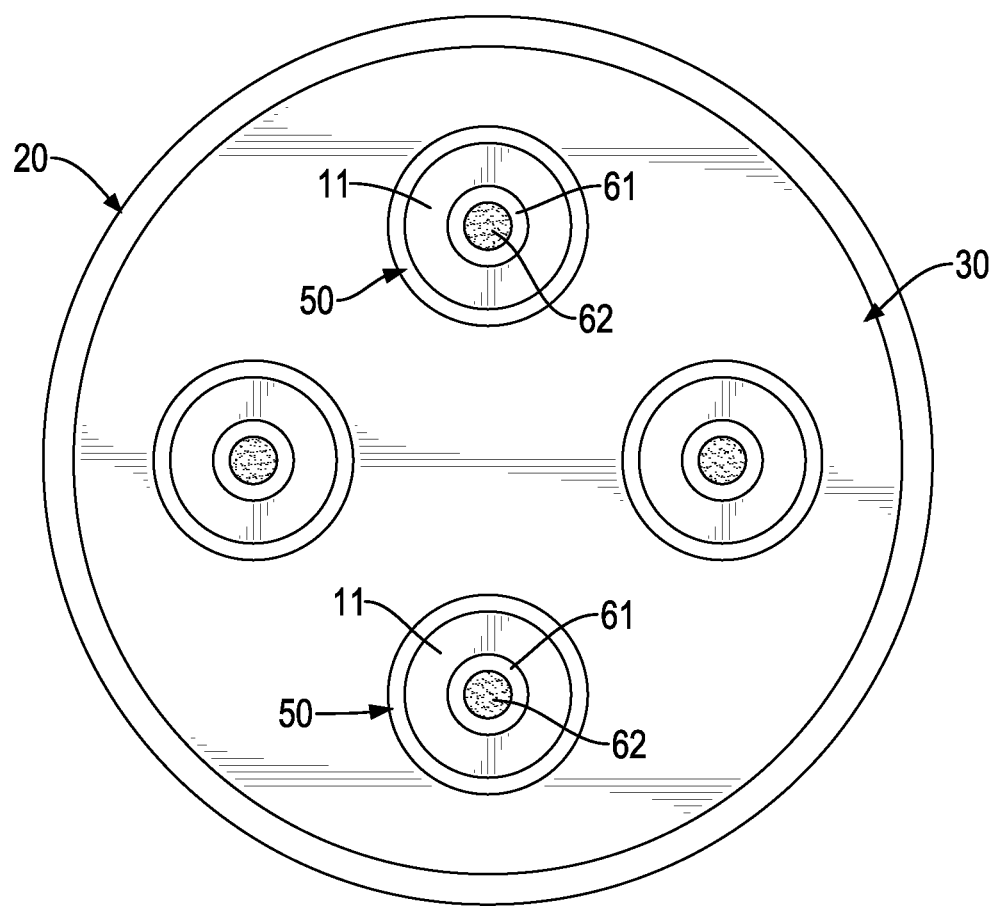
FIG. 17 is a cross sectional top view of a ninth embodiment of a friction-damping energy absorber in accordance with the present invention.

With reference to FIG. 17, a ninth embodiment of a friction-damping energy absorber in accordance with the present invention is substantially the same as the eighth embodiment as shown in FIGS. 15 and 16 except for the following features. The friction-damping energy absorber has multiple core posts 10, and the core posts 10 are implemented and are arranged at even intervals relative to a center of the friction-damping energy absorber. The sliding sheets 11 of the core posts 10 can provide a friction-damping effect to the friction-damping energy absorber.

Figure 18:
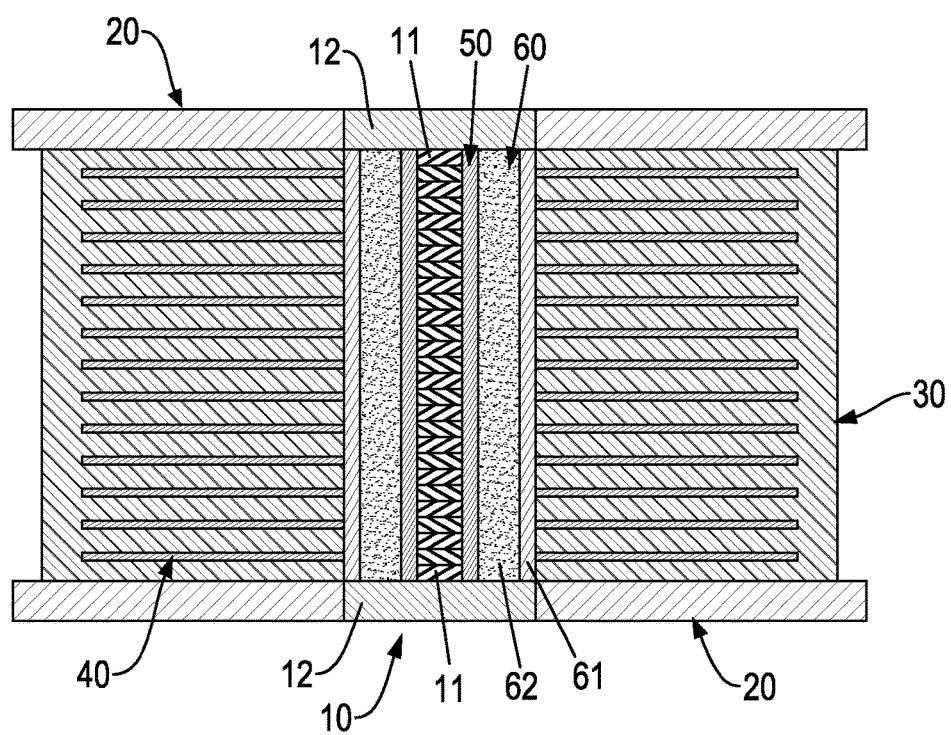
FIG. 18 is a cross sectional side view of a tenth embodiment of a friction-damping energy absorber in accordance with the present invention.
Figure 19:
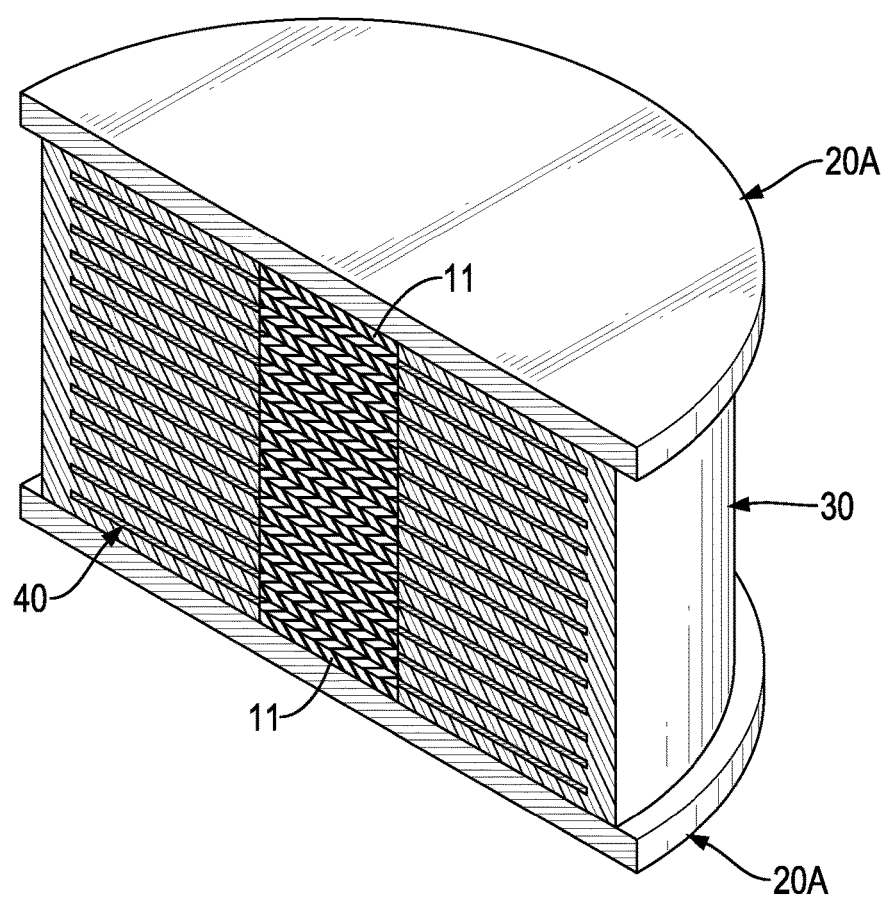
FIG. 19 is a perspective and sectional view of an eleventh embodiment of a friction-damping energy absorber in accordance with the present invention.
Figure 20:
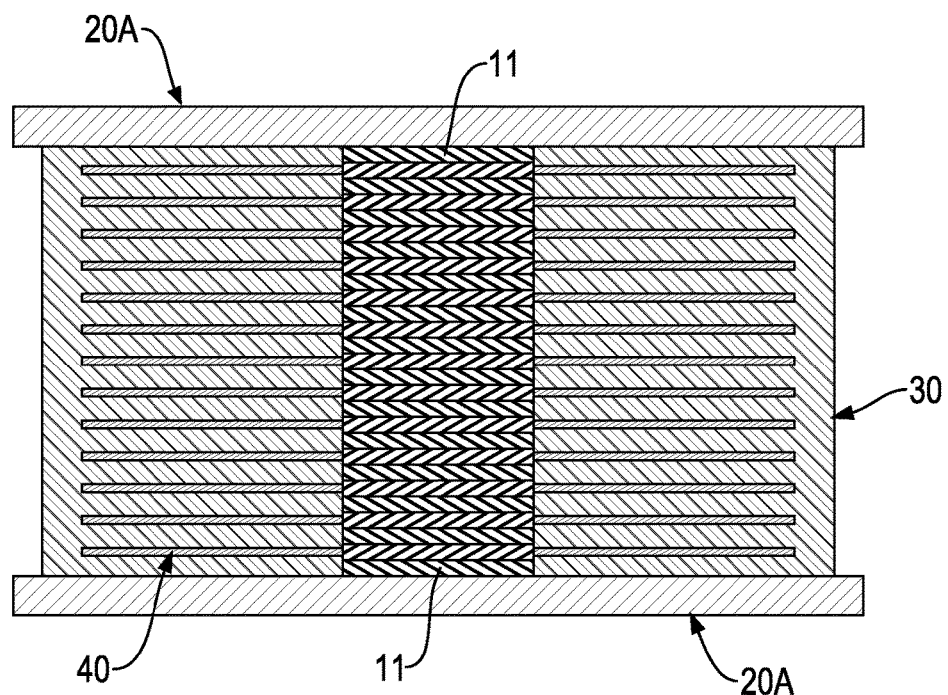
FIG. 20 is a cross sectional side view of the friction-damping energy absorber in FIG. 19.
Figure 21:
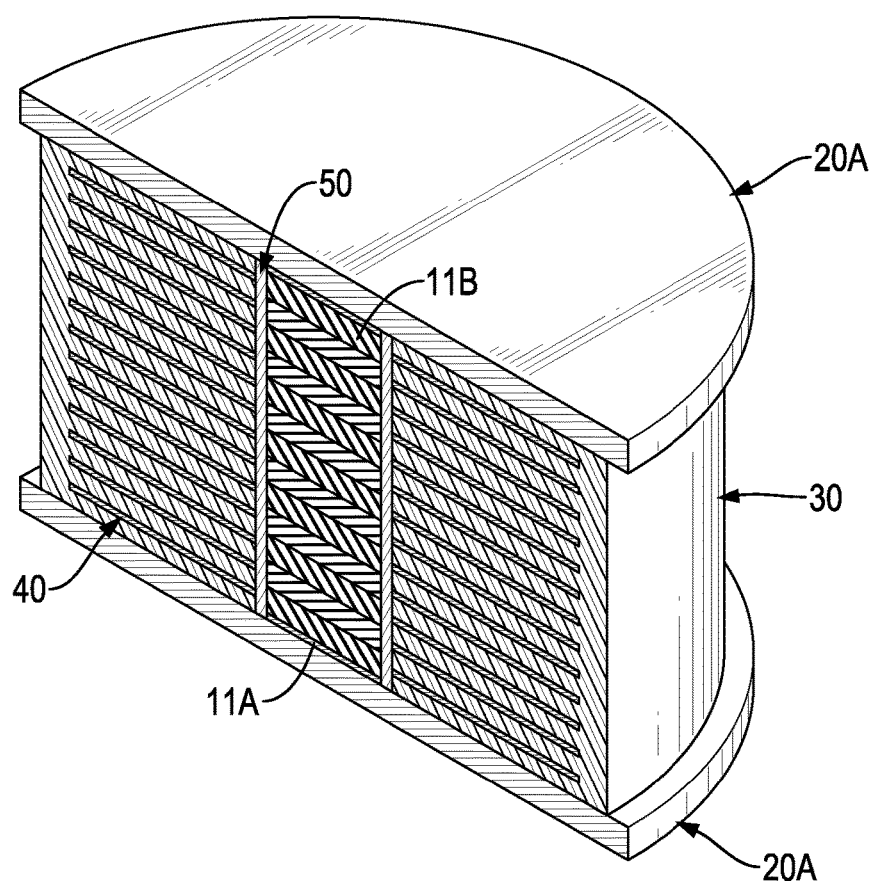
FIG. 21 is a perspective and sectional view of a twelfth embodiment of a friction-damping energy absorber in accordance with the present invention.
Figure 22:
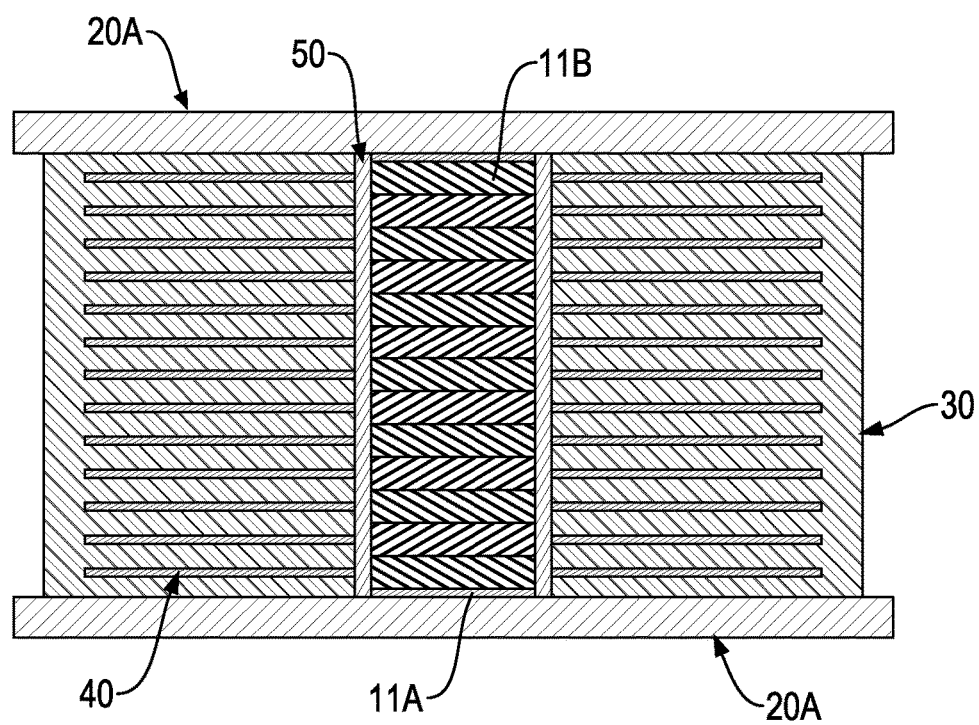
FIG. 22 is a cross sectional side view of the friction-damping energy absorber in FIG. 21.
Figure 23:
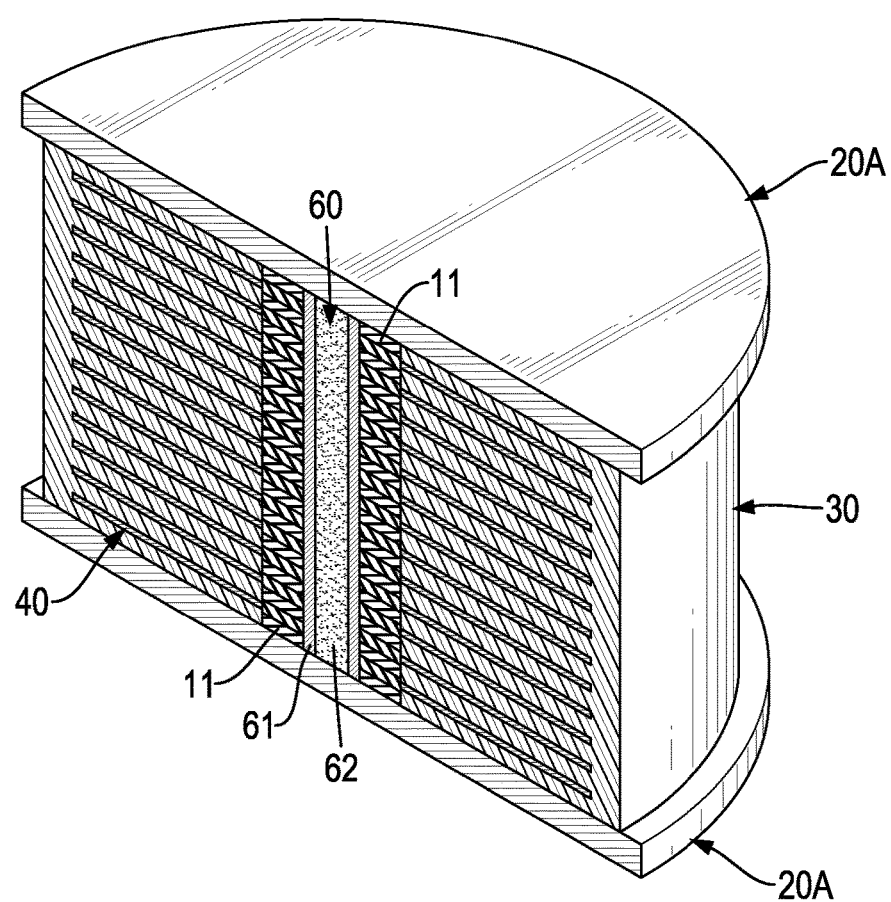
FIG. 23 is a perspective and sectional view of a thirteenth embodiment of a friction-damping energy absorber in accordance with the present invention.
Figure 24:
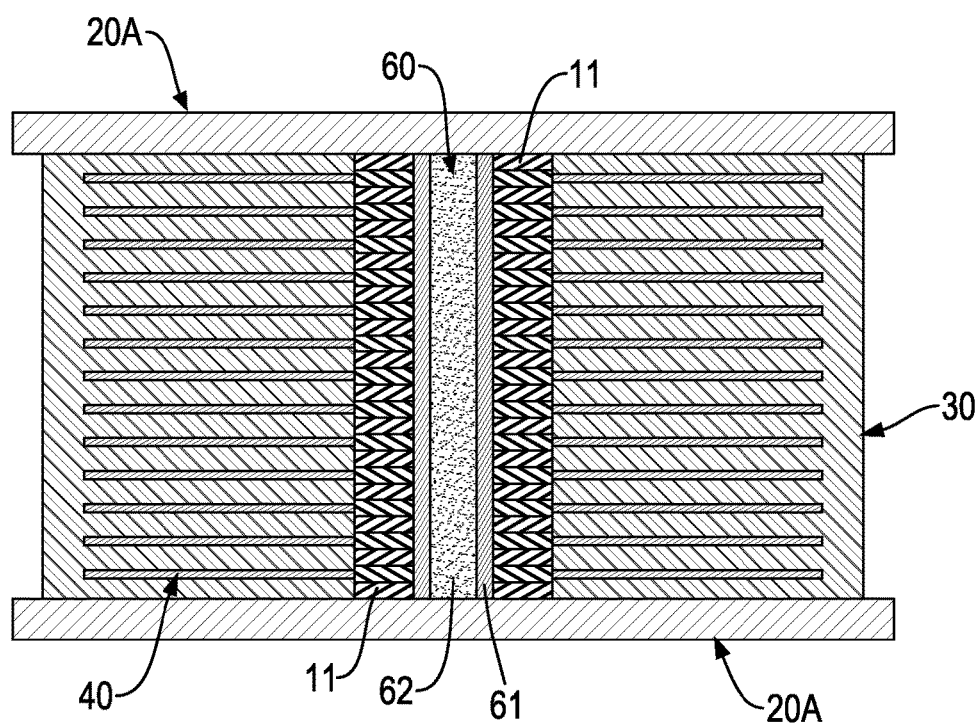
FIG. 24 is a cross sectional side view of the friction-damping energy absorber in FIG. 23.
Figure 25:
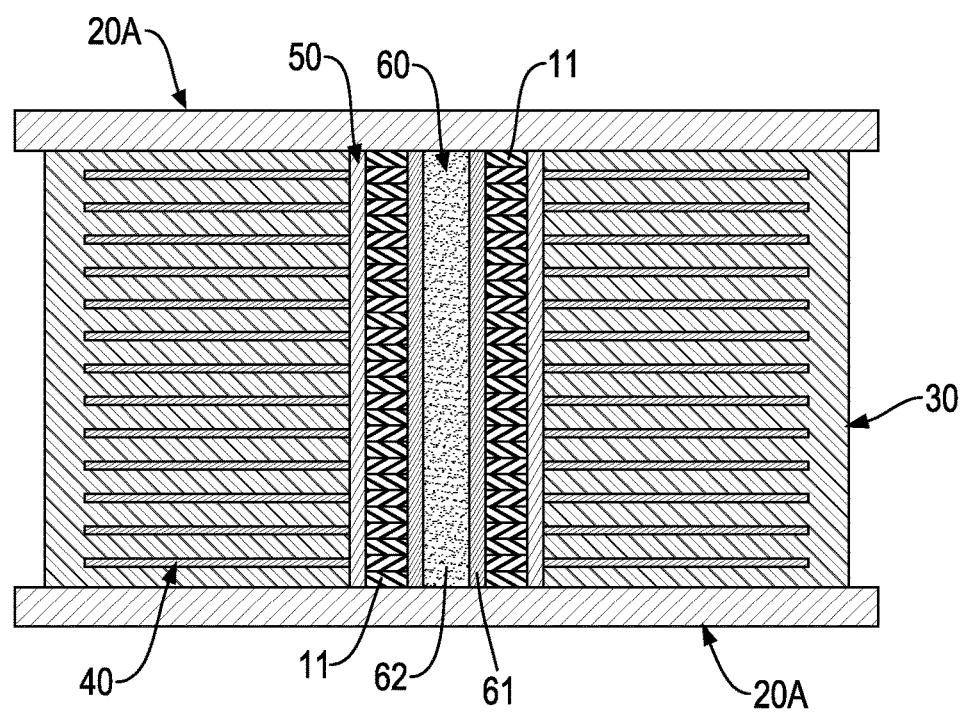
FIG. 25 is a cross sectional side view of a fourteenth embodiment of a friction-damping energy absorber in accordance with the present invention.
Figure 26:
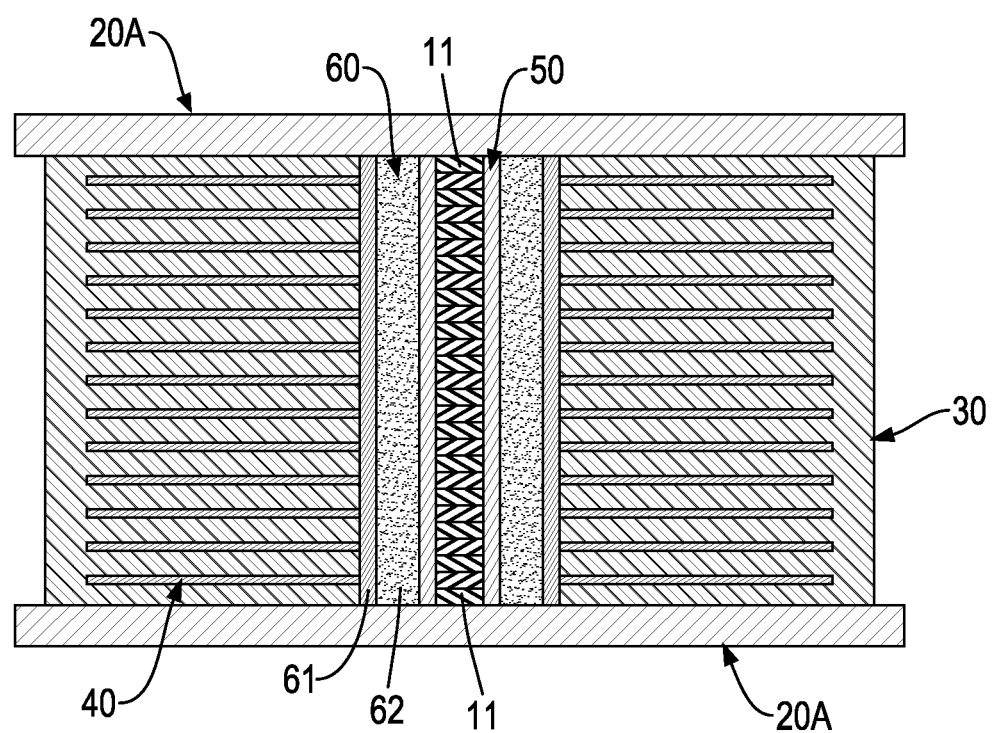
FIG. 26 is a cross sectional side view of a fifteenth embodiment of a friction-damping energy absorber in accordance with the present invention.

With reference to FIG. 18, a tenth embodiment of a friction-damping energy absorber in accordance with the present invention is substantially the same as the eighth embodiment as shown in FIGS. 15 and 16 except for the following features. The sealed pipe 61 is mounted around the restricting module 50, and the cooling agent 62 is filled between the sealed pipe 61 and the restricting module 50. The restricting module 50 can provide a restricting effect and a deforming space to the sliding sheets 11 of the core post 10. The cooling module 60 can reduce the temperature of the friction-damping energy absorber to prevent the temperature rise induced by the heat that is generated by the repeated deformation from impairing the function of the core post 10 and the material layers 30, 40 or even melting the core post 10.

With reference to FIGS. 19 to 26, the eleventh embodiment to the fifteenth embodiment of a friction-damping energy absorber in accordance with the present invention are respectively and substantially the same as the first embodiment, the fourth embodiment, the sixth embodiment, the eighth embodiment, and the tenth embodiment as shown in FIGS. 1 to 3, 7, 8, 11 to 13, 15, 16 and 18 except for the following features. The core post 10 doesn't have the two end covers 12 to close the two ends of the core post 10, and the two ends of the core post 10 are directly closed by the two supporting boards 20A to simplify the overall structure of the friction-damping energy absorber.

With reference to FIGS. 27 to 31, the sixteenth embodiment to the twentieth embodiment of a friction-damping energy absorber in accordance with the present invention are respectively and substantially the same as the first embodiment, the fourth embodiment, the sixth embodiment, the eighth embodiment, and the tenth embodiment as shown in FIGS. 1 to 3, 7, 8, 11 to 13, 15, 16 and 18 except for the following features. Each one of the first material layers 30 is arranged in parallel with one of the sliding sheets 11 of the core post 10, and has a thickness same as a thickness of the corresponding sliding sheet 11. In addition, each one of the second material layers 40A extends between two adjacent sliding sheets 11 of the core post 10. Furthermore, an sliding-assistant layer such as Teflon is coated on a top face or a bottom face of each one of the second material layers 40A that extends between two adjacent sliding sheets 11. Additionally, each one of the sliding sheets 11 is locally limited between two adjacent second material layers 40A, and this can reduce the deformation differences in the vertical direction between the core post 10 and the material layers 30, 40A to enable each one of the sliding sheets 11 to slide smoothly in the horizontal direction. Preferably, the height of the core post 10 is slightly lower than the total height of the material layers 30, 40A, and this can adjust the height differences between the core post 10 and the material layers 30, 40A to enable each one of the sliding sheets 11 to slide smoothly in the horizontal direction. In addition, the two end covers 12 are made of deformable materials softer than the materials of the two supporting boards 20 to reduce the deformation differences in the vertical direction between the core post 10 and the material layers 30, 40A to enable the sliding sheets 11 to slide smoothly in the horizontal direction. Furthermore, the sliding sheets 11 have different diameters or lengths. Therefore, the sliding sheets 11 can slide in condition of different frictional forces and at different time points by the different friction coefficients of the sliding sheets 11.

With reference to FIGS. 32 to 36, the twenty-first embodiment to the twenty-fifth embodiment of a friction-damping energy absorber in accordance with the present invention are respectively and substantially the same as the sixteenth embodiment to the twentieth embodiment as shown in FIGS. 27 to 31 except for the following features. The core post 10 doesn't have the two end covers 12 to close the two ends of the core post 10, and the two ends of the core post 10 are directly closed by the two supporting boards 20A to simplify the overall structure of the friction-damping energy absorber.

Figure 37:
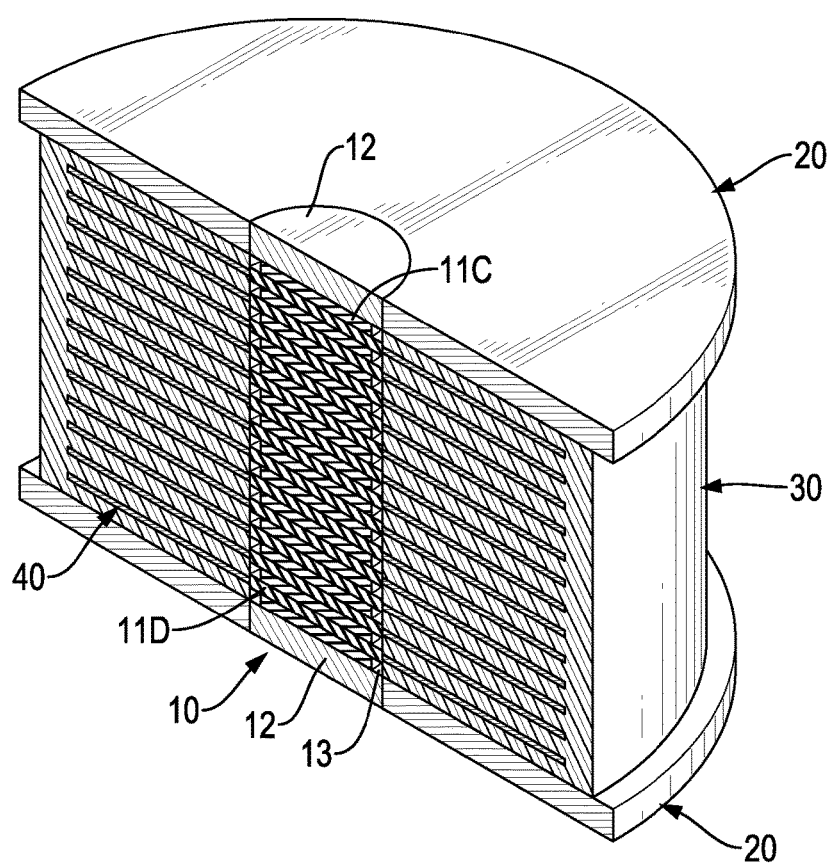
FIG. 37 is a perspective and sectional view of a twenty-sixth embodiment of a friction-damping energy absorber in accordance with the present invention.
Figure 38:
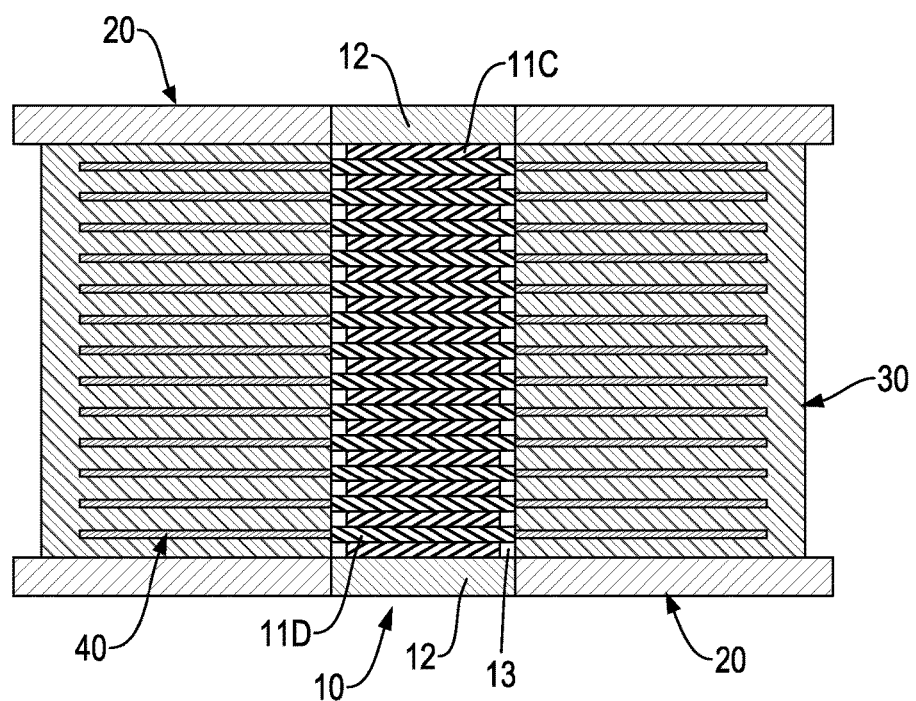
FIG. 38 is a cross sectional side view of the friction-damping energy absorber in FIG. 37.

With reference to FIGS. 37 and 38, a twenty-sixth embodiment of a friction-damping energy absorber in accordance with the present invention is substantially the same as the first embodiment as shown in FIGS. 1 to 3 except for the following features. Two adjacent sliding sheets 11C, 11D of the core post 10 have different outer diameters to form an annular gap 13 between the two adjacent sliding sheets 11C, 11D and the material layers 30, 40. A gas can be filled in each annular gap 13 to provide a restricting effect to corresponding sliding sheets 11C, 11D.

Figure 39:
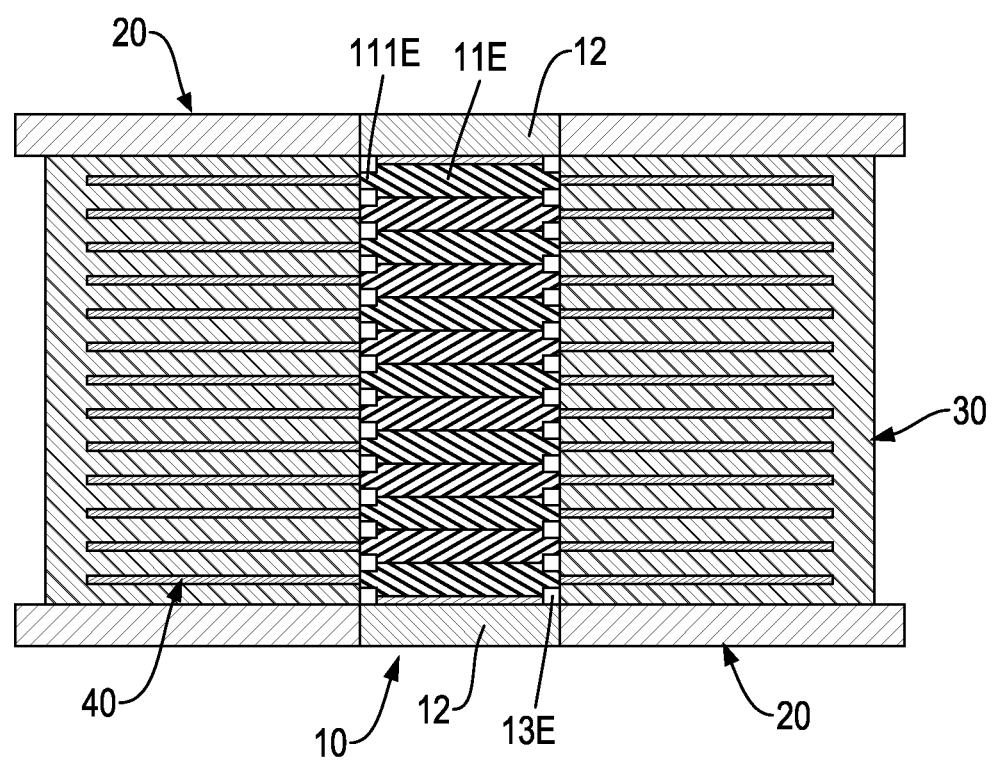
FIG. 39 is a cross sectional side view of a twenty-seventh embodiment of a friction-damping energy absorber in accordance with the present invention.

With reference to FIG. 39, a twenty-seventh embodiment of a friction-damping energy absorber in accordance with the present invention is substantially the same as the third embodiment as shown in FIGS. 5 and 6 except for the following features. Each one of the sliding sheets 11E of the core post 10 has an inner diameter shorter than inner diameters of the two end covers 12. In addition, each one of the sliding sheets 11E has an external surface and a protruding flange 111E. The protruding flange 111E is annularly formed on and protrudes from the external surface of the sliding sheet 11E, and abuts at least two of the material layers 30, 40. Furthermore, the core post 10 has an annular gap 13E formed between the material layers 30, 40 and the protruding flange 111E of each one of the sliding sheets 11E, and a gas can be filled in each annular gap 13E to provide a restricting effect to a corresponding sliding sheet 11E.

Figure 40:
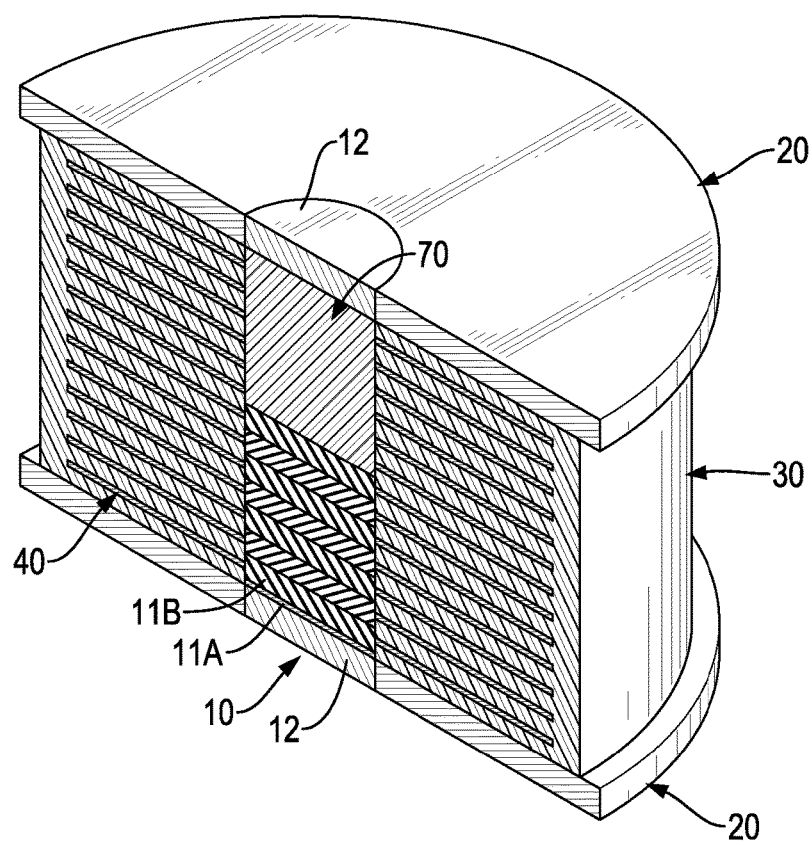
FIG. 40 is a perspective and sectional view of a twenty-eighth embodiment of a friction-damping energy absorber in accordance with the present invention.

With reference to FIG. 40, a twenty-eighth embodiment of a friction-damping energy absorber in accordance with the present invention is substantially the same as the third embodiment as shown in FIGS. 5 and 6 except for the following features. The core post 10 further has a solid and deformable stiffness-adjusting column 70. The stiffness-adjusting column 70 is mounted in a top half of the core post 10 between the sliding sheets 11A, 11B and one of the two end covers 12. In addition, the stiffness-adjusting column 70 is made of copper, tin, lead, aluminum, mild steel, polymer materials, plastic or rubber to adjust the sustained loading and stiffness of the core post 10. Then, the friction force and the damping force between the sliding sheets 11A, 11B can be adjusted according to the sustained loading and stiffness of the core post 10, and the deformation differences in the vertical direction between the core post 10 and the material layers 30, 40 can be reduced to enable the sliding sheets 11A, 11B to slide smoothly in the horizontal direction.

Figure 41:
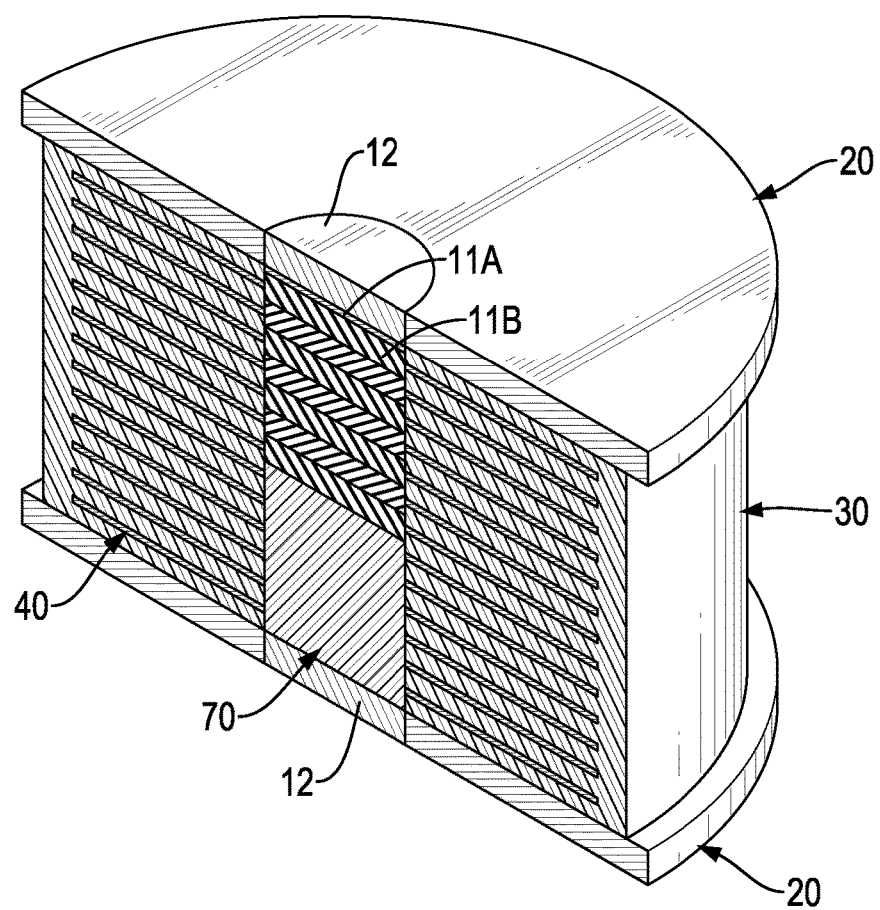
FIG. 41 is a perspective and sectional view of a twenty-ninth embodiment of a friction-damping energy absorber in accordance with the present invention.

With reference to FIG. 41, a twenty-ninth embodiment of a friction-damping energy absorber in accordance with the present invention is substantially the same as the twenty-eighth embodiment as shown in FIG. 40 except for the following features. The stiffness-adjusting column 70 is mounted in a bottom half of the core post 10 between the sliding sheets 11A, 11B and one of the two end covers 12 to adjust the sustained loading and stiffness of the core post 10. The friction force and the damping force between the sliding sheets 11A, 11B can be adjusted according to the sustained loading and stiffness of the core post 10, and the deformation differences in the vertical direction between the core post 10 and the material layers 30, 40 can be reduced to enable the sliding sheets 11A, 11B to slide smoothly in the horizontal direction.

Figure 42:
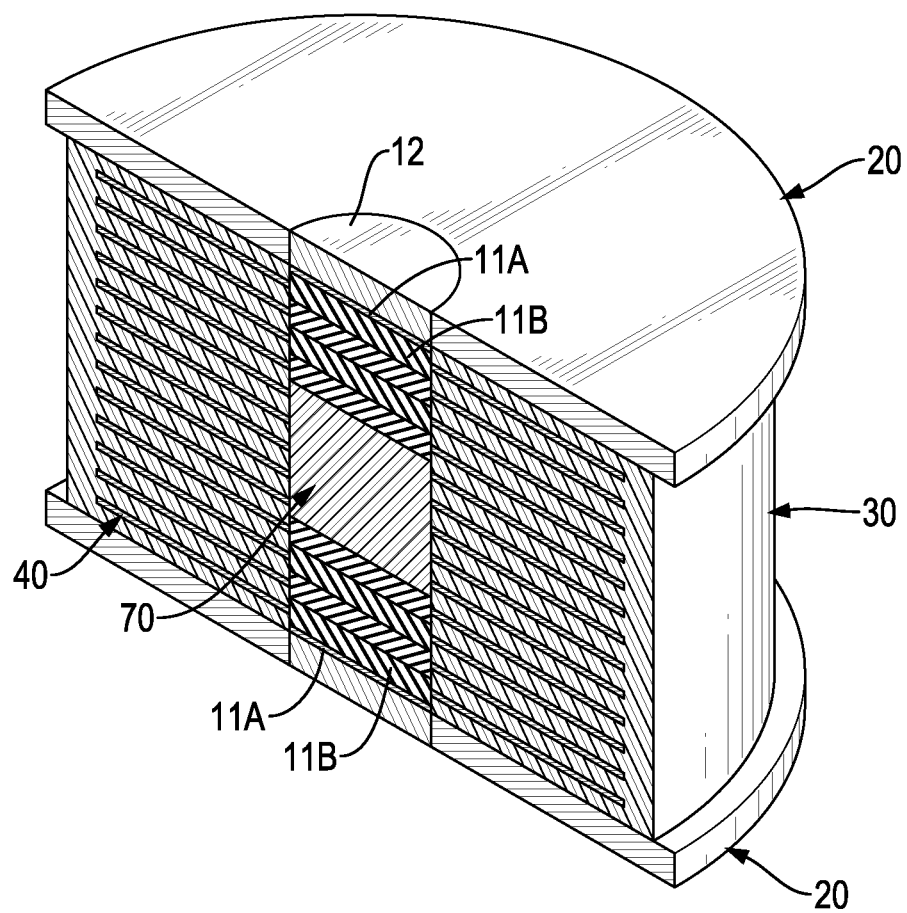
FIG. 42 is a perspective and sectional view of a thirtieth embodiment of a friction-damping energy absorber in accordance with the present invention.

With reference to FIG. 42, a thirtieth embodiment of a friction-damping energy absorber in accordance with the present invention is substantially the same as the twenty-eighth embodiment as shown in FIG. 40 except for the following features. The stiffness-adjusting column 70 is mounted in a middle segment of the core post 10 between the sliding sheets 11A, 11B to adjust the sustained loading and stiffness of the core post 10. The friction force and the damping force between the sliding sheets 11A, 11B can be adjusted according to the sustained loading and stiffness of the core post 10, and the deformation differences in the vertical direction between the core post 10 and the material layers 30, 40 can be reduced to enable the sliding sheets 11A, 11B to slide smoothly in the horizontal direction.

Figure 43:
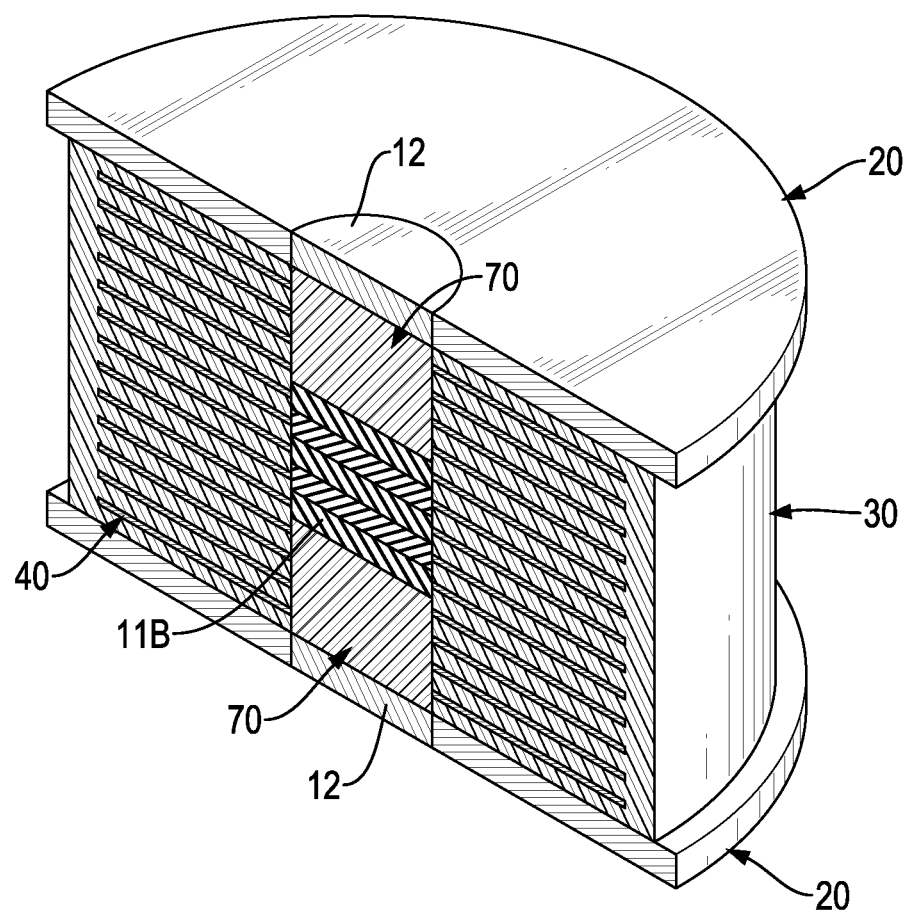
FIG. 43 is a perspective and sectional view of a thirty-first embodiment of a friction-damping energy absorber in accordance with the present invention.

With reference to FIG. 43, a thirty-first embodiment of a friction-damping energy absorber in accordance with the present invention is substantially the same as the third embodiment as shown in FIGS. 5 and 6 except for the following features. The core post 10 has two stiffness-adjusting columns 70. The stiffness-adjusting columns 70 are mounted in the core post 10 and respectively abut the two end covers 12 to hold the sliding sheets 11B between the two stiffness-adjusting columns 70 and to adjust the sustained loading and stiffness of the core post 10. The friction force and the damping force between the sliding sheets 11B can be adjusted according to the sustained loading and stiffness of the core post 10, and the deformation differences in the vertical direction between the core post 10 and the material layers 30, 40 can be reduced to enable the sliding sheets 11B to slide smoothly in the horizontal direction.

Figure 44:
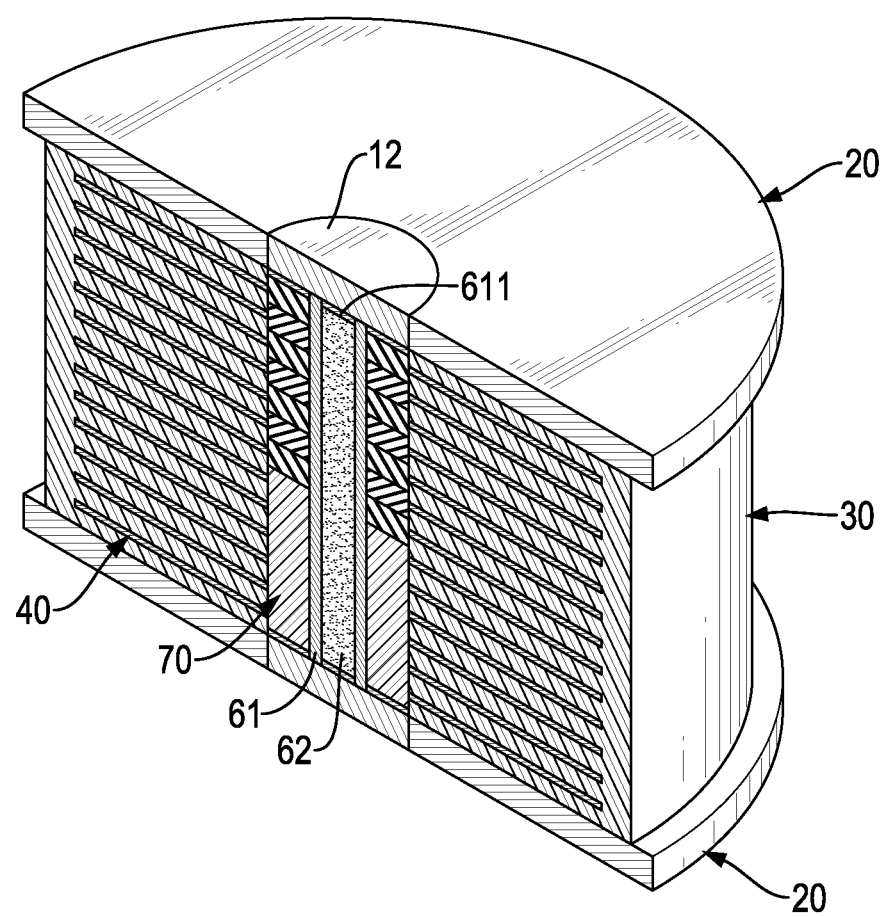
FIG. 44 is a perspective and sectional view of a thirty-second embodiment of a friction-damping energy absorber in accordance with the present invention.

With reference to FIG. 44, a thirty-second embodiment of a friction-damping energy absorber in accordance with the present invention is substantially the same as the sixth embodiment as shown in FIGS. 11 to 13 except for the following features. The core post 10 has a stiffness-adjusting column 70 mounted in a bottom half of the core post 10 and abutting one of the two end covers 12 under the sliding sheets 11 to adjust the sustained loading and stiffness of the core post 10. The friction force and the damping force between the sliding sheets 11 can be adjusted according to the sustained loading and stiffness of the core post 10, and the deformation differences in the vertical direction between the core post 10 and the material layers 30, 40 can be reduced to enable the sliding sheets 11 to slide smoothly in the horizontal direction. In addition, the sealed pipe 61 has two sealing caps 611 respectively mounted on the two ends of the sealed pipe 61.

Figure 45:
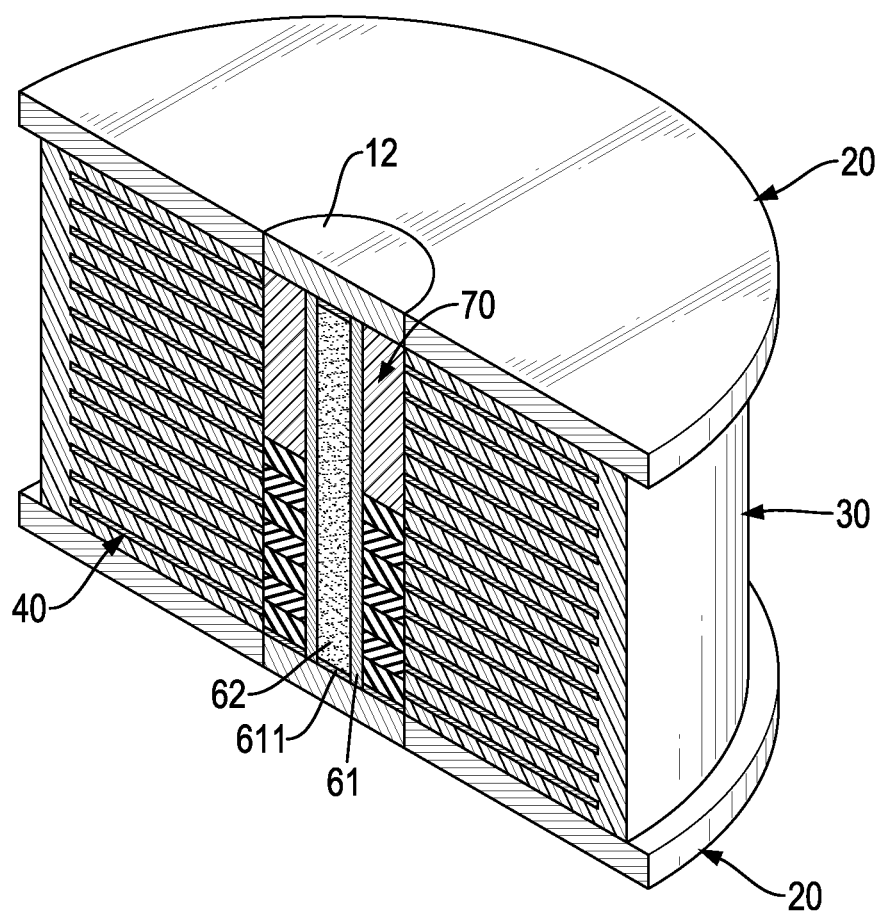
FIG. 45 is a perspective and sectional view of a thirty-third embodiment of a friction-damping energy absorber in accordance with the present invention.

With reference to FIG. 45, a thirty-third embodiment of a friction-damping energy absorber in accordance with the present invention is substantially the same as the thirty-second embodiment as shown in FIG. 44 except for the following features. The core post 10 has a stiffness-adjusting column 70 mounted in a top half of the core post 10 and abutting one of the two end covers 12 above the sliding sheets 11 to adjust the sustained loading and stiffness of the core post 10. The friction force and the damping force between the sliding sheets 11 can be adjusted according to the sustained loading and stiffness of the core post 10.

Figure 46:
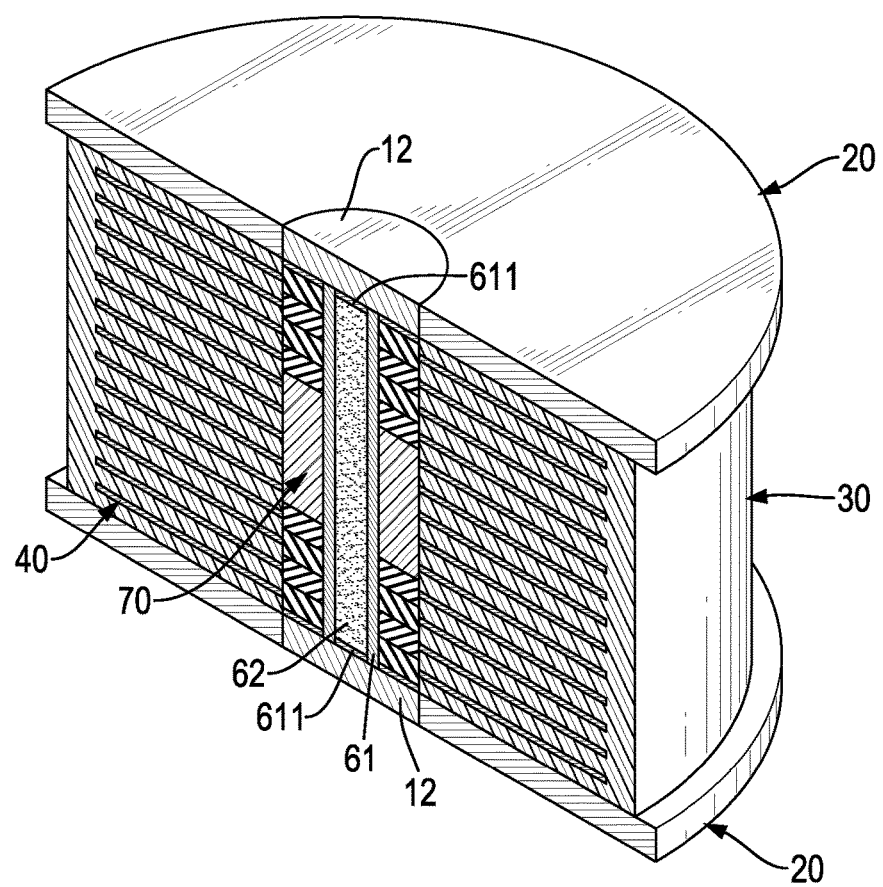
FIG. 46 is a perspective and sectional view of a thirty-fourth embodiment of a friction-damping energy absorber in accordance with the present invention.

With reference to FIG. 46, a thirty-fourth embodiment of a friction-damping energy absorber in accordance with the present invention is substantially the same as the thirty-second embodiment as shown in FIG. 44 except for the following features. The core post 10 has a stiffness-adjusting column 70 mounted in a middle segment of the core post 10 between the sliding sheets 11 to adjust the sustained loading and stiffness of the core post 10. The friction force and the damping force between the sliding sheets 11 can be adjusted according to the sustained loading and stiffness of the core post 10 to enable the sliding sheets 11 to slide smoothly in the horizontal direction.

Figure 47:
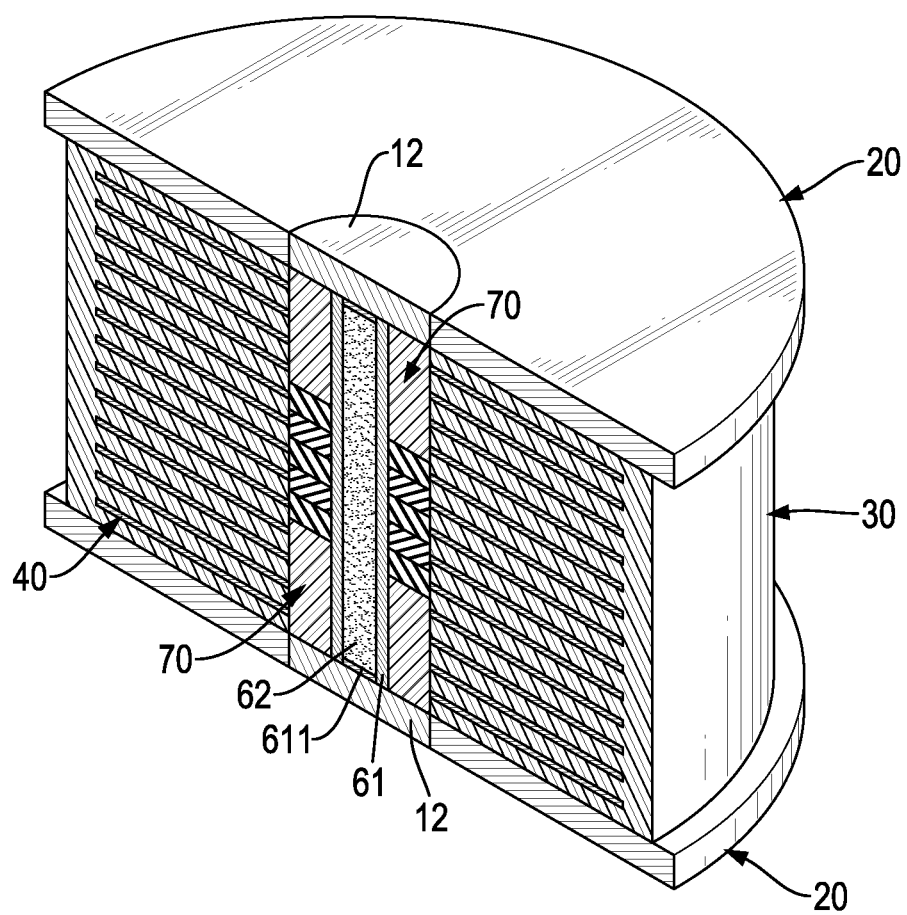
FIG. 47 is a perspective and sectional view of a thirty-fifth embodiment of a friction-damping energy absorber in accordance with the present invention.

With reference to FIG. 47, a thirty-fifth embodiment of a friction-damping energy absorber in accordance with the present invention is substantially the same as the thirty-second embodiment as shown in FIG. 44 except for the following features. The core post 10 has two stiffness-adjusting columns 70 mounted in the core post 10 to hold the sliding sheets 11 between the two stiffness-adjusting columns 70 and to adjust the sustained loading and stiffness of the core post 10. The friction force and the damping force between the sliding sheets 11 can be adjusted according to the sustained loading and stiffness of the core post 10 to enable the sliding sheets 11A, 11B to slide smoothly in the horizontal direction.

Figure 48:
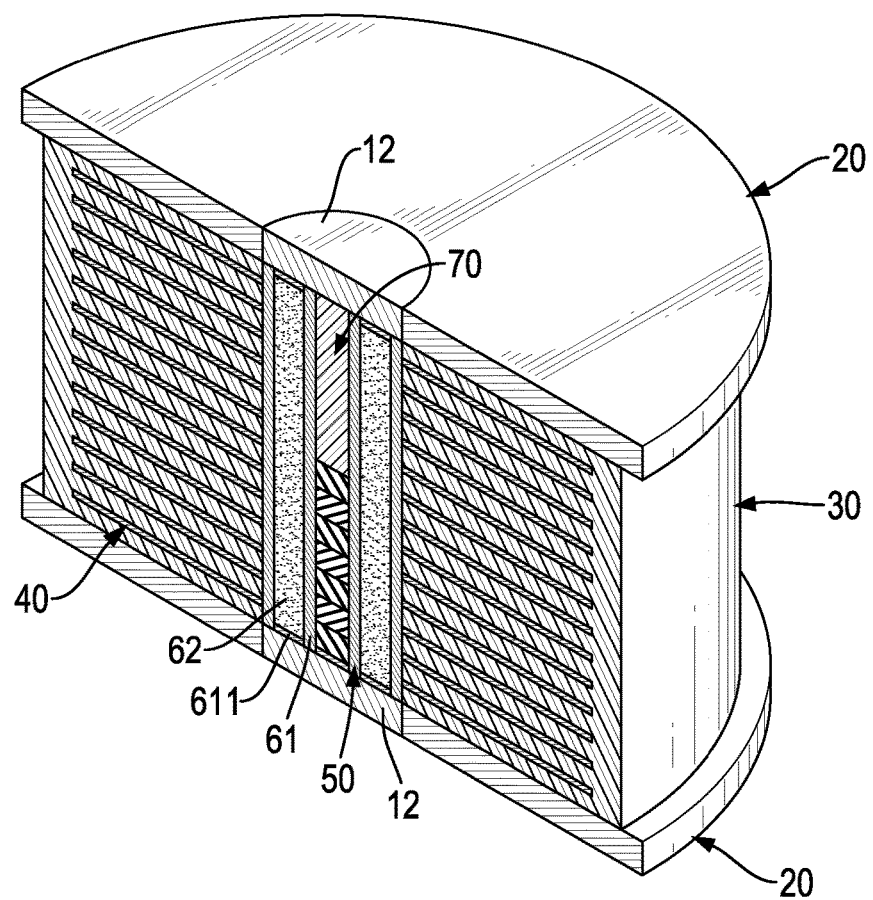
FIG. 48 is a perspective and sectional view of a thirty-sixth embodiment of a friction-damping energy absorber in accordance with the present invention.

With reference to FIG. 48, a thirty-sixth embodiment of a friction-damping energy absorber in accordance with the present invention is substantially the same as the tenth embodiment as shown in FIG. 18 except for the following features. The core post 10 has a stiffness-adjusting column 70 mounted in a top half of the core post 10 and abutting one of the two end covers 12 above the sliding sheets 11 to adjust the sustained loading and stiffness of the core post 10. The friction force and the damping force between the sliding sheets 11 can be adjusted according to the sustained loading and stiffness of the core post 10. In addition, the sealed pipe 61 has two sealing caps 611 respectively mounted on the two ends of the sealed pipe 61.

Figure 49:
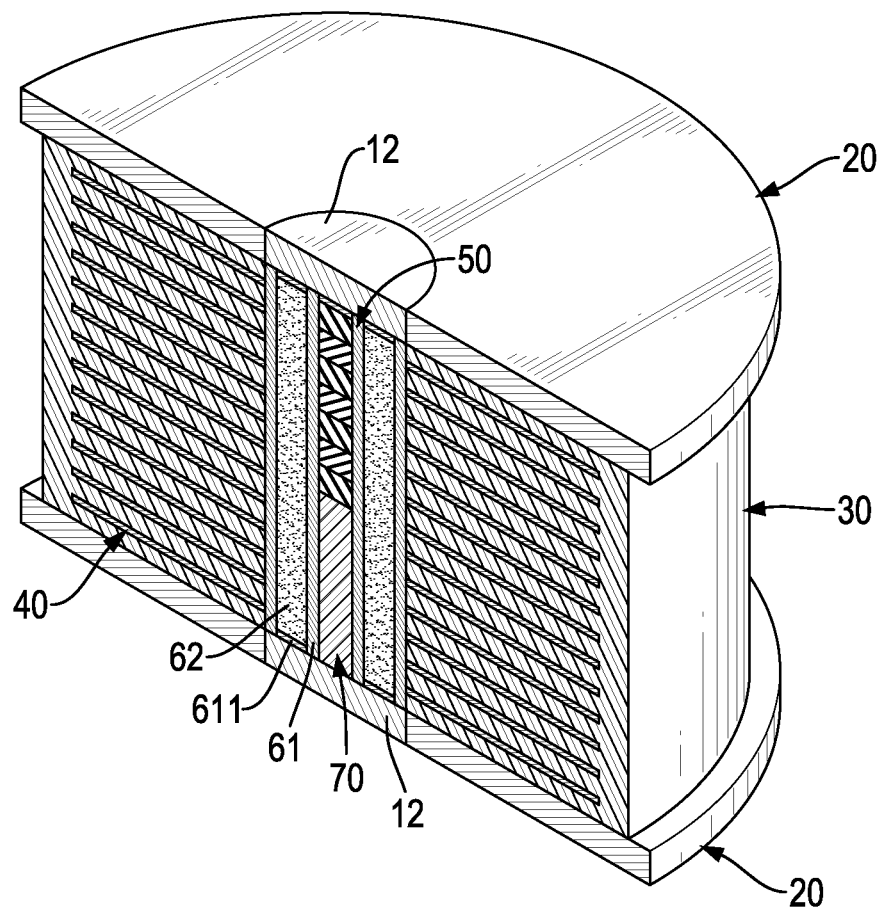
FIG. 49 is a perspective and sectional view of a thirty-seventh embodiment of a friction-damping energy absorber in accordance with the present invention.

With reference to FIG. 49, a thirty-seventh embodiment of a friction-damping energy absorber in accordance with the present invention is substantially the same as the thirty-sixth embodiment as shown in FIG. 48 except for the following features. The core post 10 has a stiffness-adjusting column 70 mounted in a bottom half of the core post 10 and abutting one of the two end covers 12 under the sliding sheets 11 to adjust the sustained loading and stiffness of the core post 10. The friction force and the damping force between the sliding sheets 11 can be adjusted according to the sustained loading and stiffness of the core post 10.

Figure 50:
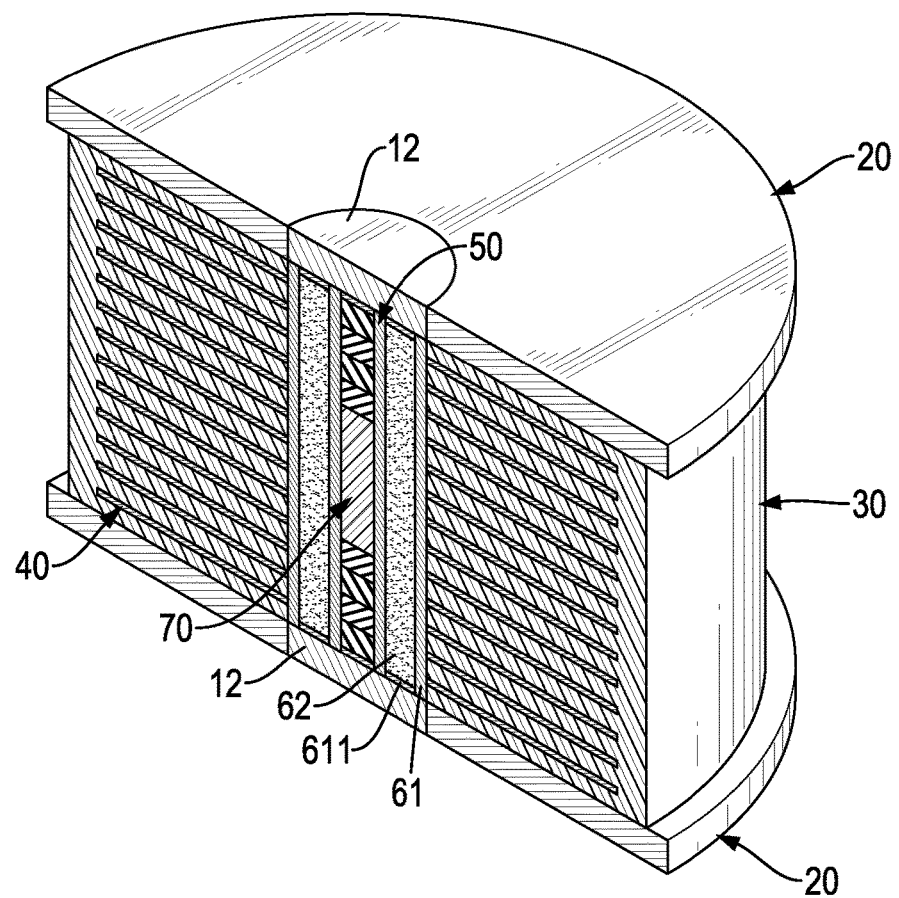
FIG. 50 is a perspective and sectional view of a thirty-eighth embodiment of a friction-damping energy absorber in accordance with the present invention.

With reference to FIG. 50, a thirty-eighth embodiment of a friction-damping energy absorber in accordance with the present invention is substantially the same as the thirty-sixth embodiment as shown in FIG. 48 except for the following features. The core post 10 has a stiffness-adjusting column 70 mounted in a middle segment of the core post 10 between the sliding sheets 11 to adjust the sustained loading and stiffness of the core post 10. The friction force and the damping force between the sliding sheets 11 can be adjusted according to the sustained loading and stiffness of the core post 10.

Figure 51:
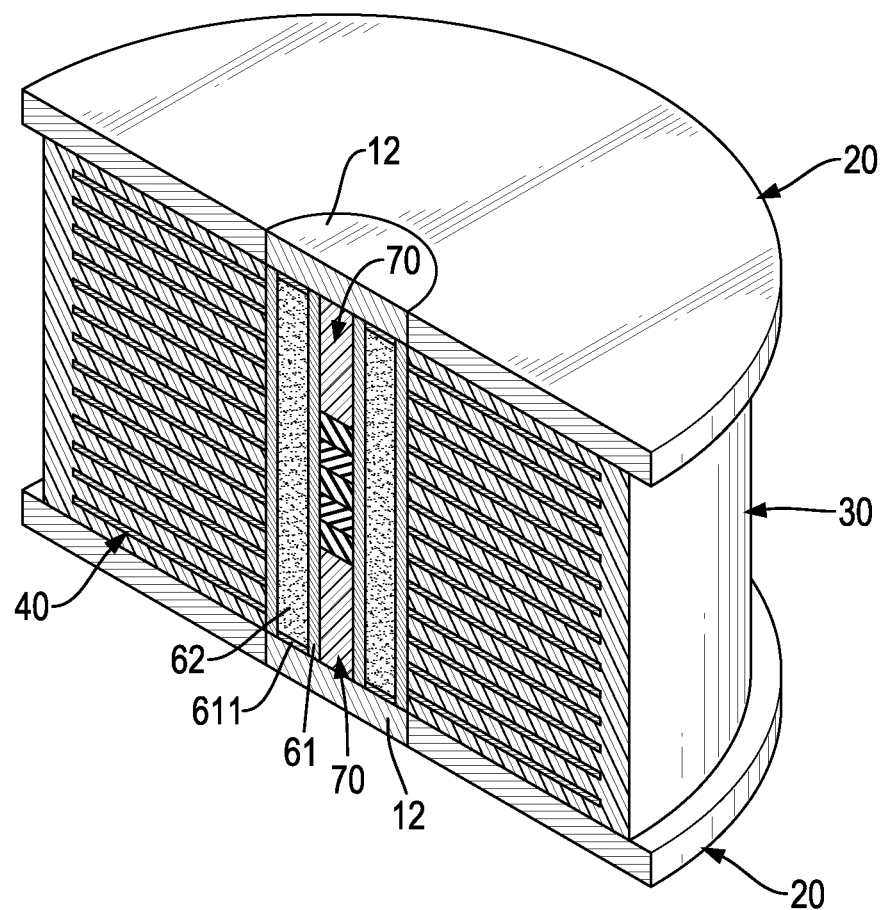
FIG. 51 is a perspective and sectional view of a thirty-ninth embodiment of a friction-damping energy absorber in accordance with the present invention.

With reference to FIG. 51, a thirty-ninth embodiment of a friction-damping energy absorber in accordance with the present invention is substantially the same as the thirty-sixth embodiment as shown in FIG. 48 except for the following features. The core post 10 has two stiffness-adjusting columns 70 mounted in the core post 10 and respectively abutting the two end covers 12 to hold the sliding sheets 11 between the two stiffness-adjusting columns 70 and to adjust the sustained loading and stiffness of the core post 10. The friction force and the damping force between the sliding sheets 11 can be adjusted according to the sustained loading and stiffness of the core post 10.

Figure 52:
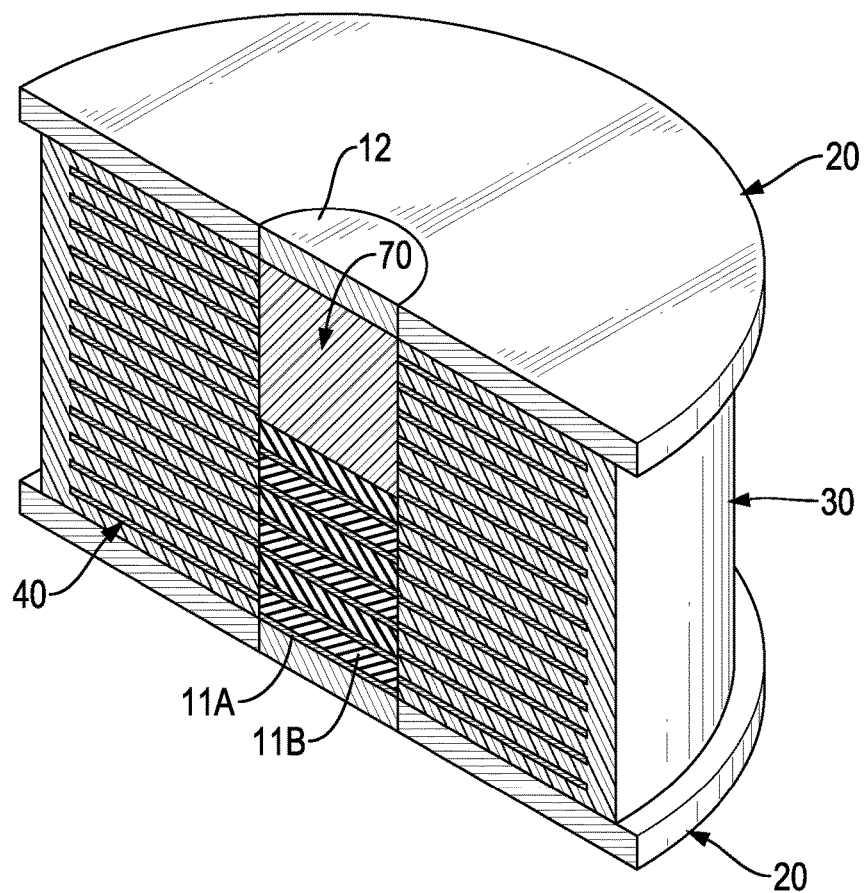
FIG. 52 is a perspective and sectional view of a fortieth embodiment of a friction-damping energy absorber in accordance with the present invention.

With reference to FIG. 52, a fortieth embodiment of a friction-damping energy absorber in accordance with the present invention is substantially the same as the third embodiment as shown in FIGS. 5 and 6 except for the following features. The core post 10 has a stiffness-adjusting column 70 mounted in a top half of the core post 10 and abutting one of the two end covers 12 above the sliding sheets 11A, 11B to adjust the sustained loading and stiffness of the core post 10. The friction force and the damping force between the sliding sheets 11A, 11B can be adjusted according to the sustained loading and stiffness of the core post 10. The friction force and the damping force between the sliding sheets 11A, 11B can be adjusted according to the sustained loading and stiffness of the core post 10 to enable the sliding sheets 11A, 11B to slide smoothly in the horizontal direction.

Figure 53:
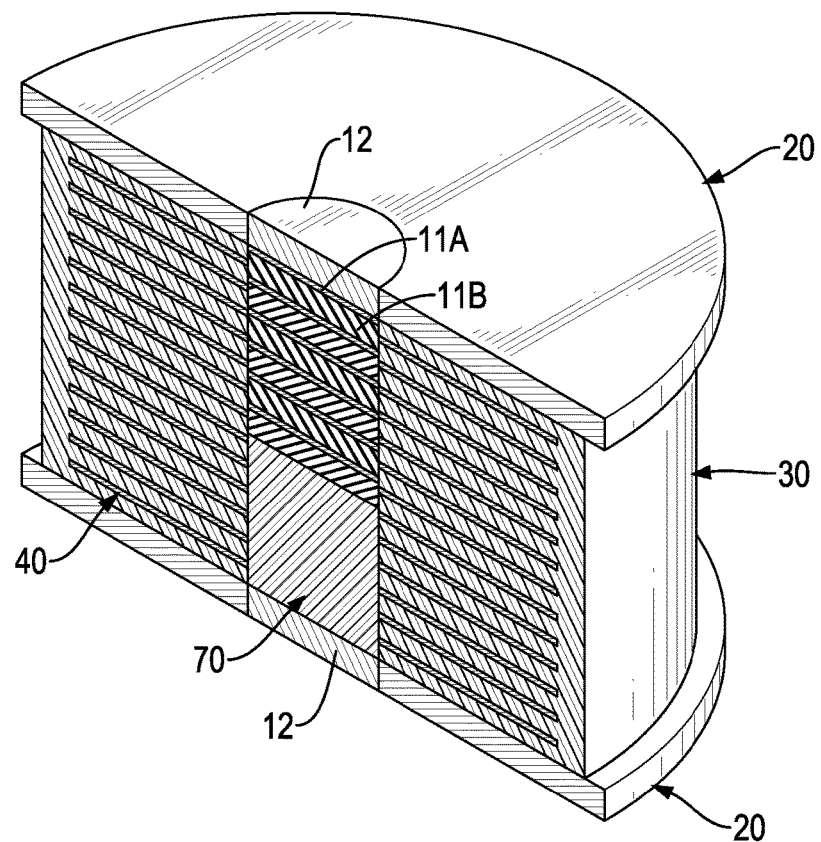
FIG. 53 is a perspective and sectional view of a forty-first embodiment of a friction-damping energy absorber in accordance with the present invention.

With reference to FIG. 53, a forty-first embodiment of a friction-damping energy absorber in accordance with the present invention is substantially the same as the fortieth embodiment as shown in FIG. 52 except for the following features. The core post 10 has a stiffness-adjusting column 70 mounted in a bottom half of the core post 10 and abutting one of the two end covers 12 under the sliding sheets 11A, 11B to adjust the sustained loading and stiffness of the core post 10. The friction force and the damping force between the sliding sheets 11A, 11B can be adjusted according to the sustained loading and stiffness of the core post 10. The friction force and the damping force between the sliding sheets 11A, 11B can be adjusted according to the sustained loading and stiffness of the core post 10 to enable the sliding sheets 11A, 11B to slide smoothly in the horizontal direction.

Figure 54:
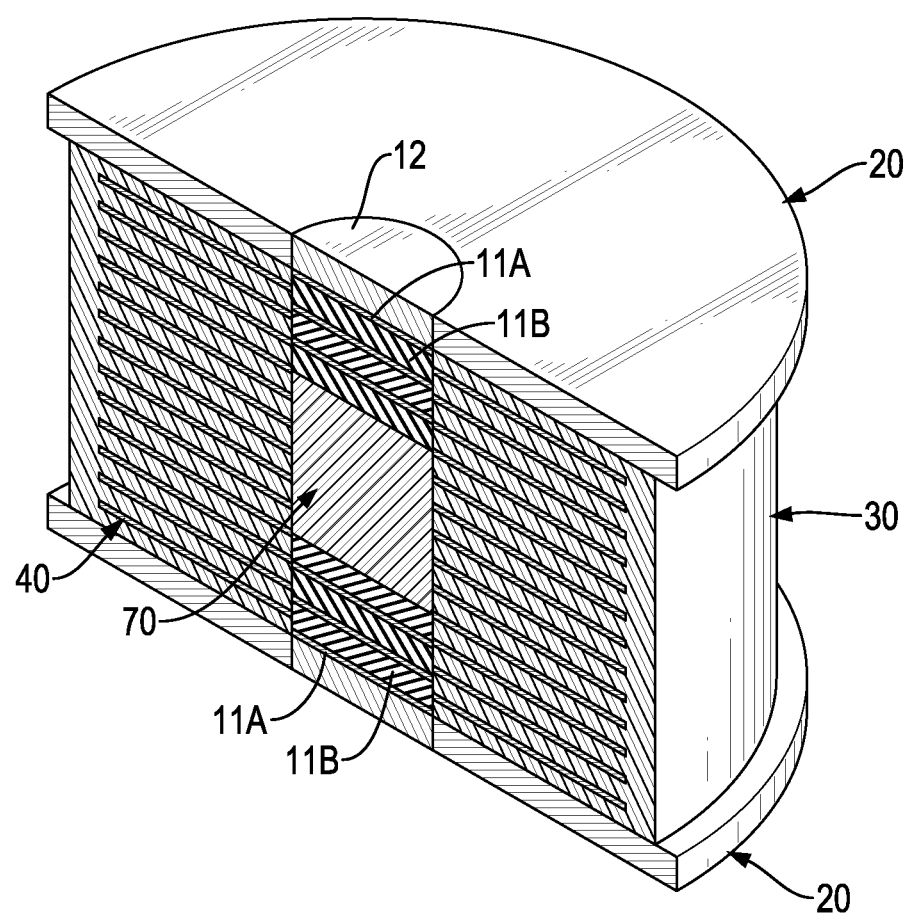
FIG. 54 is a perspective and sectional view of a forty-second embodiment of a friction-damping energy absorber in accordance with the present invention.

With reference to FIG. 54, a forty-second embodiment of a friction-damping energy absorber in accordance with the present invention is substantially the same as the fortieth embodiment as shown in FIG. 52 except for the following features. The core post 10 has a stiffness-adjusting column 70 mounted in a middle segment of the core post 10 between the sliding sheets 11A, 11B to adjust the sustained loading and stiffness of the core post 10. The friction force and the damping force between the sliding sheets 11A, 11B can be adjusted according to the sustained loading and stiffness of the core post 10. The friction force and the damping force between the sliding sheets 11A, 11B can be adjusted according to the sustained loading and stiffness of the core post 10 to enable the sliding sheets 11A, 11B to slide smoothly in the horizontal direction.

Figure 55:
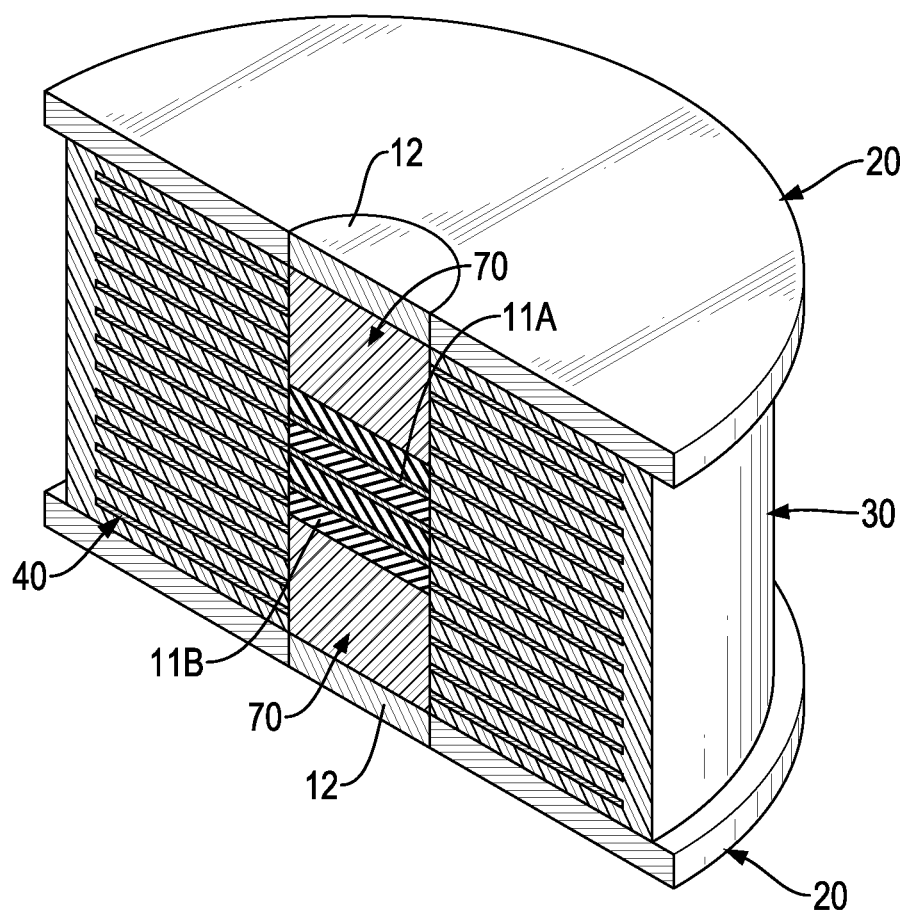
FIG. 55 is a perspective and sectional view of a forty-third embodiment of a friction-damping energy absorber in accordance with the present invention.

With reference to FIG. 55, a forty-third embodiment of a friction-damping energy absorber in accordance with the present invention is substantially the same as the fortieth embodiment as shown in FIG. 52 except for the following features. The core post 10 has two stiffness-adjusting columns 70 mounted in the core post 10, respectively abutting the two end covers 12 to hold the sliding sheets 11A, 11B between the two stiffness-adjusting columns 70 and to adjust the sustained loading and stiffness of the core post 10. The friction force and the damping force between the sliding sheets 11A, 11B can be adjusted according to the sustained loading and stiffness of the core post 10. The friction force and the damping force between the sliding sheets 11A, 11B can be adjusted according to the sustained loading and stiffness of the core post 10 to enable the sliding sheets 11A, 11B to slide smoothly in the horizontal direction.

Figure 27:
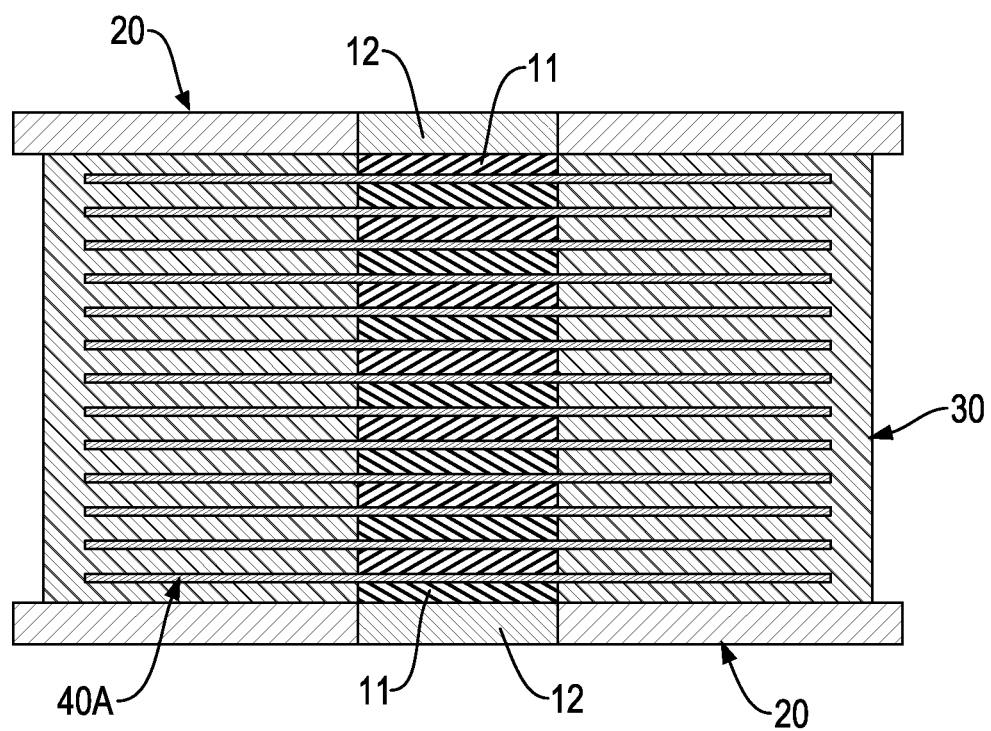
FIG. 27 is a cross sectional side view of a sixteenth embodiment of a friction-damping energy absorber in accordance with the present invention.
Figure 28:
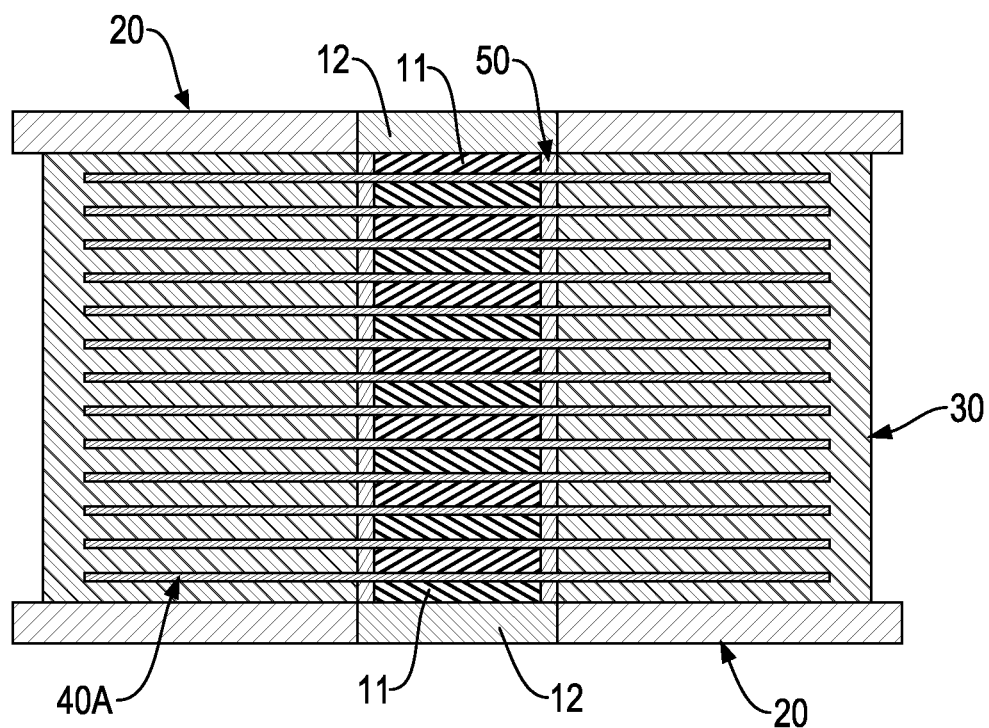
FIG. 28 is a cross sectional side view of a seventeenth embodiment of a friction-damping energy absorber in accordance with the present invention.
Figure 56:
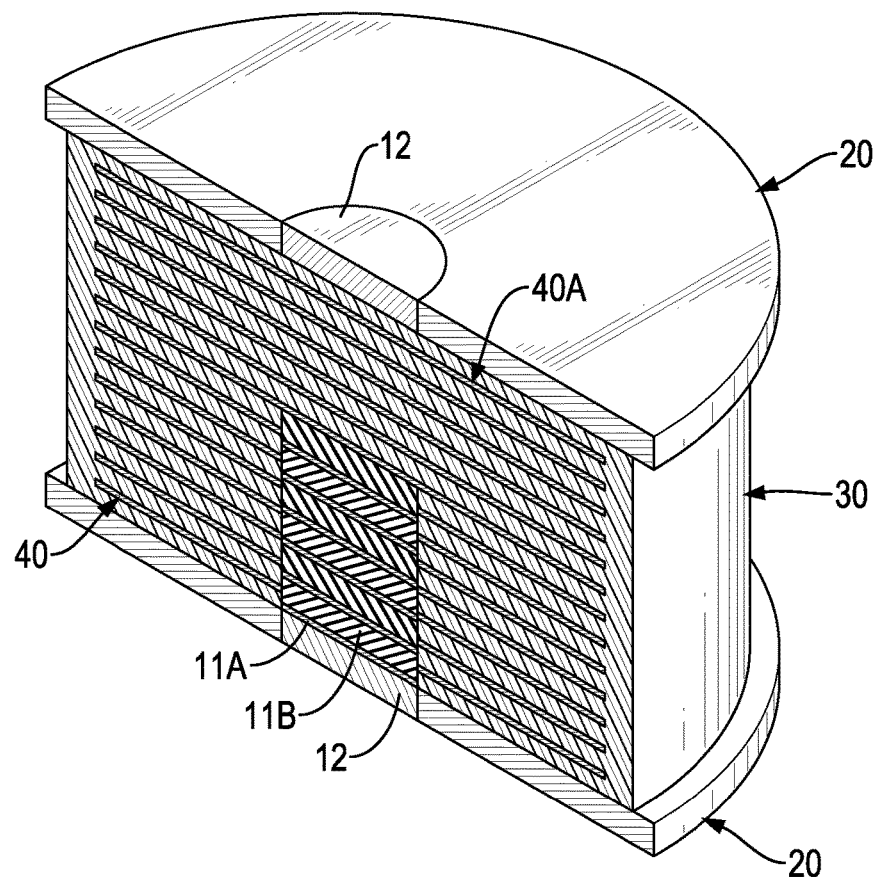
FIG. 56 is a perspective and sectional view of a forty-fourth embodiment of a friction-damping energy absorber in accordance with the present invention.

With reference to FIG. 56, a forty-fourth embodiment of a friction-damping energy absorber in accordance with the present invention is substantially the same as the sixteenth embodiment as shown in FIG. 27 except for the following features. A part of the material layers 30, 40A extends in a top half of the core post 10, and the core post 10 has multiple sliding sheets 11A, 11B with two different thicknesses mounted in a bottom half of the core post 10 to enable two adjacent sliding sheets 11A, 11B to have different thicknesses and materials.

When the friction-damping energy absorber has sustained a small horizontal force (small displacement), only the material layers 30, 40A that are mounted on the top half of the core post 10 are deformed to provide a damping effect, and the damping function of the material layers 30, 40 that are mounted on the bottom half of the core post 10 and the sliding sheets 11A, 11B isn't provided. Therefore, the stiffness and the damping of the friction-damping energy absorber are provided by the material layers 30, 40A that are mounted on the top half of the core post 10. When the horizontal force reaches the degree to overcome the friction forces between the sliding sheets 11A, 11B, the sliding sheets 11A, 11B that are mounted in the bottom half of the core post 10 begin to slide. At the same time, the material layers 30, 40 that are mounted on the bottom half of the core post 10 begin to deform to provide a damping effect, and the material layers 30, 40A that are mounted on the top half of the core post 10 are also deformed to provide a damping effect. Consequently, the stiffness of the friction-damping energy absorber is provided by a series result that is formed from the material layers 30, 40, 40A mounted on the top half and the bottom half of the core post 10, and the damping of the friction-damping energy absorber is provided by a sum of damping between the deformation of the material layers 30, 40, 40A and the sliding friction of the sliding sheets 11A, 11B.

Therefore, the changes of the stiffness can be very smooth from the small horizontal force (small displacement) to the large horizontal force (large displacement) and the stiffness doesn't drastically change to cause high frequency oscillation. Furthermore, the reducing amount of the damping ratio is relatively mild from the small horizontal force (small displacement) to the large horizontal force (large displacement), and this can enable the materials of the friction-damping energy absorber to have a preferred combination and application. In addition, the friction-damping energy absorber of the forty-fourth embodiment in accordance with the present invention also can be connected to other kinds of core posts 90 (such as Lead Rubber Bearing disclosed by the referenced case and made of lead or high damping materials) in parallel to form the above-mentioned damping function to control the position and time of the deformation of the other kinds of core posts 90. Then, the changes of stiffness and frequency can be automatically controlled from the small horizontal force (small displacement) to the large horizontal force (large displacement) to enhance the shock-suppressing effect of the friction-damping energy absorber.

Figure 57:
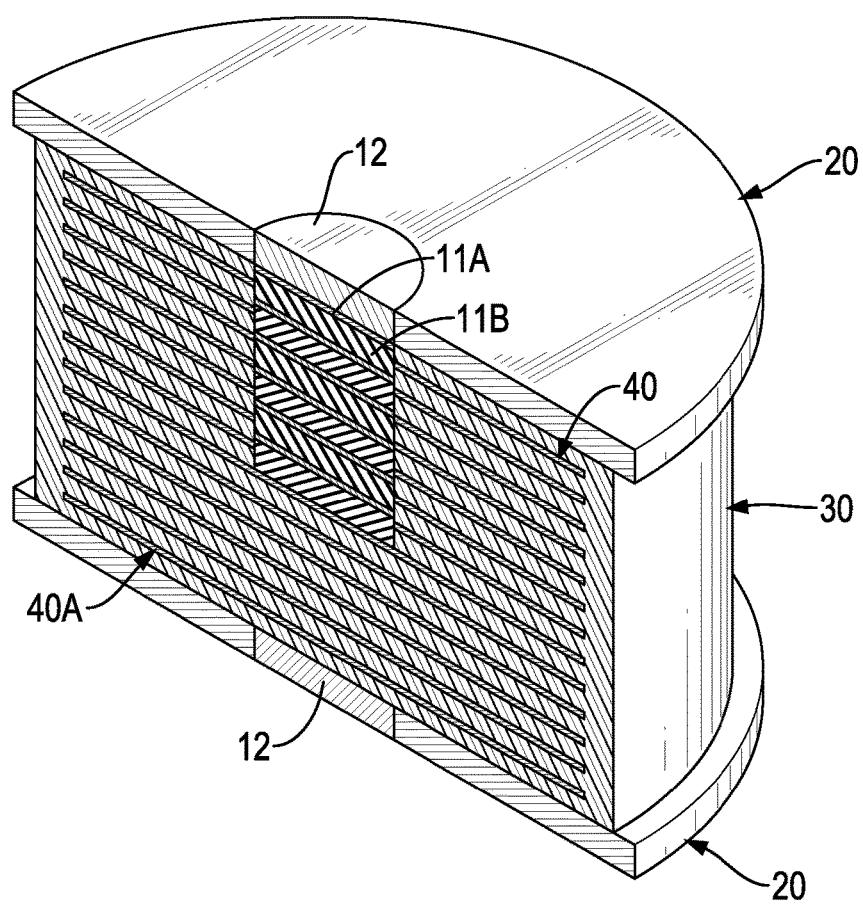
FIG. 57 is a perspective and sectional view of a forty-fifth embodiment of a friction-damping energy absorber in accordance with the present invention.

With reference to FIG. 57, a forty-fifth embodiment of a friction-damping energy absorber in accordance with the present invention is substantially the same as the forty-fourth embodiment as shown in FIG. 56 except for the following features. A part of the material layers 30, 40A extends in a bottom half of the core post 10, and the core post 10 has multiple sliding sheets 11A, 11B with two different thicknesses mounted in a top half of the core post 10 to enable two adjacent sliding sheets 11A, 11B to have different thicknesses and materials.

Figure 58:
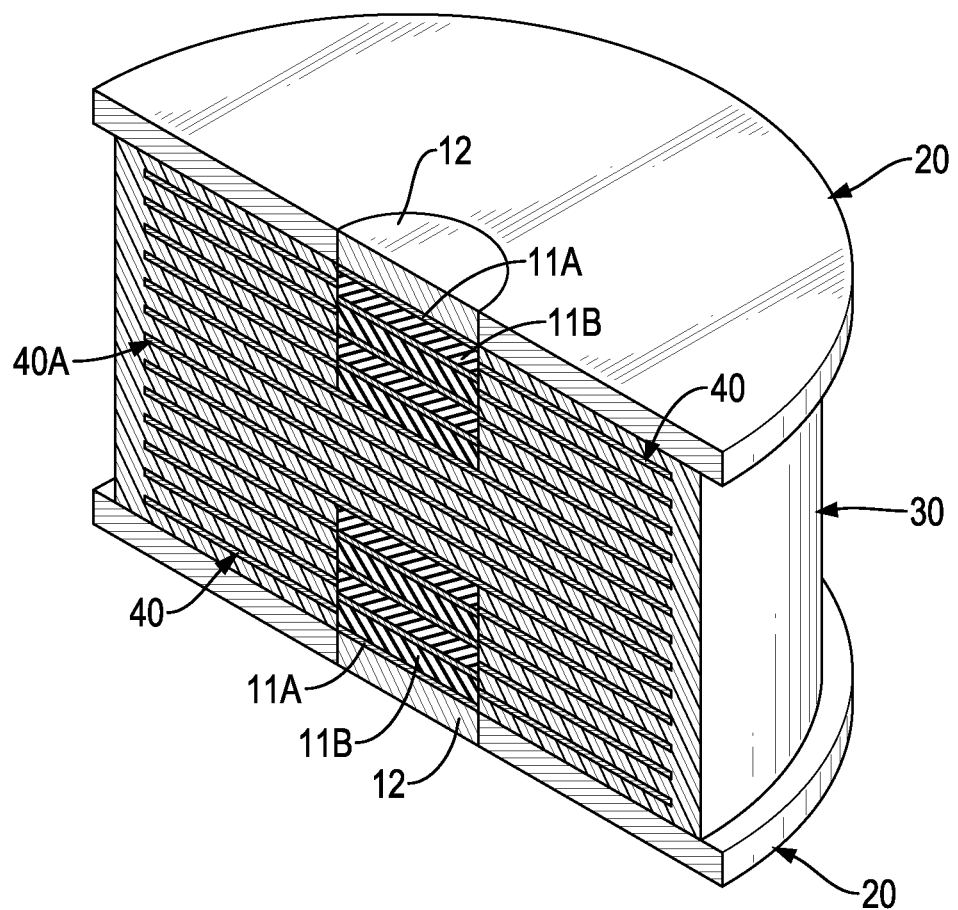
FIG. 58 is a perspective and sectional view of a forty-sixth embodiment of a friction-damping energy absorber in accordance with the present invention.

With reference to FIG. 58, a forty-sixth embodiment of a friction-damping energy absorber in accordance with the present invention is substantially the same as the forty-fourth embodiment as shown in FIG. 56 except for the following features. A part of the material layers 30, 40A extends in a middle segment of the core post 10, and the core post 10 has multiple sliding sheets 11A, 11B with two different thicknesses mounted in a top half and a bottom half of the core post 10 to enable two adjacent sliding sheets 11A, 11B to have different thicknesses and materials.

Figure 59:
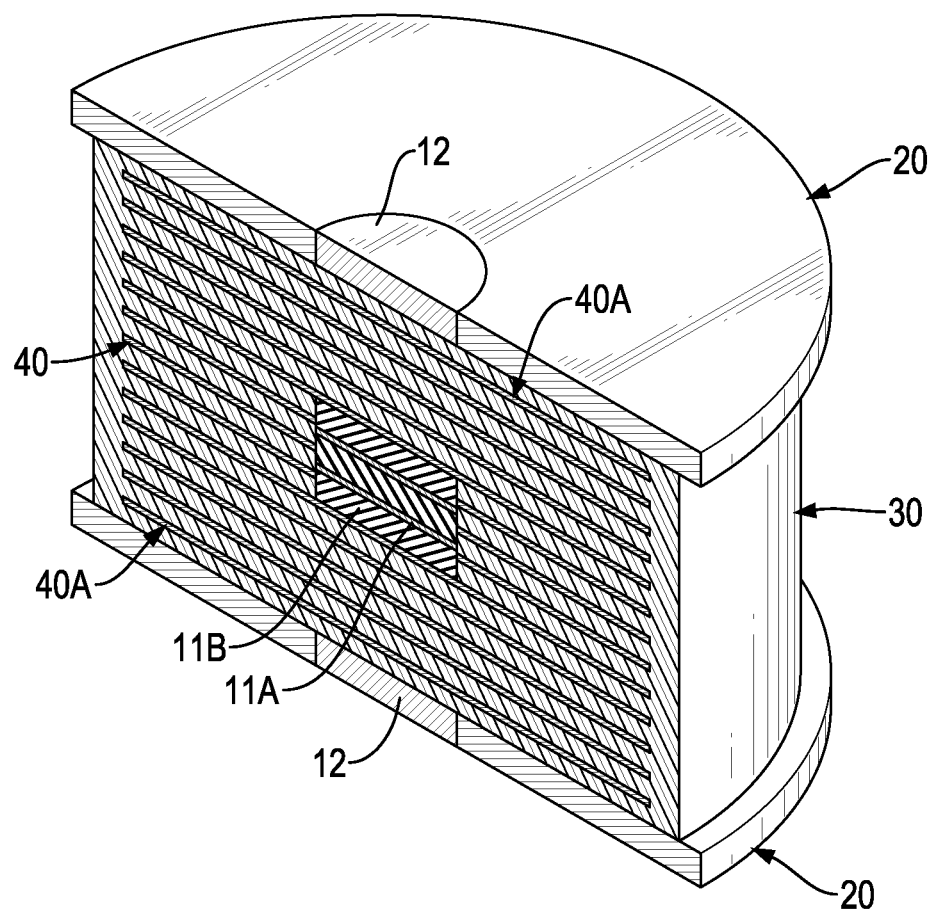
FIG. 59 is a perspective and sectional view of a forty-seventh embodiment of a friction-damping energy absorber in accordance with the present invention.

With reference to FIG. 59, a forty-seventh embodiment of a friction-damping energy absorber in accordance with the present invention is substantially the same as the forty-fourth embodiment as shown in FIG. 56 except for the following features. A part of the material layers 30, 40A extends in a top half and a bottom half of the core post 10, and the core post 10 has multiple sliding sheets 11A, 11B with two different thicknesses mounted in a middle segment of the core post 10 to enable two adjacent sliding sheets 11A, 11B to have different thicknesses and materials.

Figure 29:
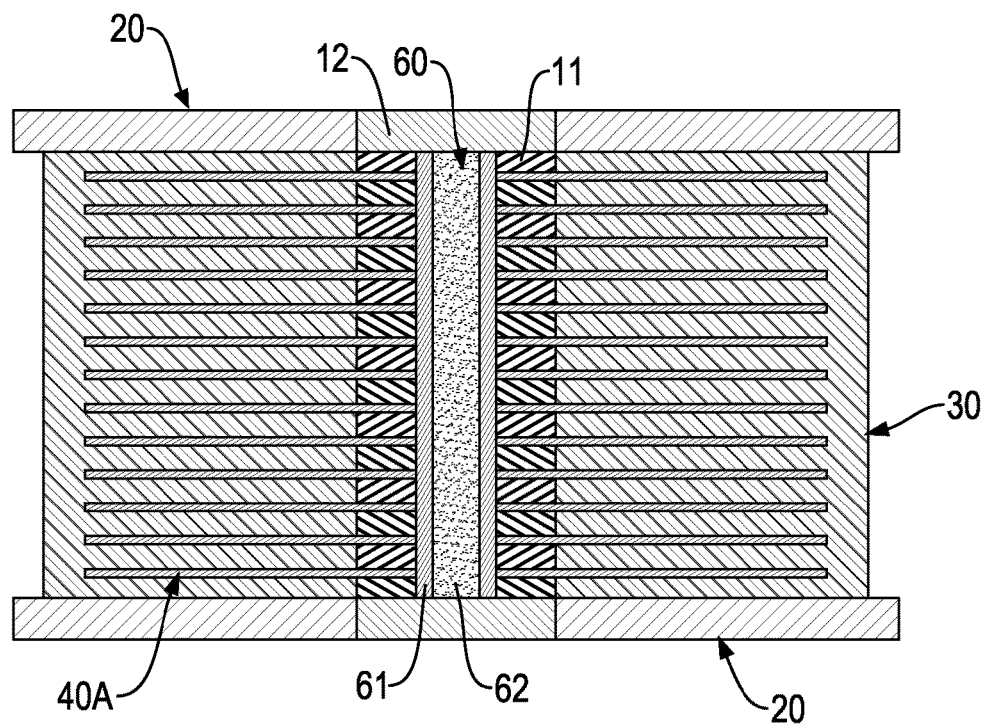
FIG. 29 is a cross sectional side view of an eighteenth embodiment of a friction-damping energy absorber in accordance with the present invention.
Figure 30:
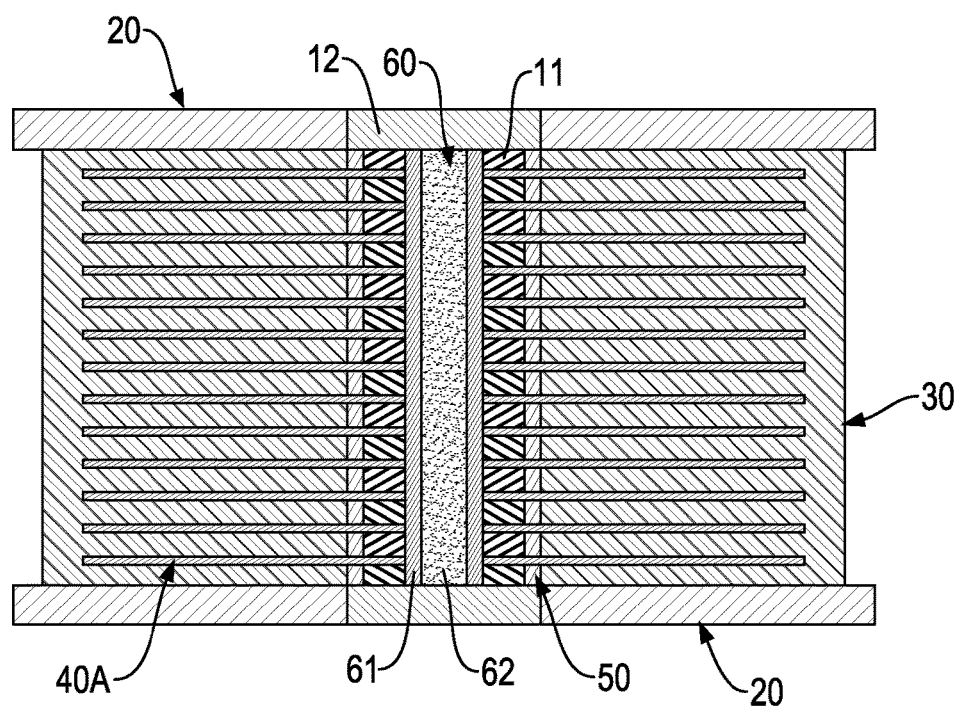
FIG. 30 is a cross sectional side view of a nineteenth embodiment of a friction-damping energy absorber in accordance with the present invention.
Figure 60:
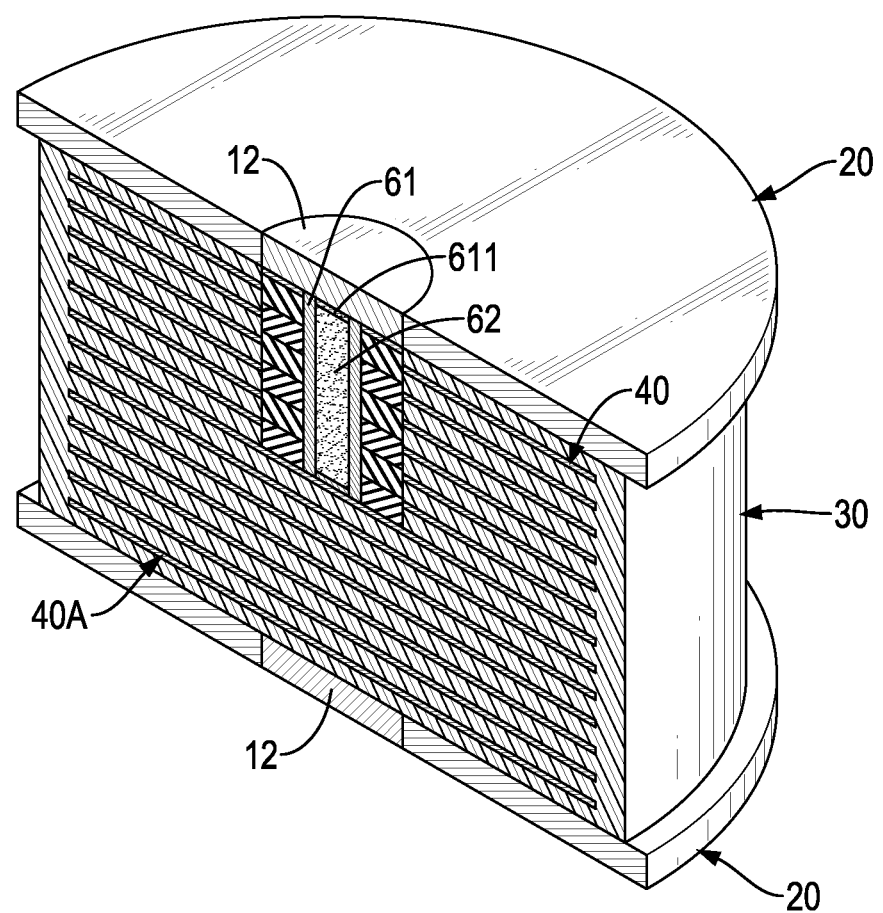
FIG. 60 is a perspective and sectional view of a forty-eighth embodiment of a friction-damping energy absorber in accordance with the present invention.

With reference to FIG. 60, a forty-eighth embodiment of a friction-damping energy absorber in accordance with the present invention is substantially the same as the eighteenth embodiment as shown in FIG. 29 except for the following features. A part of the material layers 30, 40A extends in a bottom half of the core post 10 to hold the sliding sheets 11 in a top half of the core post 10. In addition, the sealed pipe 61 has two sealing caps 611 respectively mounted on the two ends of the sealed pipe 61.

Figure 61:
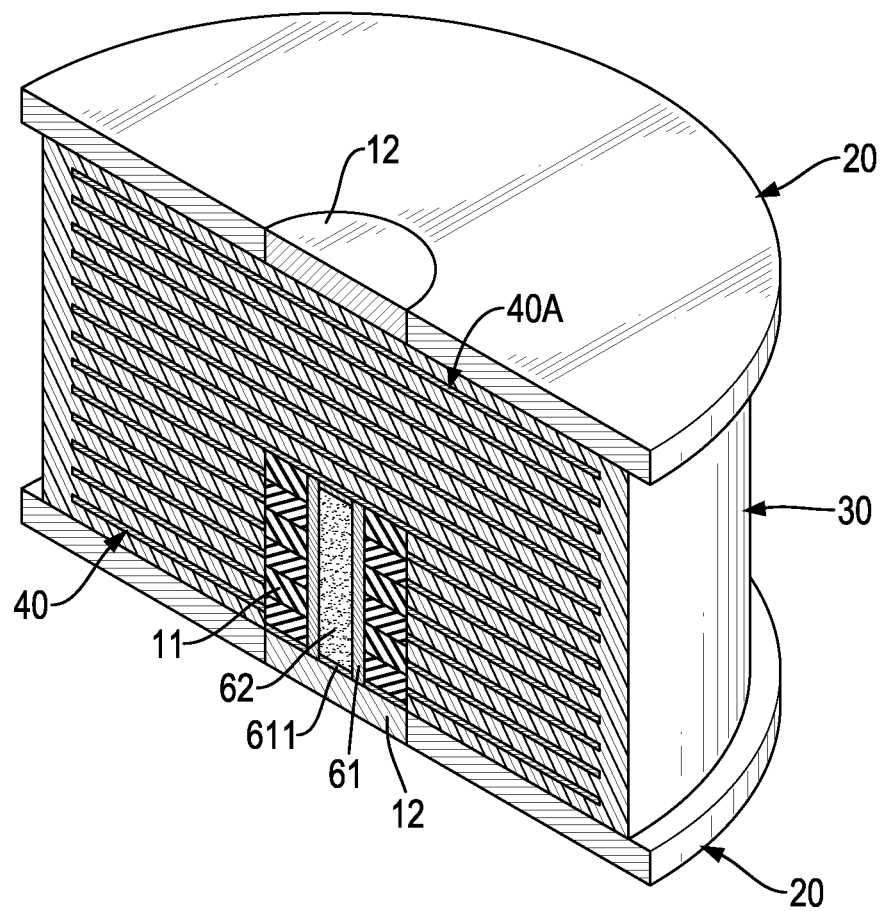
FIG. 61 is a perspective and sectional view of a forty-ninth embodiment of a friction-damping energy absorber in accordance with the present invention.

With reference to FIG. 61, a forty-ninth embodiment of a friction-damping energy absorber in accordance with the present invention is substantially the same as the forty-eighth embodiment as shown in FIG. 60 except for the following features. A part of the material layers 30, 40A extends in a top half of the core post 10 to hold the sliding sheets 11 in a bottom half of the core post 10.

Figure 62:
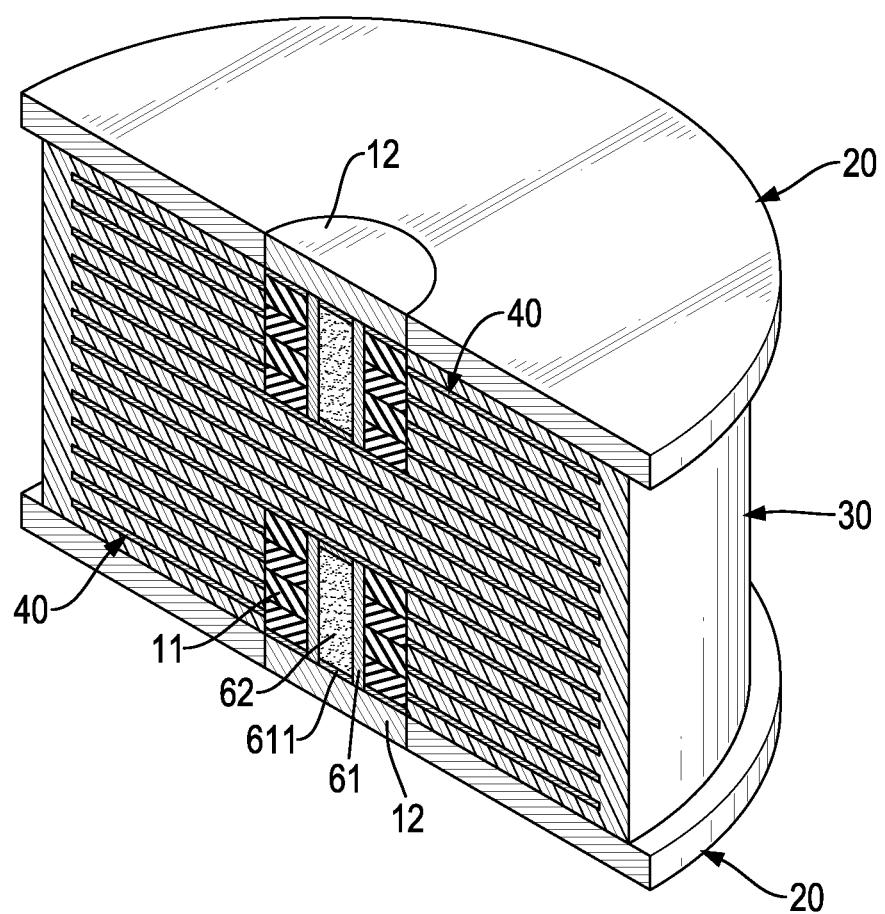
FIG. 62 is a perspective and sectional view of a fiftieth embodiment of a friction-damping energy absorber in accordance with the present invention.

With reference to FIG. 62, a fiftieth embodiment of a friction-damping energy absorber in accordance with the present invention is substantially the same as the forty-eighth embodiment as shown in FIG. 60 except for the following features. A part of the material layers 30, 40A extends in a middle segment of the core post 10 to hold the sliding sheets 11 in a top half and a bottom half of the core post 10.

Figure 63:
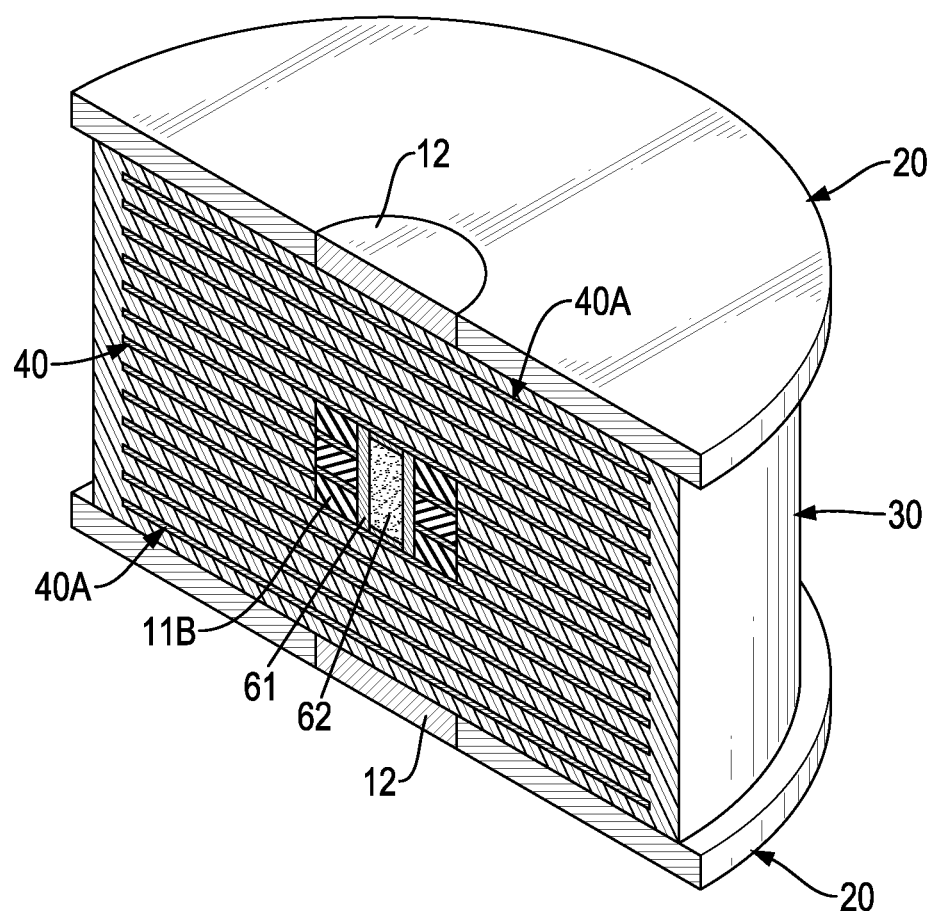
FIG. 63 is a perspective and sectional view of a fifty-first embodiment of a friction-damping energy absorber in accordance with the present invention.

With reference to FIG. 63, a fifty-first embodiment of a friction-damping energy absorber in accordance with the present invention is substantially the same as the forty-eighth embodiment as shown in FIG. 60 except for the following features. A part of the material layers 30, 40A extends in a top half and a bottom half of the core post 10 to hold the sliding sheets 11 in a middle segment of the core post 10 and to enable two adjacent sliding sheets 11A, 11B to have different thicknesses.

Figure 31:
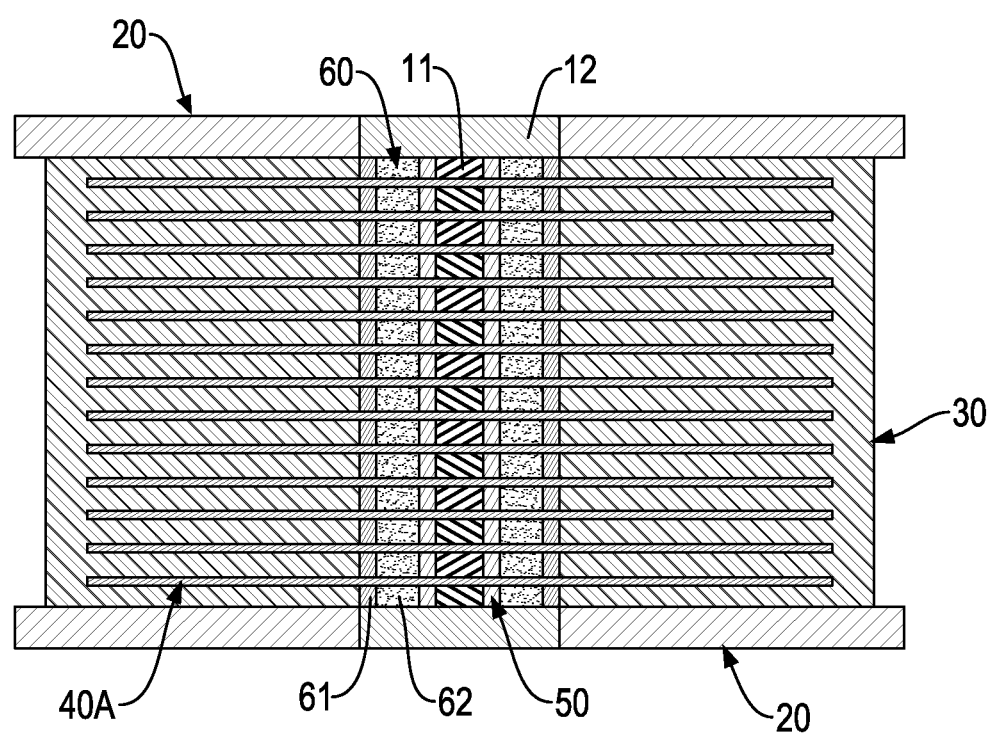
FIG. 31 is a cross sectional side view of a twentieth embodiment of a friction-damping energy absorber in accordance with the present invention.
Figure 32:
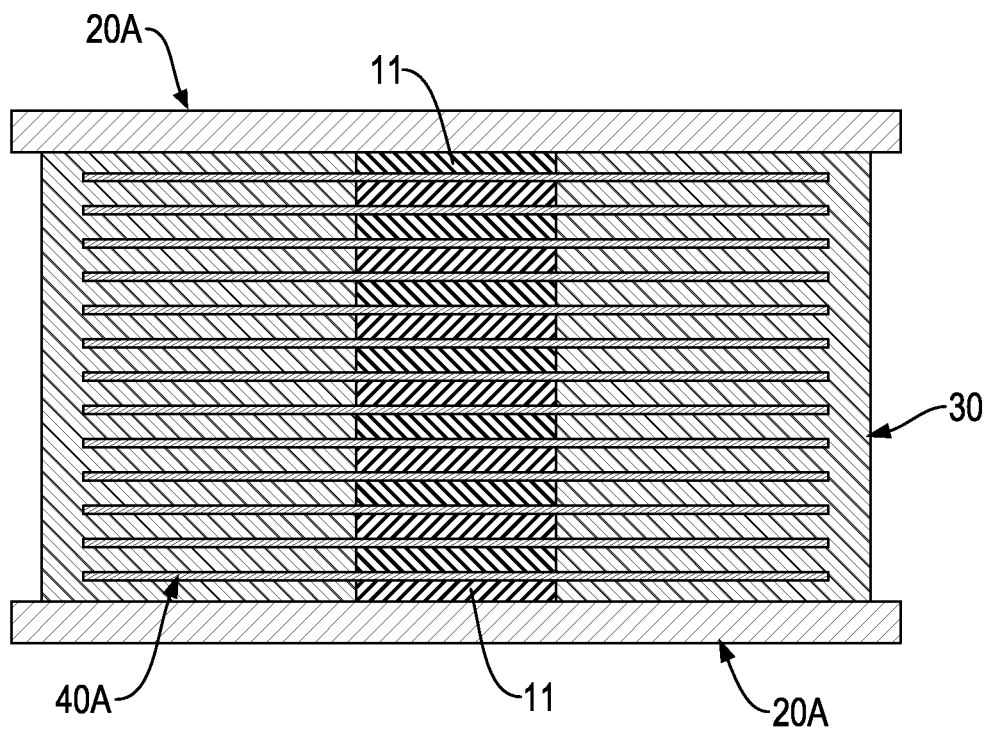
FIG. 32 is a cross sectional side view of a twenty-first embodiment of a friction-damping energy absorber in accordance with the present invention.
Figure 33:
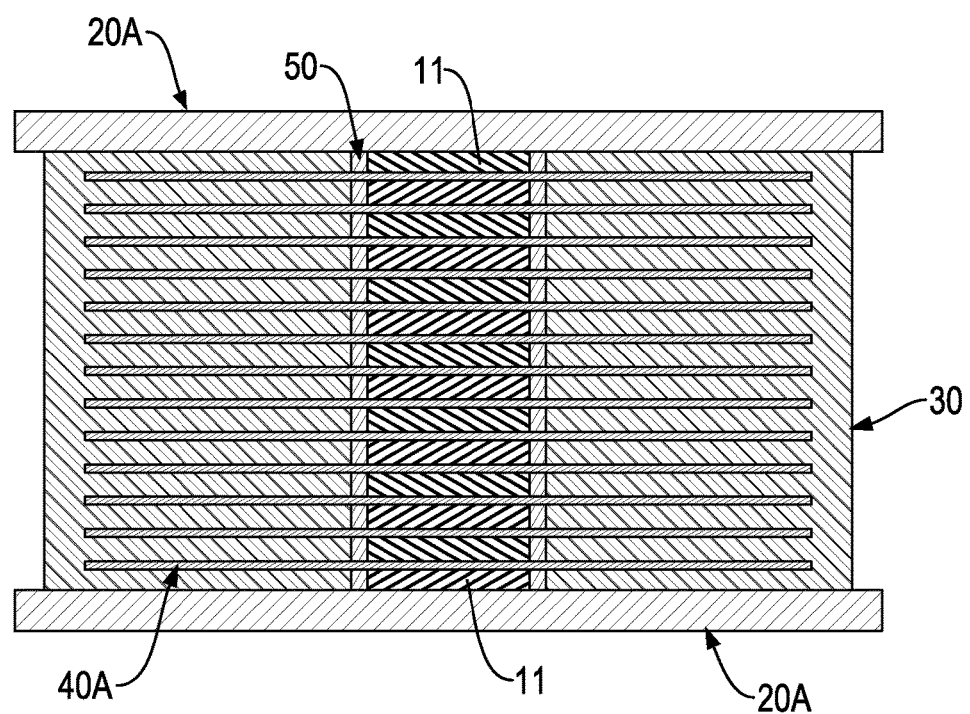
FIG. 33 is a cross sectional side view of a twenty-second embodiment of a friction-damping energy absorber in accordance with the present invention.
Figure 34:
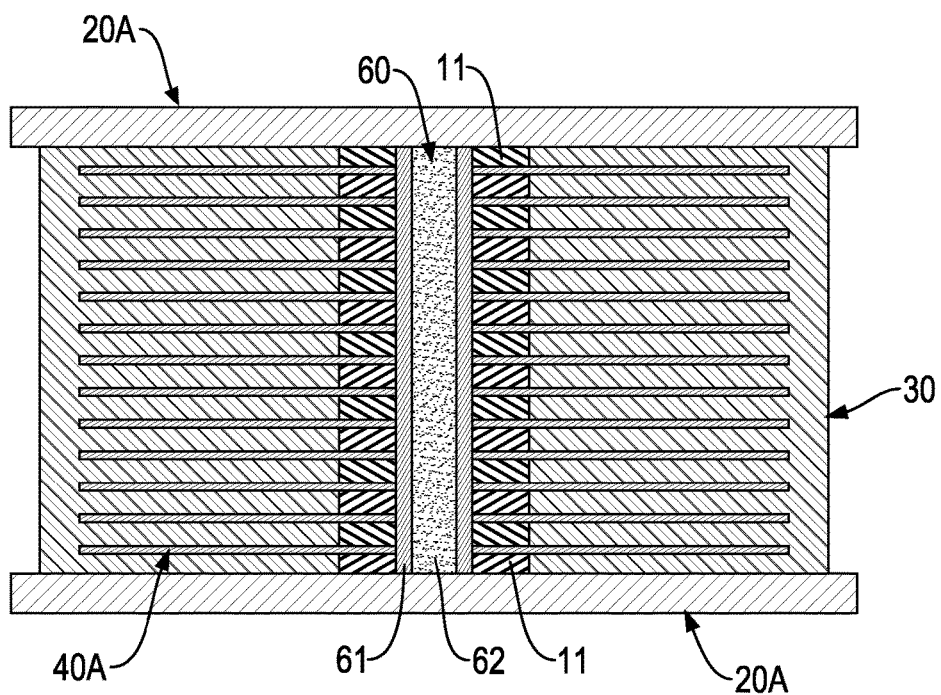
FIG. 34 is a cross sectional side view of a twenty-third embodiment of a friction-damping energy absorber in accordance with the present invention.
Figure 35:
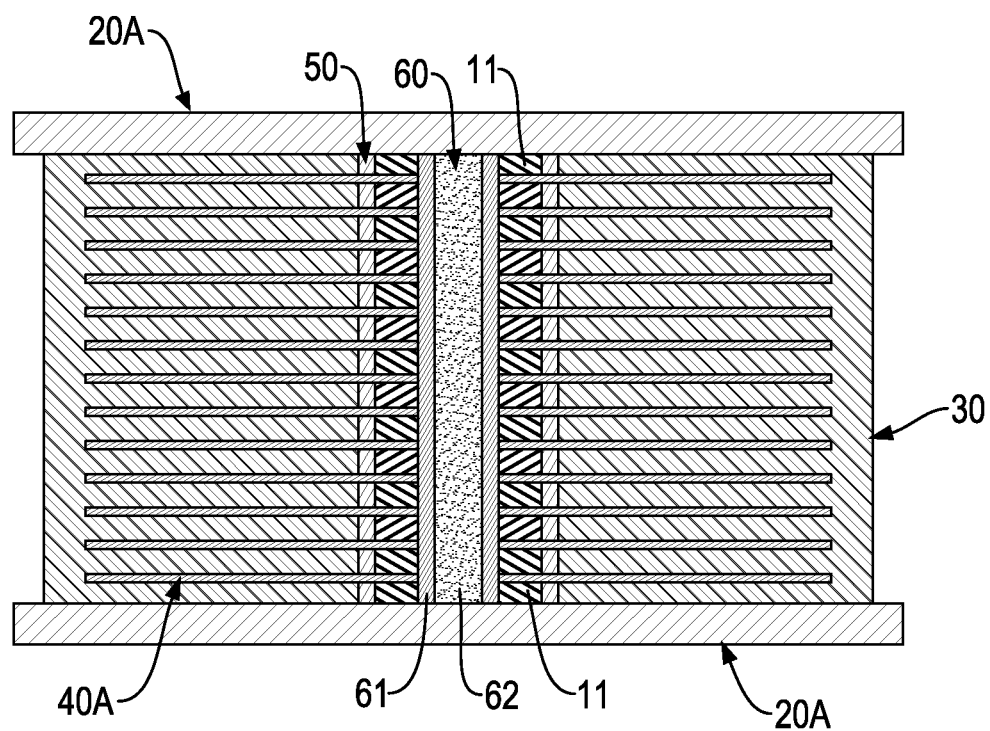
FIG. 35 is a cross sectional side view of a twenty-fourth embodiment of a friction-damping energy absorber in accordance with the present invention.
Figure 36:
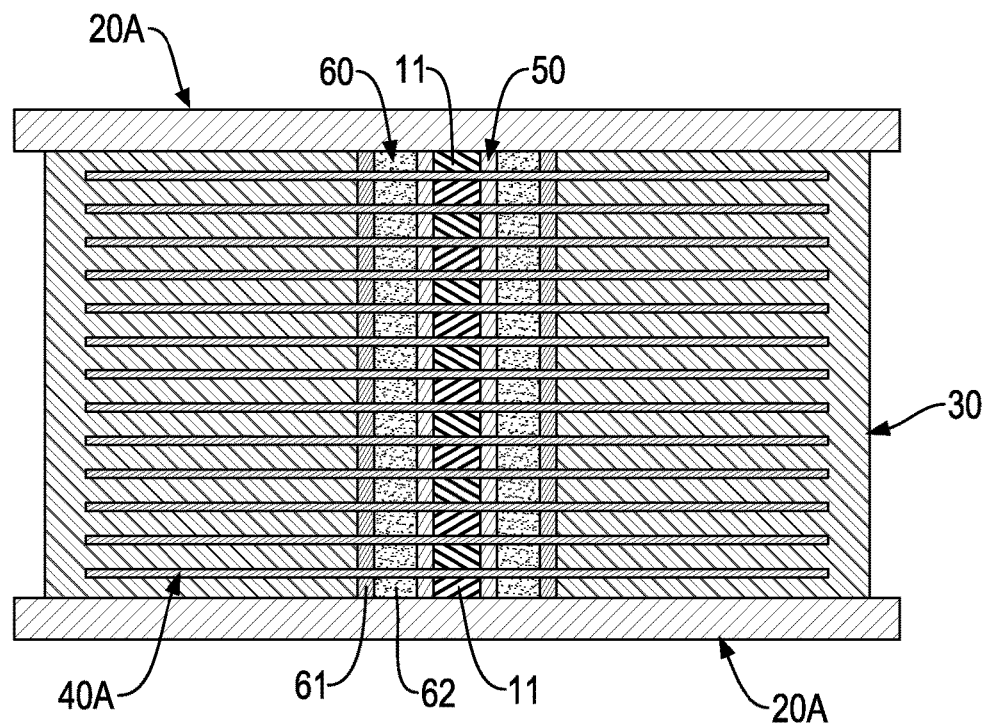
FIG. 36 is a cross sectional side view of a twenty-fifth embodiment of a friction-damping energy absorber in accordance with the present invention.
Figure 64:
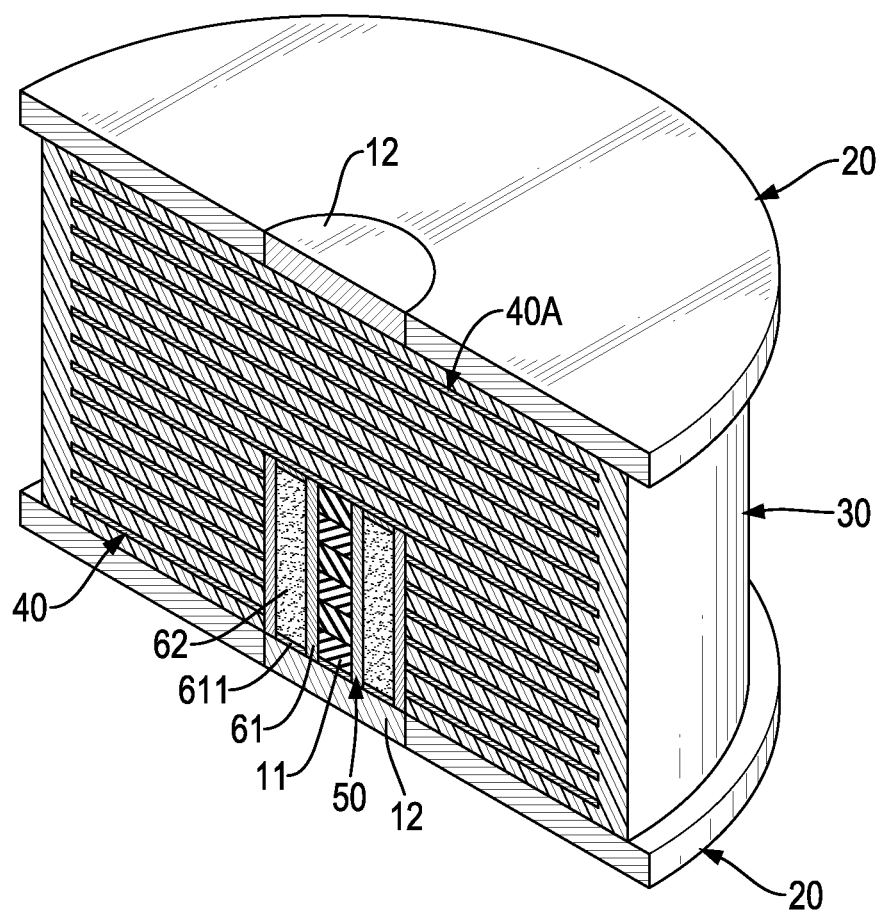
FIG. 64 is a perspective and sectional view of a fifty-second embodiment of a friction-damping energy absorber in accordance with the present invention.

With reference to FIG. 64, a fifty-second embodiment of a friction-damping energy absorber in accordance with the present invention is substantially the same as the twentieth embodiment as shown in FIG. 31 except for the following features. A part of the material layers 30, 40A extends in a top half of the core post 10 to hold the sliding sheets 11 in a bottom half of the core post 10. In addition, the sealed pipe 61 has two sealing caps 611 respectively mounted on the two ends of the sealed pipe 61.

Figure 65:
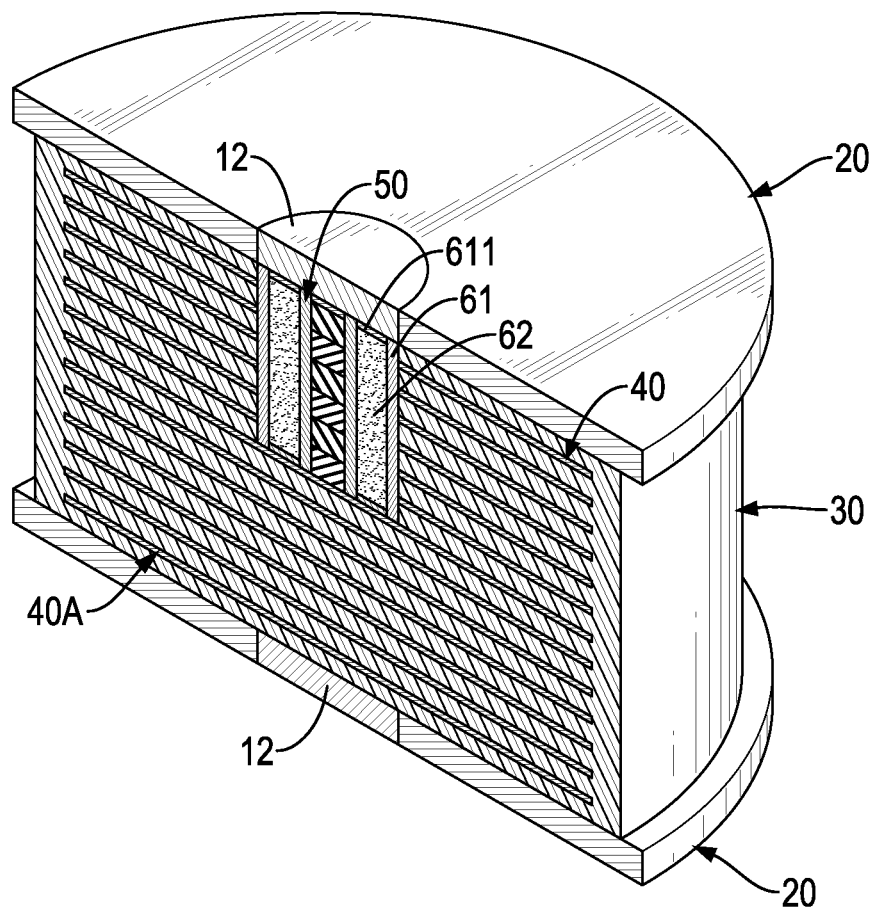
FIG. 65 is a perspective and sectional view of a fifty-third embodiment of a friction-damping energy absorber in accordance with the present invention.

With reference to FIG. 65, a fifty-third embodiment of a friction-damping energy absorber in accordance with the present invention is substantially the same as the fifty-second embodiment as shown in FIG. 64 except for the following features. A part of the material layers 30, 40A extends in a bottom half of the core post 10 to hold the sliding sheets 11 in a top half of the core post 10.

Figure 66:
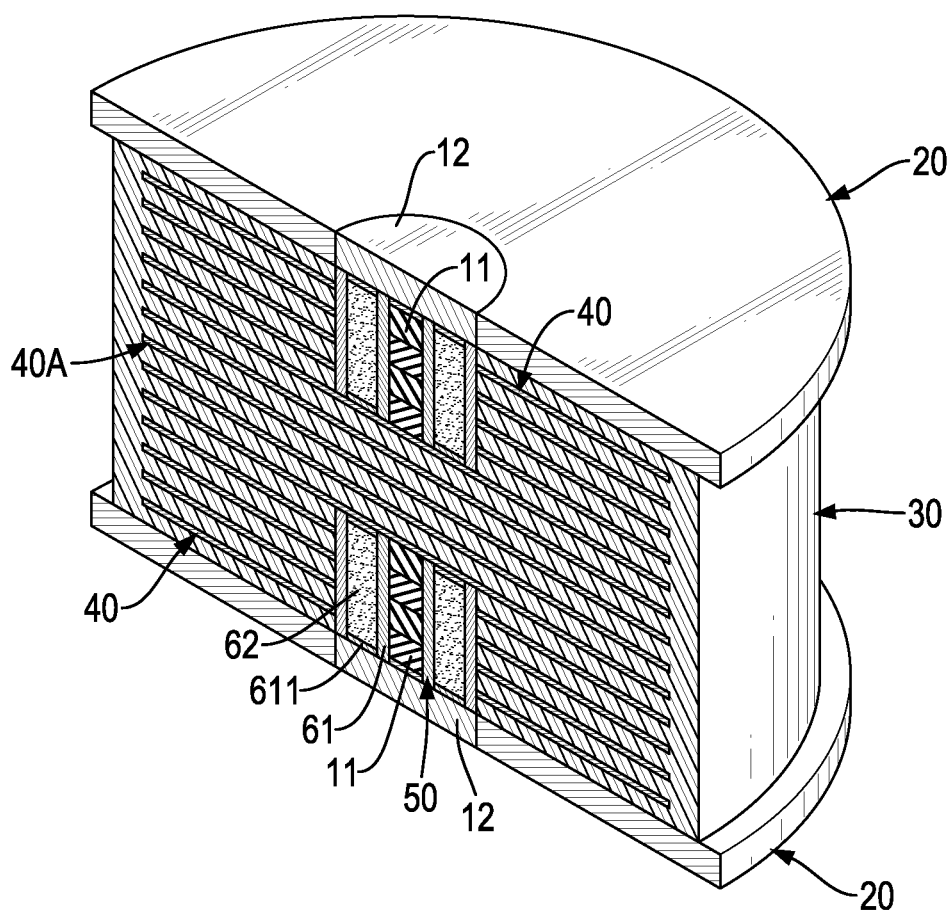
FIG. 66 is a perspective and sectional view of a fifty-fourth embodiment of a friction-damping energy absorber in accordance with the present invention.

With reference to FIG. 66, a fifty-fourth embodiment of a friction-damping energy absorber in accordance with the present invention is substantially the same as the fifty-second embodiment as shown in FIG. 64 except for the following features. A part of the material layers 30, 40A extends in a middle segment of the core post 10 to hold the sliding sheets 11 in a top half and a bottom half of the core post 10.

Figure 67:
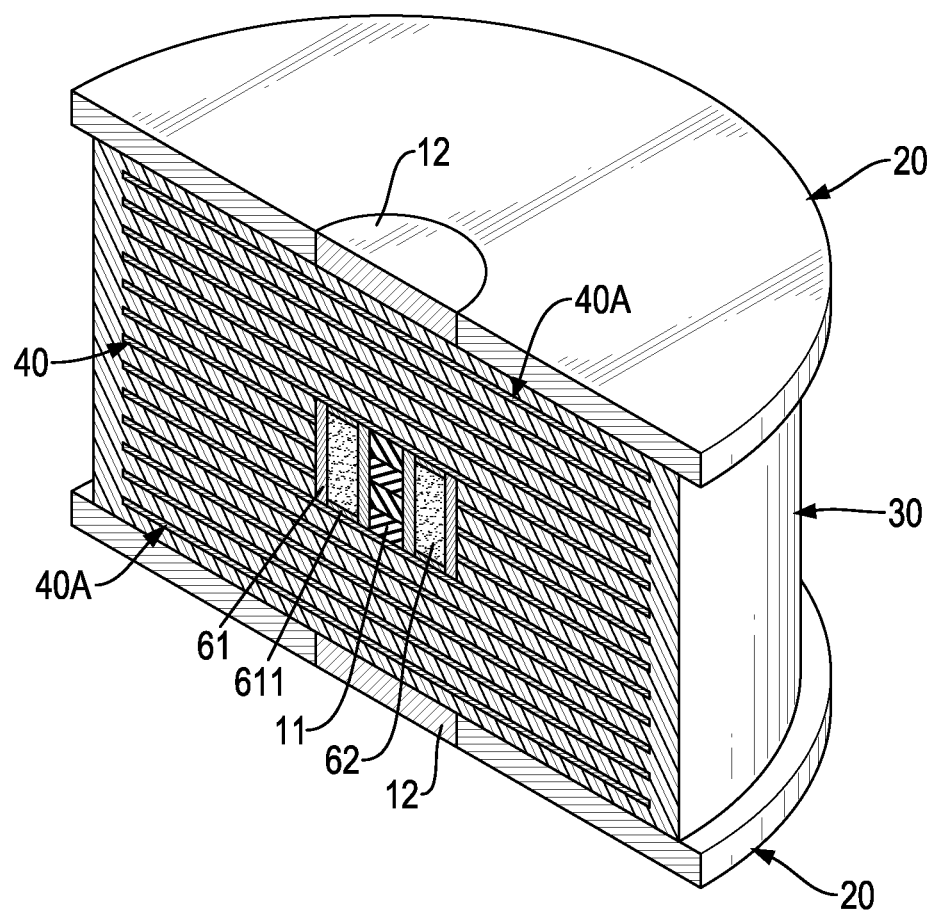
FIG. 67 is a perspective and sectional view of a fifty-fifth embodiment of a friction-damping energy absorber in accordance with the present invention.

With reference to FIG. 67, a fifty-fifth embodiment of a friction-damping energy absorber in accordance with the present invention is substantially the same as the fifty-second embodiment as shown in FIG. 64 except for the following features. A part of the material layers 30, 40A extends in a top half and a bottom half of the core post 10 to hold the sliding sheets 11 in a middle segment of the core post 10.

Figure 68:
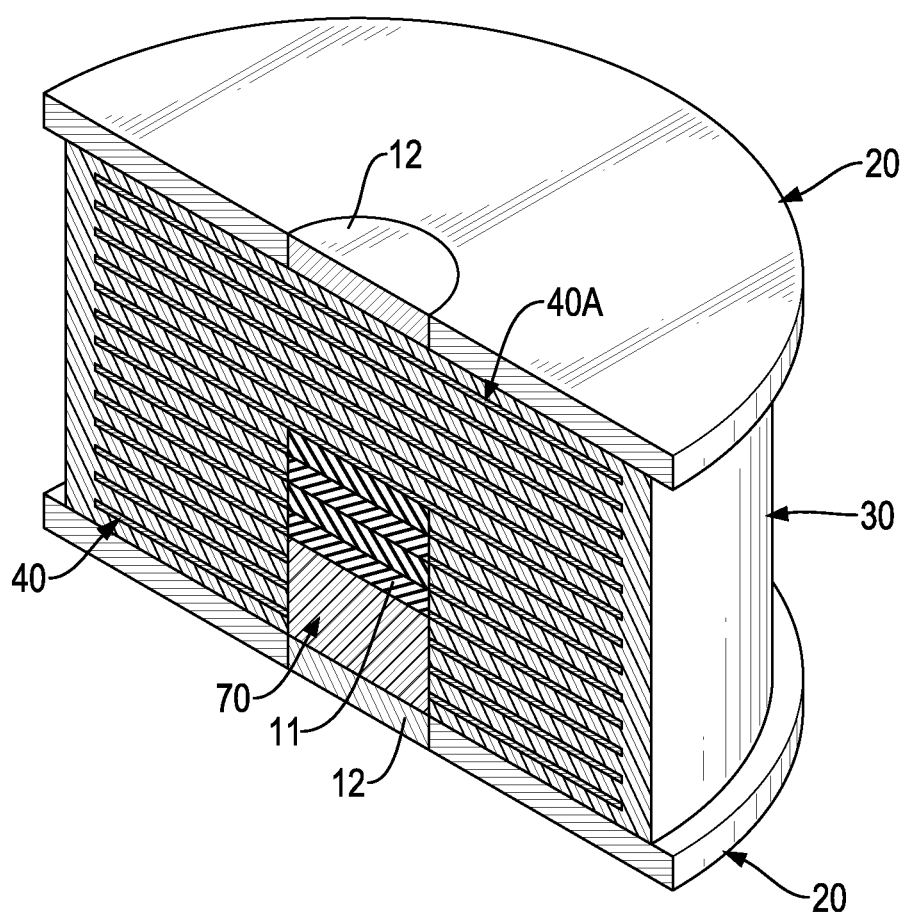
FIG. 68 is a perspective and sectional view of a fifty-sixth embodiment of a friction-damping energy absorber in accordance with the present invention.

With reference to FIG. 68, a fifty-sixth embodiment of a friction-damping energy absorber in accordance with the present invention is substantially the same as the twenty-ninth embodiment as shown in FIG. 41 except for the following features. A part of the material layers 30, 40A extends in a top half of the core post 10 to hold the sliding sheets 11 in a middle segment of the core post 10 between the material layers 30, 40A and the stiffness-adjusting column 70.

Figure 69:
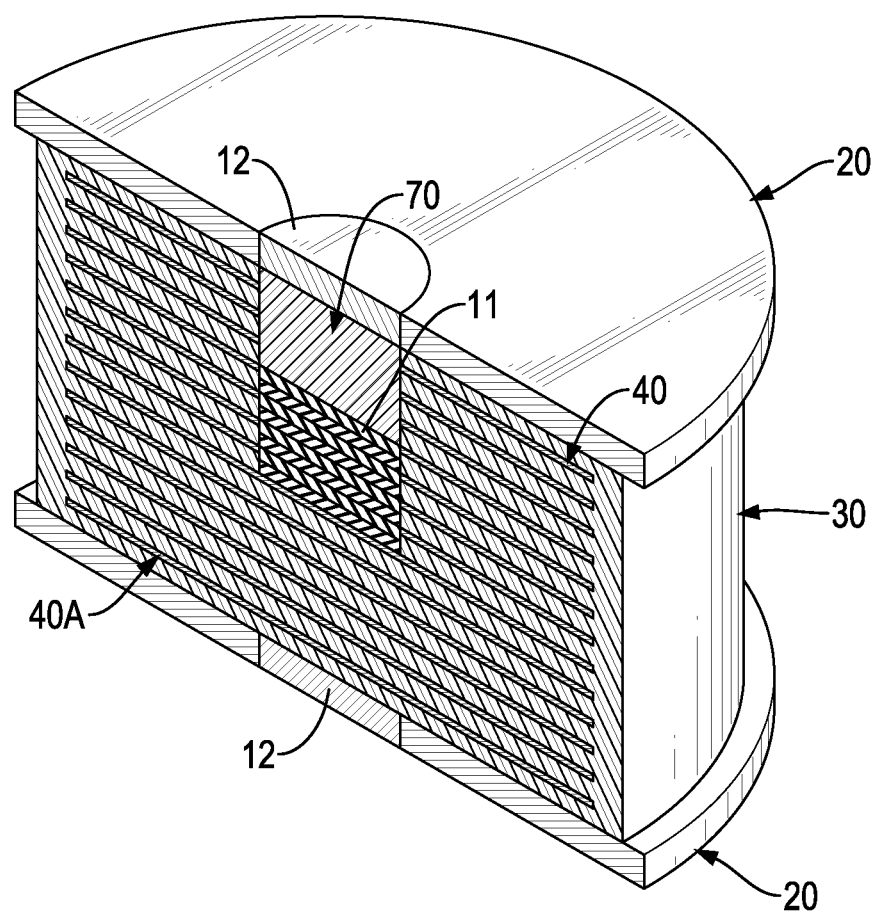
FIG. 69 is a perspective and sectional view of a fifty-seventh embodiment of a friction-damping energy absorber in accordance with the present invention.

With reference to FIG. 69, a fifty-seventh embodiment of a friction-damping energy absorber in accordance with the present invention is substantially the same as the fifty-sixth embodiment as shown in FIG. 68 except for the following features. A part of the material layers 30, 40A extends in a bottom half of the core post 10 to hold the sliding sheets 11 in a middle segment of the core post 10 between the material layers 30, 40A and the stiffness-adjusting column 70.

Figure 70:
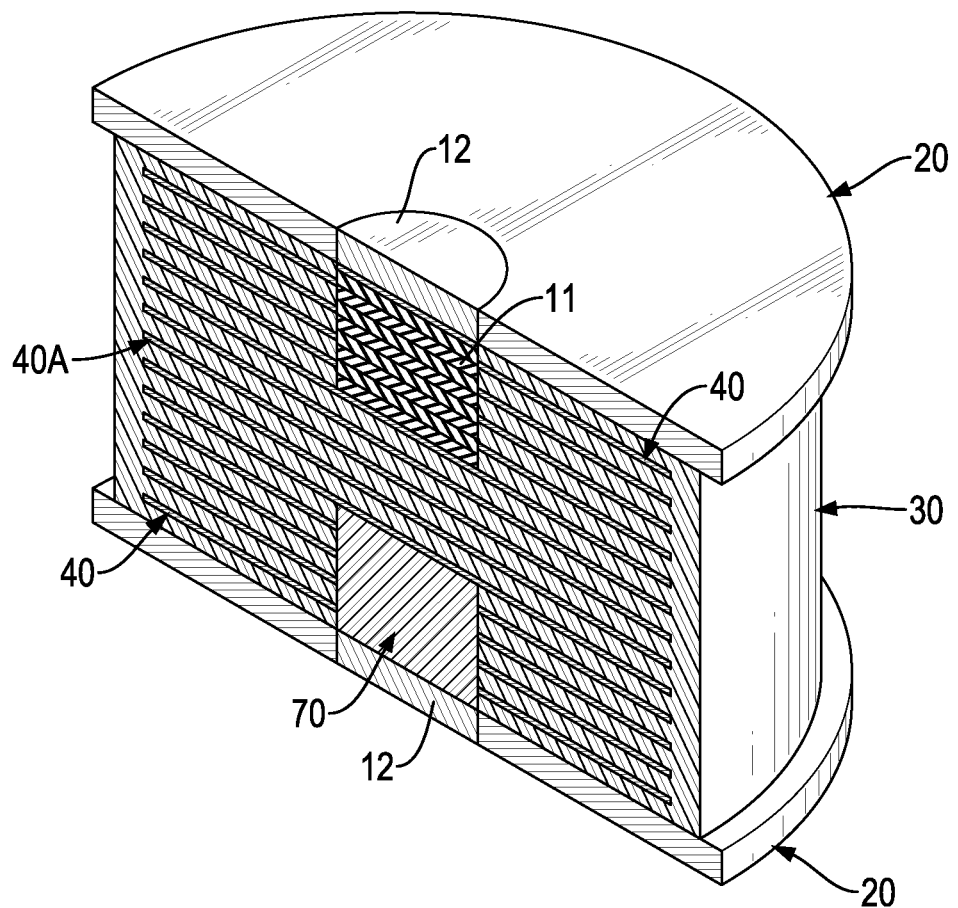
FIG. 70 is a perspective and sectional view of a fifty-eighth embodiment of a friction-damping energy absorber in accordance with the present invention.

With reference to FIG. 70, a fifty-eighth embodiment of a friction-damping energy absorber in accordance with the present invention is substantially the same as the fifty-sixth embodiment as shown in FIG. 68 except for the following features. A part of the material layers 30, 40A extends in a middle segment of the core post 10 to hold the sliding sheets 11 and the stiffness-adjusting column 70 respectively in a top half and a bottom half of the core post 10.

Figure 71:
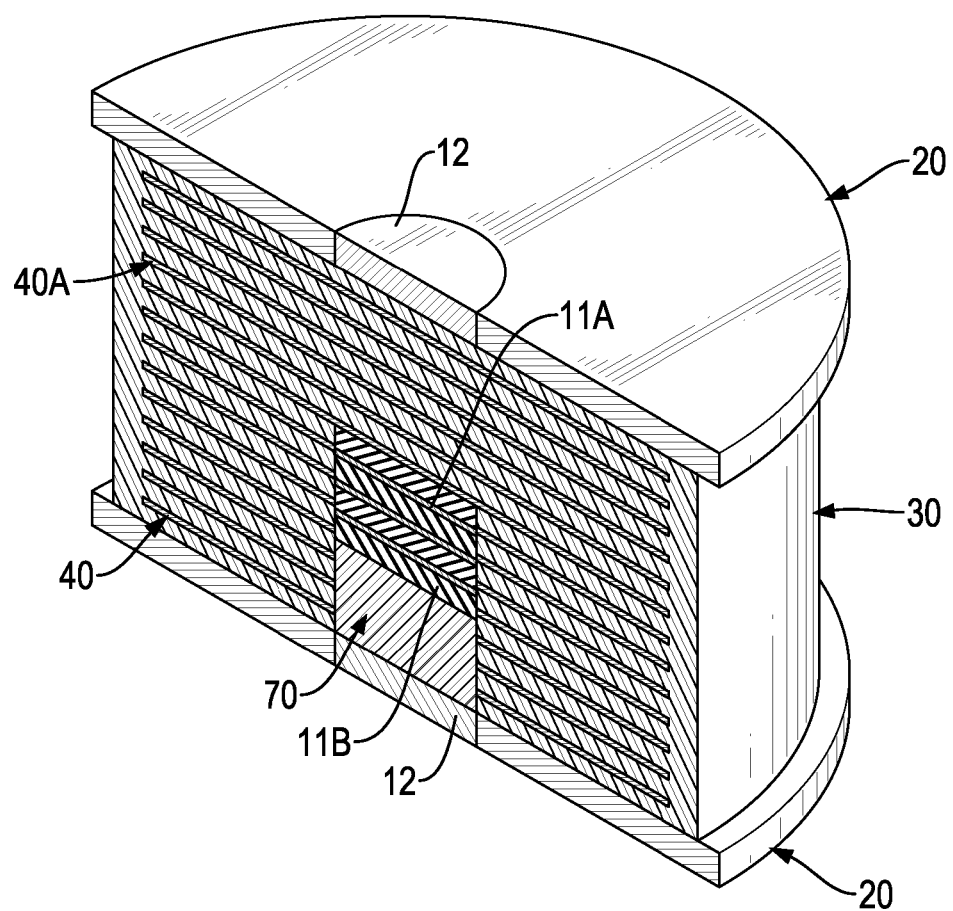
FIG. 71 is a perspective and sectional view of a fifty-ninth embodiment of a friction-damping energy absorber in accordance with the present invention.
Figure 72:
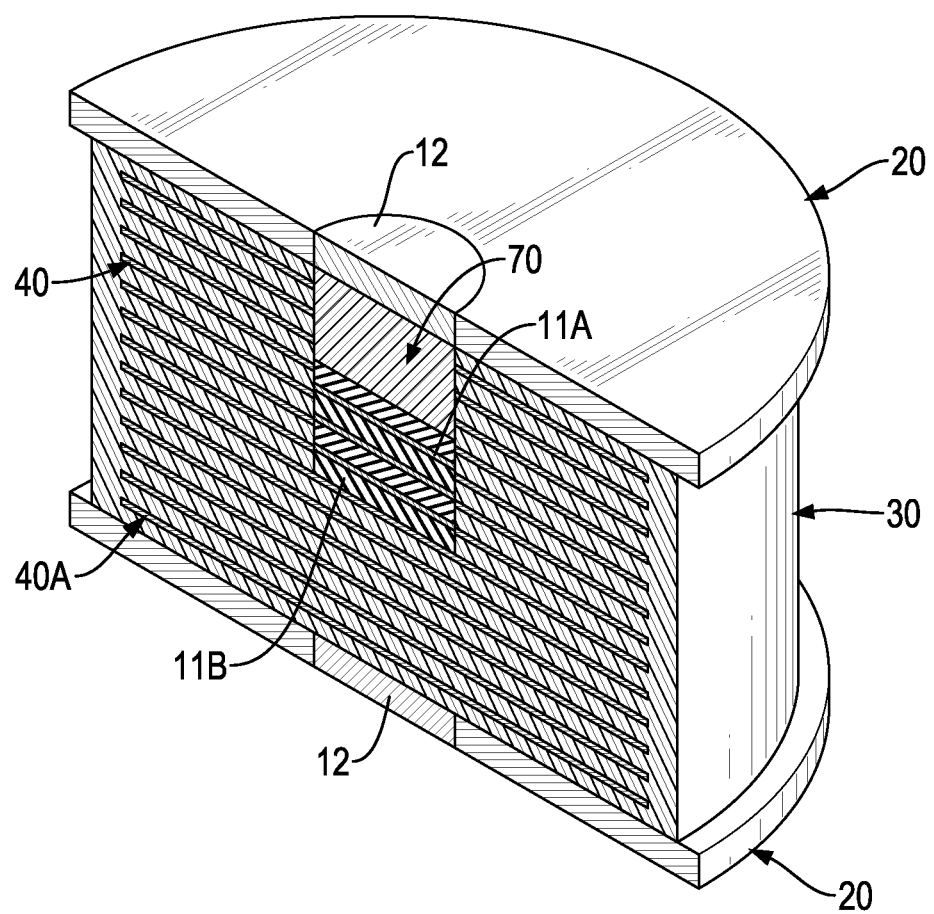
FIG. 72 is a perspective and sectional view of a sixtieth embodiment of a friction-damping energy absorber in accordance with the present invention.
Figure 73:
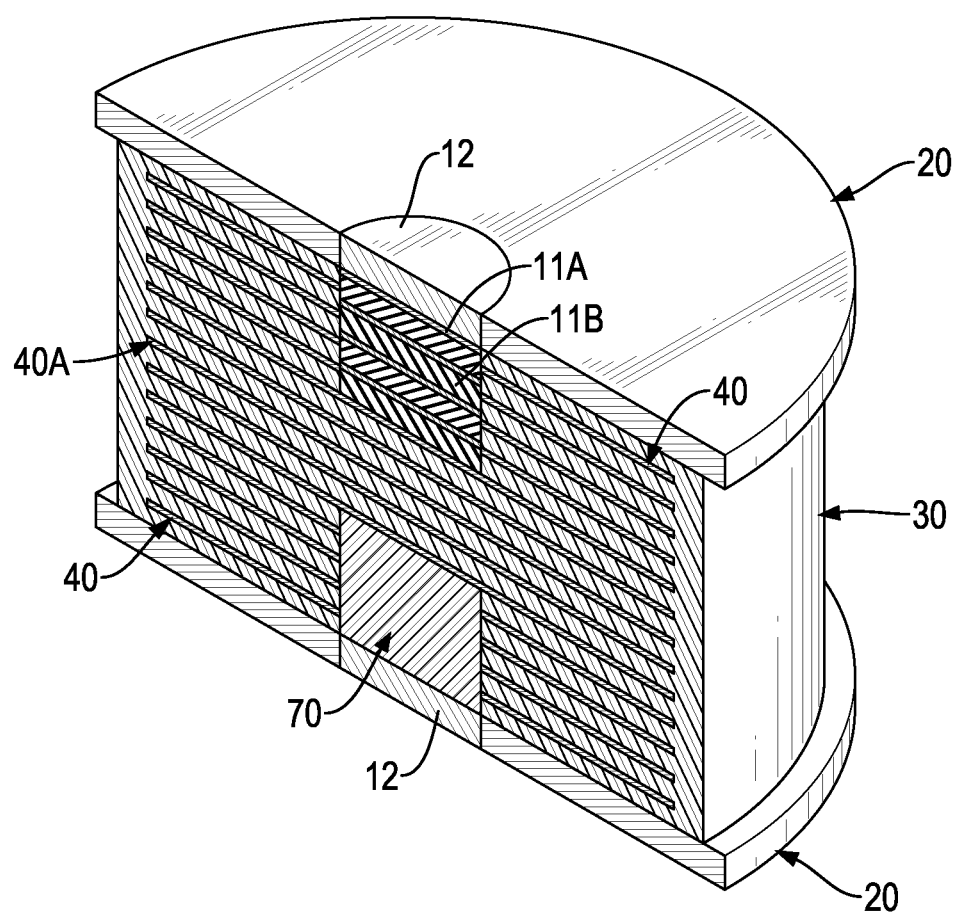
FIG. 73 is a perspective and sectional view of a sixty-first embodiment of a friction-damping energy absorber in accordance with the present invention.

With reference to FIGS. 71, 72, and 73, a fifty-ninth embodiment, a sixtieth embodiment, and a sixty-first embodiment of a friction-damping energy absorber in accordance with the present invention are respectively and substantially the same as the fifty-sixth embodiment, the fifty-seventh embodiment, and the fifty-eighth embodiment as shown in FIGS. 68, 69, and 70 except for the following features. The core post 10 has multiple sliding sheets 11A, 11B with two different thicknesses mounted in a bottom half of the core post 10 to enable two adjacent sliding sheets 11A, 11B to have different thicknesses.

Figure 74:
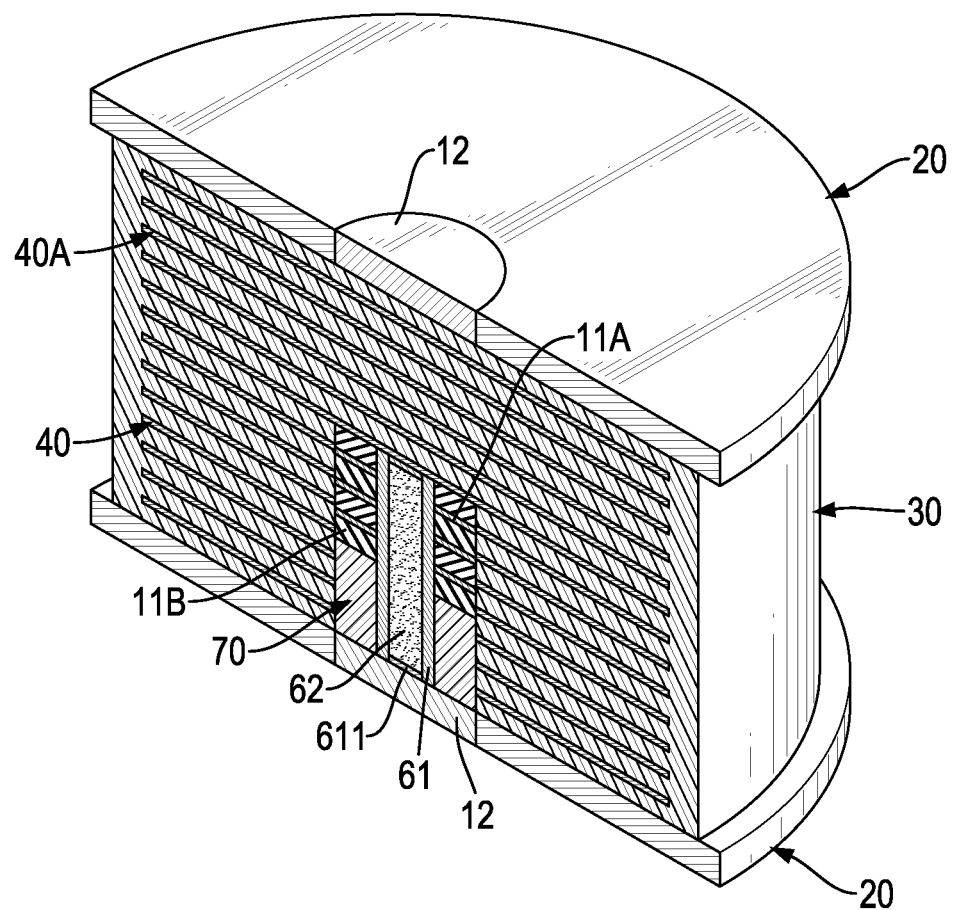
FIG. 74 is a perspective and sectional view of a sixty-second embodiment of a friction-damping energy absorber in accordance with the present invention.

With reference to FIG. 74, a sixty-second embodiment of a friction-damping energy absorber in accordance with the present invention is substantially the same as the thirty-second embodiment as shown in FIG. 44 except for the following features. A part of the material layers 30, 40A extends in a top half of the core post 10 to hold the sliding sheets 11 in a middle segment of the core post 10 between the material layers 30, 40A and the stiffness-adjusting column 70. In addition, the core post 10 has multiple sliding sheets 11A, 11B with two different thicknesses mounted in a bottom half of the core post 10 to enable two adjacent sliding sheets 11A, 11B to have different thicknesses.

Figure 75:
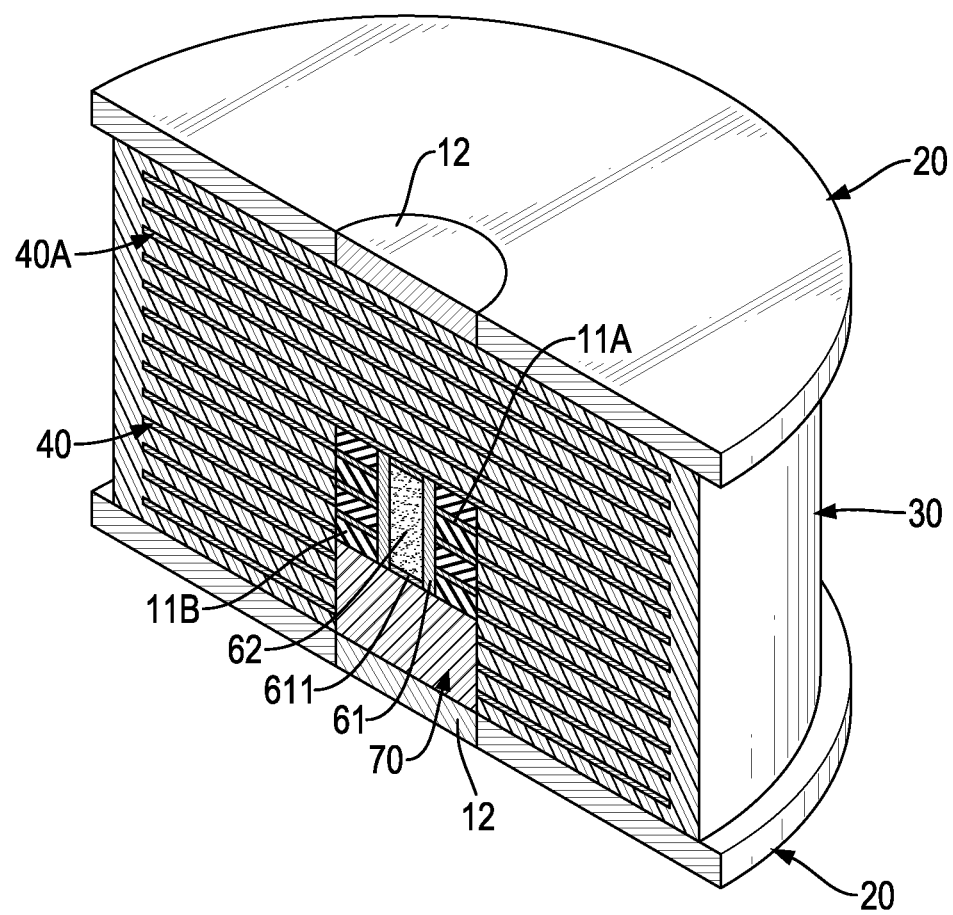
FIG. 75 is a perspective and sectional view of a sixty-third embodiment of a friction-damping energy absorber in accordance with the present invention.

With reference to FIG. 75, a sixty-third embodiment of a friction-damping energy absorber in accordance with the present invention is substantially the same as the sixty-second embodiment as shown in FIG. 74 except for the following features. The cooling module 60 is mounted between the sliding sheets 11A, 11B without extending in the stiffness-adjusting column 70.

Figure 76:
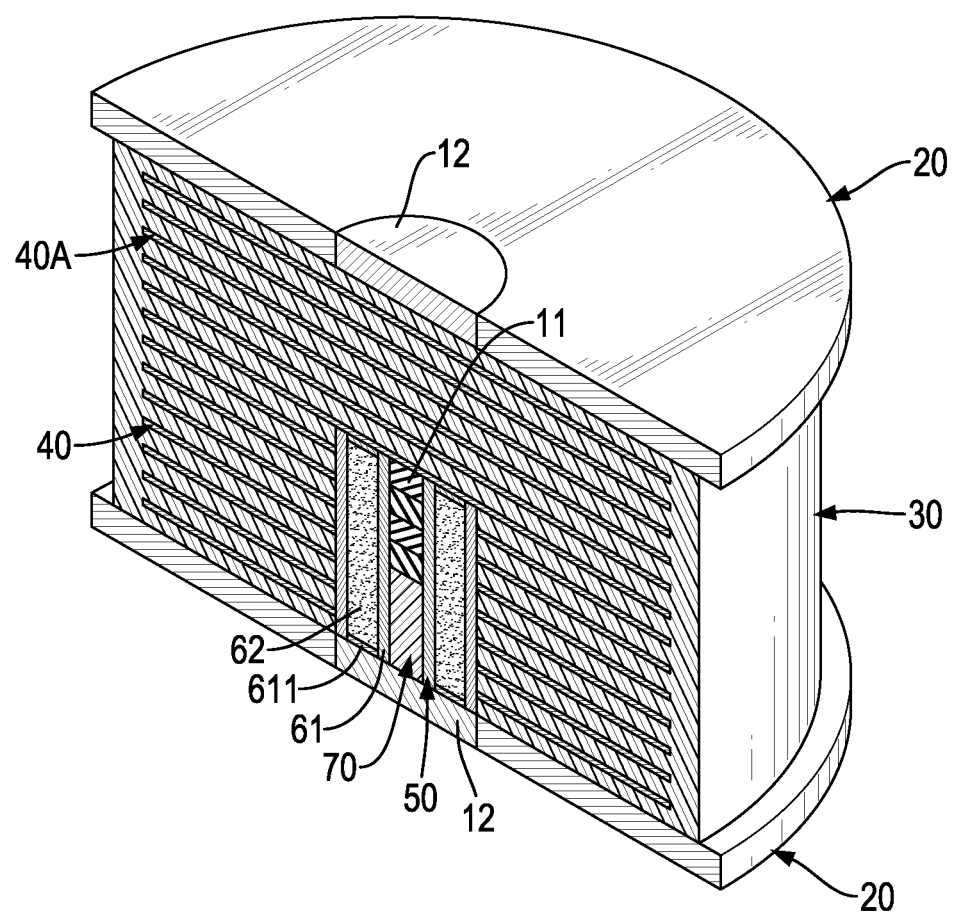
FIG. 76 is a perspective and sectional view of a sixty-fourth embodiment of a friction-damping energy absorber in accordance with the present invention.

With reference to FIG. 76, a sixty-fourth embodiment of a friction-damping energy absorber in accordance with the present invention is substantially the same as the thirty-seventh embodiment as shown in FIG. 49 except for the following features. A part of the material layers 30, 40A extends in a top half of the core post 10 to hold the sliding sheets 11 in a middle segment of the core post 10 between the material layers 30, 40A and the stiffness-adjusting column 70.

Figure 77:
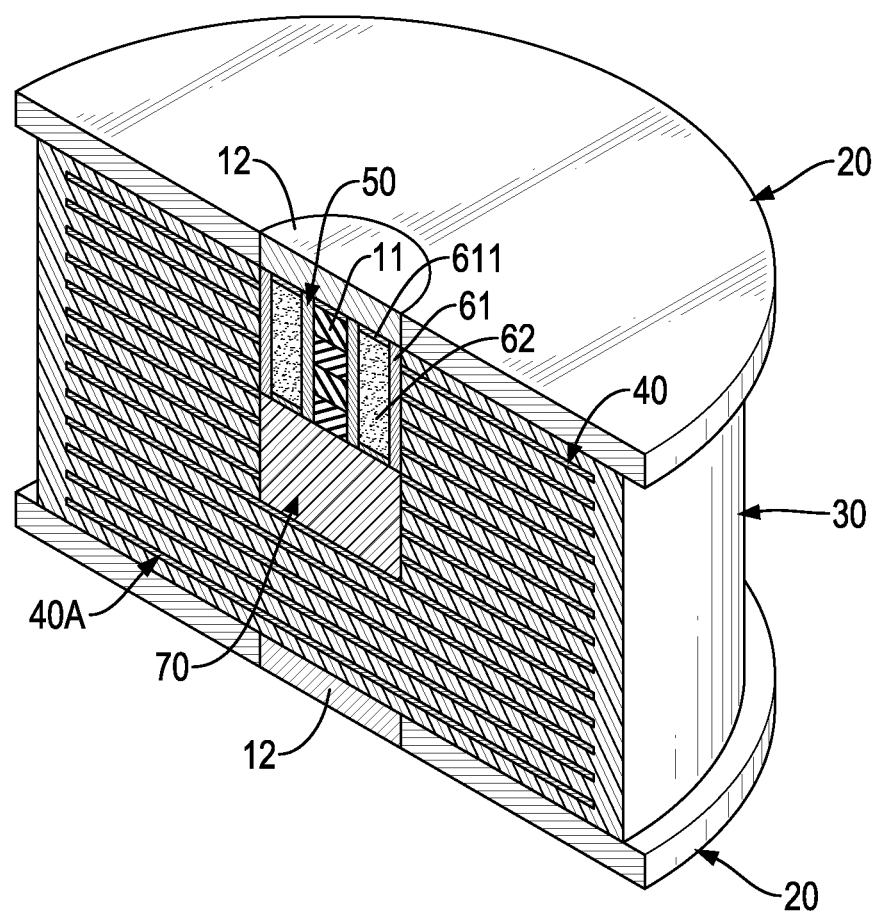
FIG. 77 is a perspective and sectional view of a sixty-fifth embodiment of a friction-damping energy absorber in accordance with the present invention.

With reference to FIG. 77, a sixty-fifth embodiment of a friction-damping energy absorber in accordance with the present invention is substantially the same as the sixty-third embodiment as shown in FIG. 75 except for the following features. A part of the material layers 30, 40A extends in a bottom half of the core post 10 to hold the sliding sheets 11 in a top half of the core post 10 above the stiffness-adjusting column 70.

Figure 78:
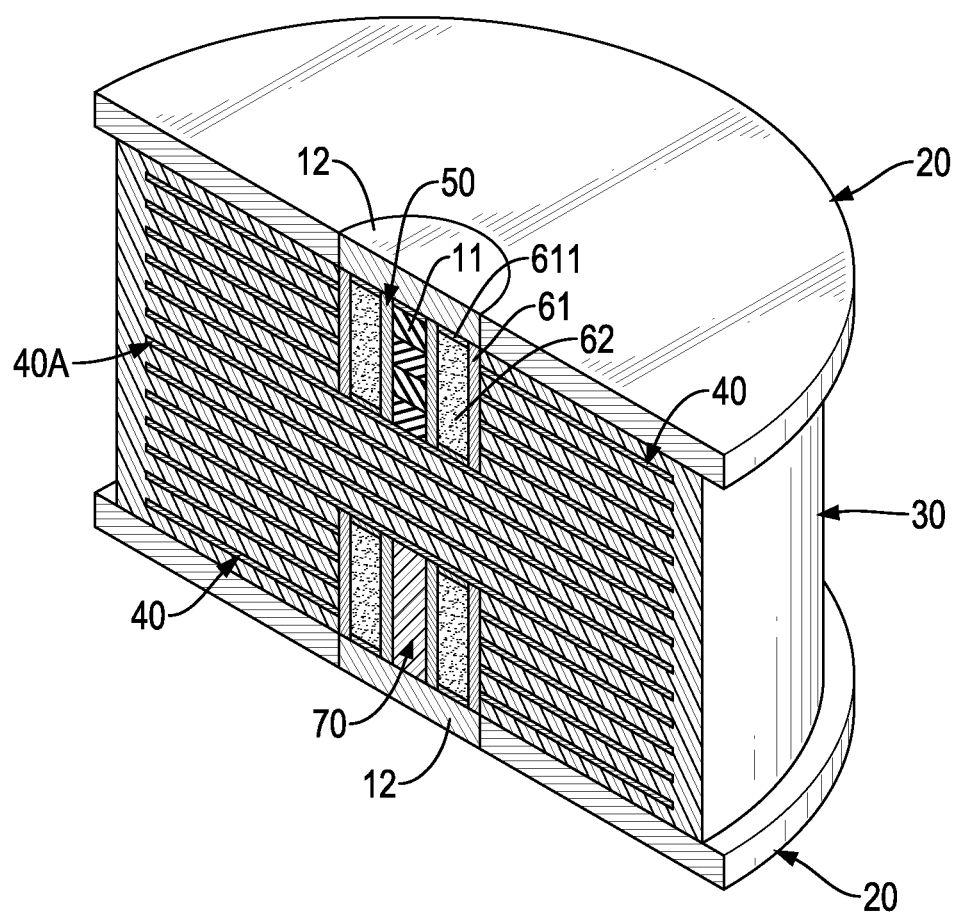
FIG. 78 is a perspective and sectional view of a sixty-sixth embodiment of a friction-damping energy absorber in accordance with the present invention.
Figure 79:
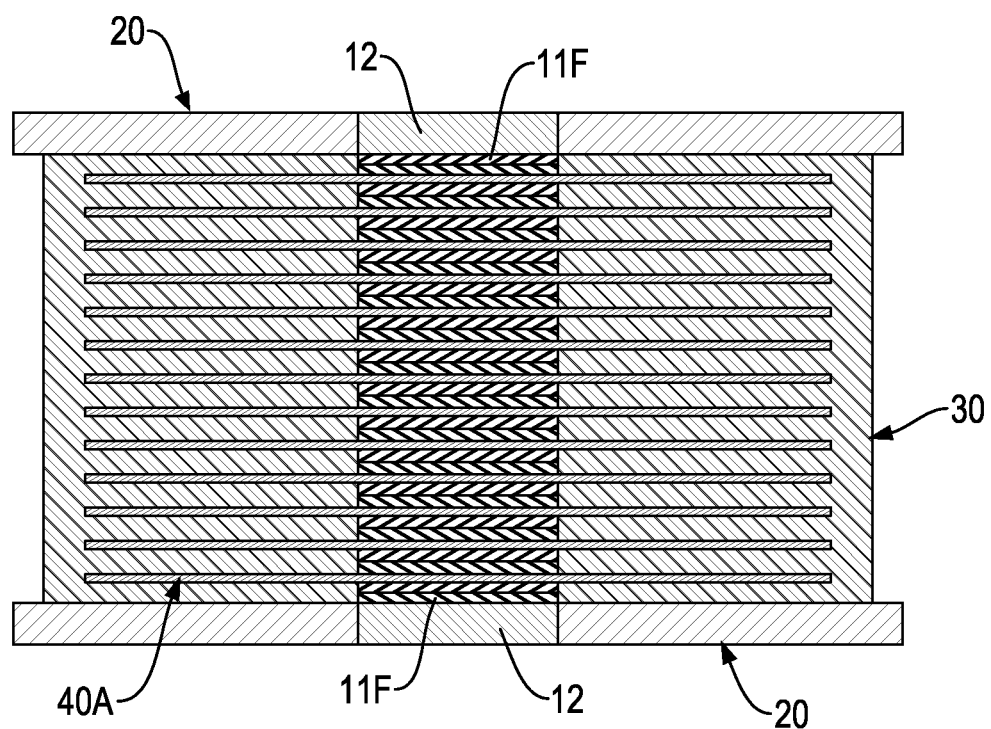
FIG. 79 is a cross sectional side view of a sixty-seventh embodiment of a friction-damping energy absorber in accordance with the present invention.
Figure 80:
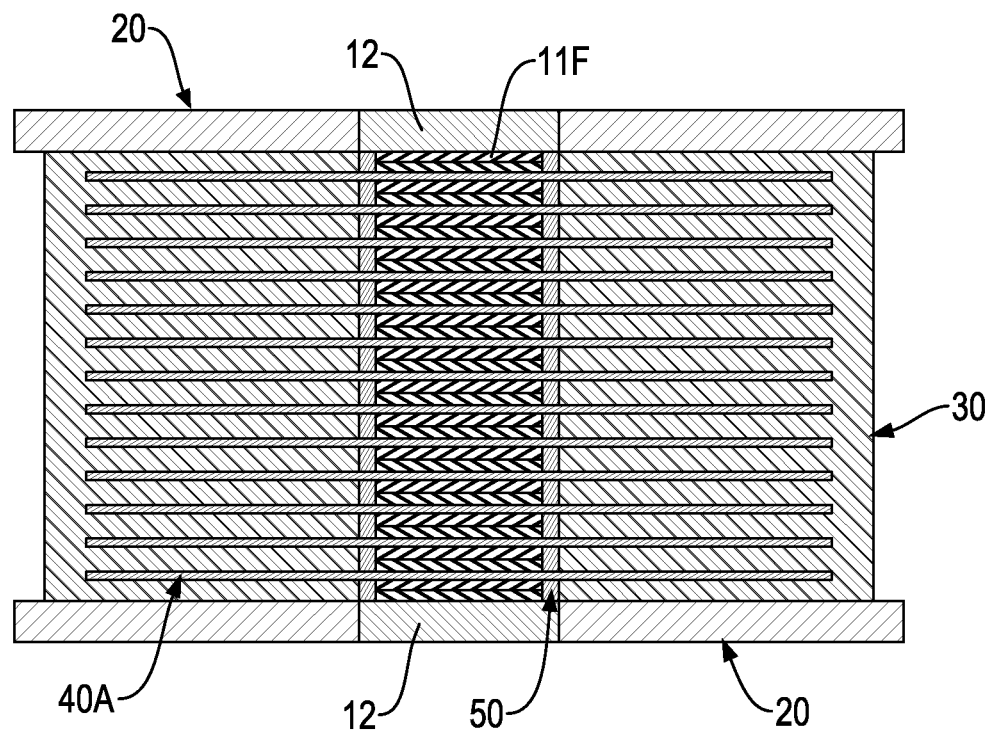
FIG. 80 is a cross sectional side view of a sixty-eighth embodiment of a friction-damping energy absorber in accordance with the present invention.
Figure 81:
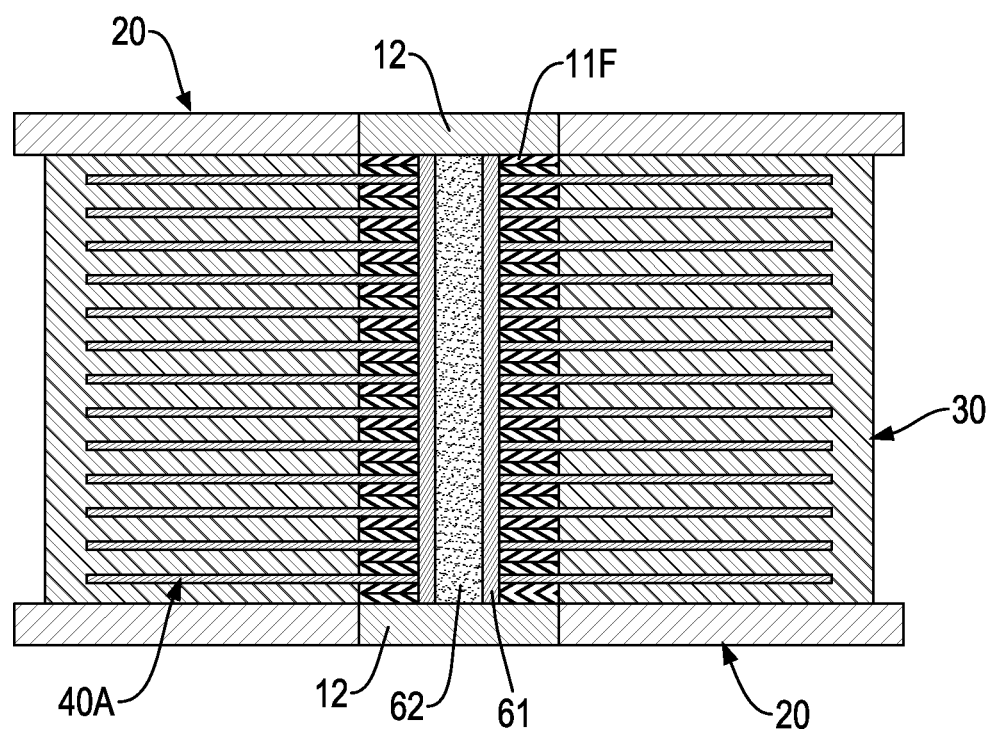
FIG. 81 is a cross sectional side view of a sixty-ninth embodiment of a friction-damping energy absorber in accordance with the present invention.
Figure 82:
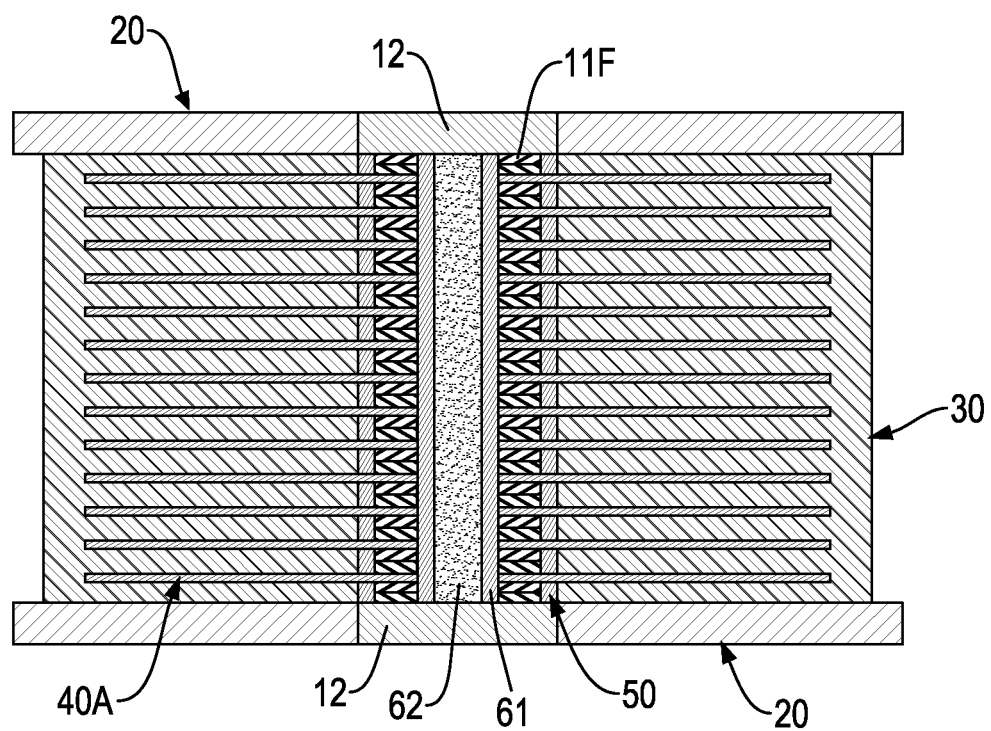
FIG. 82 is a cross sectional side view of a seventieth embodiment of a friction-damping energy absorber in accordance with the present invention.
Figure 83:
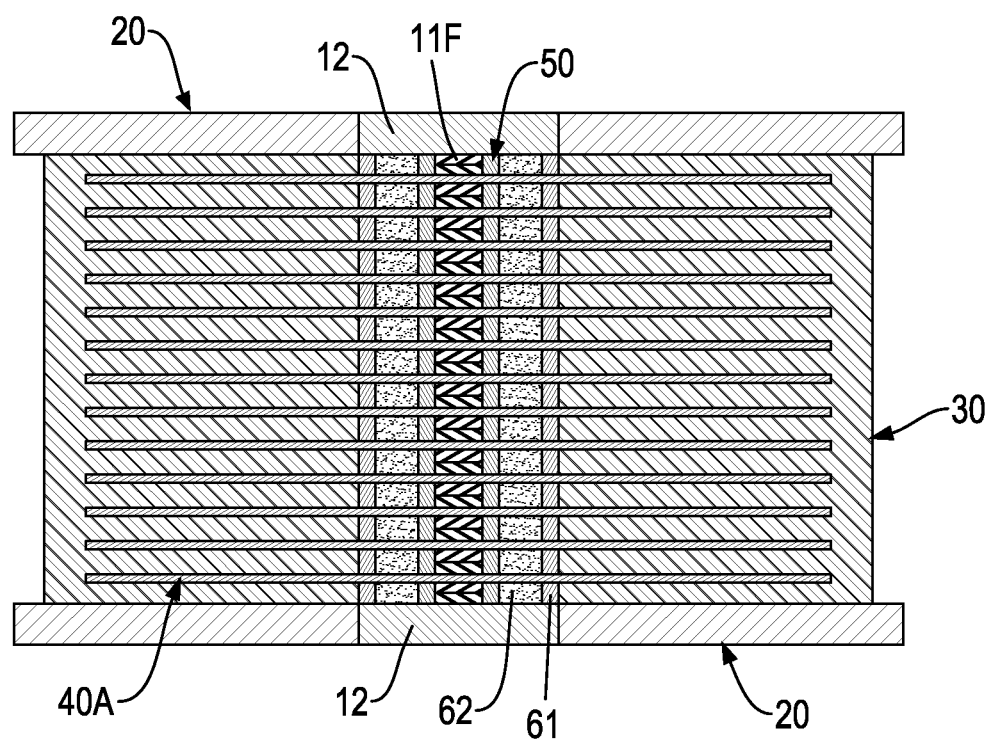
FIG. 83 is a cross sectional side view of a seventy-first embodiment of a friction-damping energy absorber in accordance with the present invention.
Figure 84:
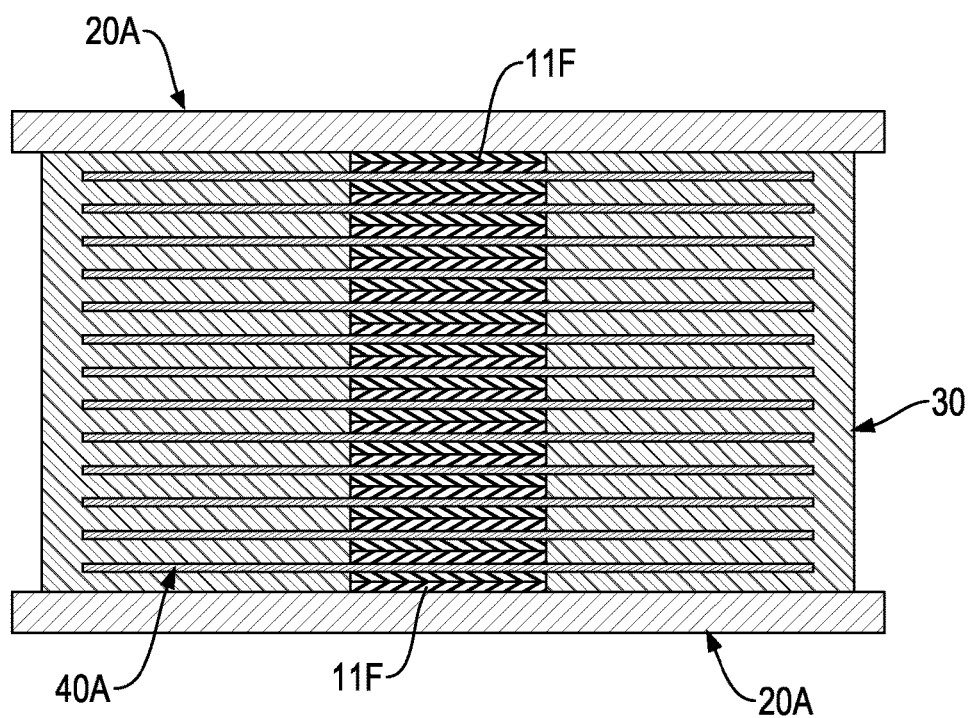
FIG. 84 is a cross sectional side view of a seventy-second embodiment of a friction-damping energy absorber in accordance with the present invention.
Figure 85:
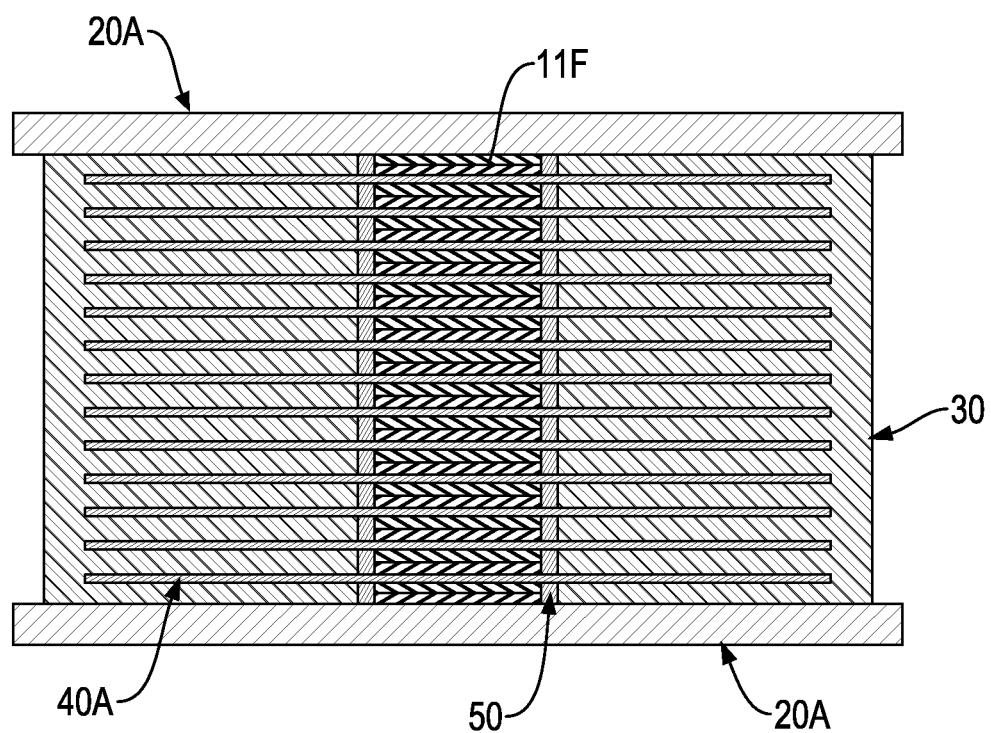
FIG. 85 is a cross sectional side view of a seventy-third embodiment of a friction-damping energy absorber in accordance with the present invention.
Figure 86:
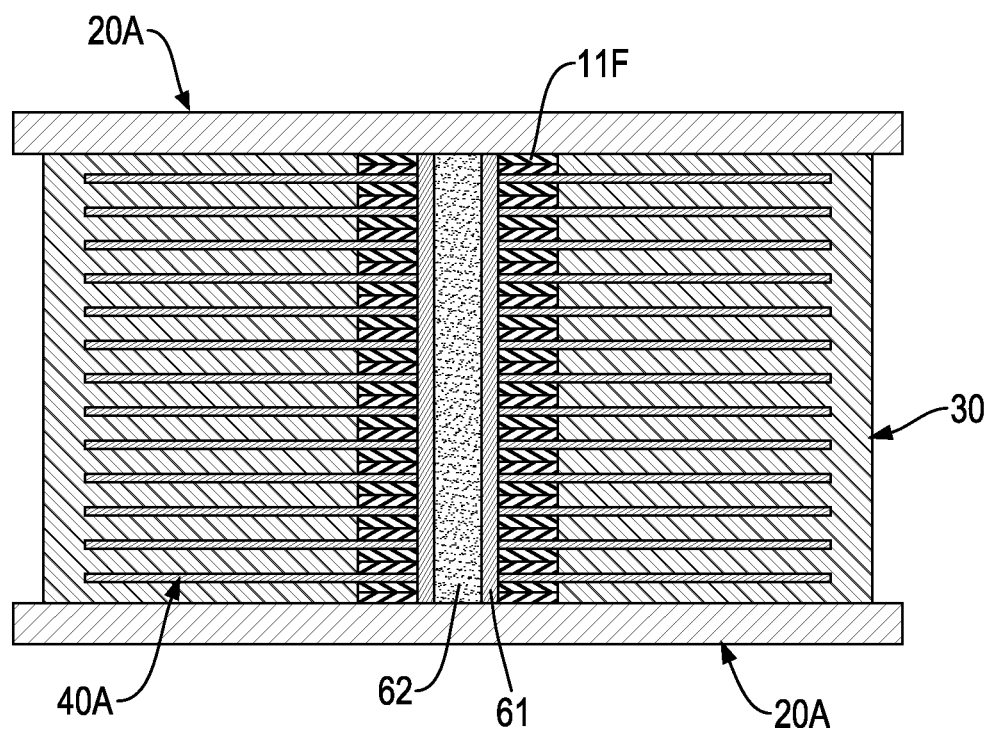
FIG. 86 is a cross sectional side view of a seventy-fourth embodiment of a friction-damping energy absorber in accordance with the present invention.
Figure 87:
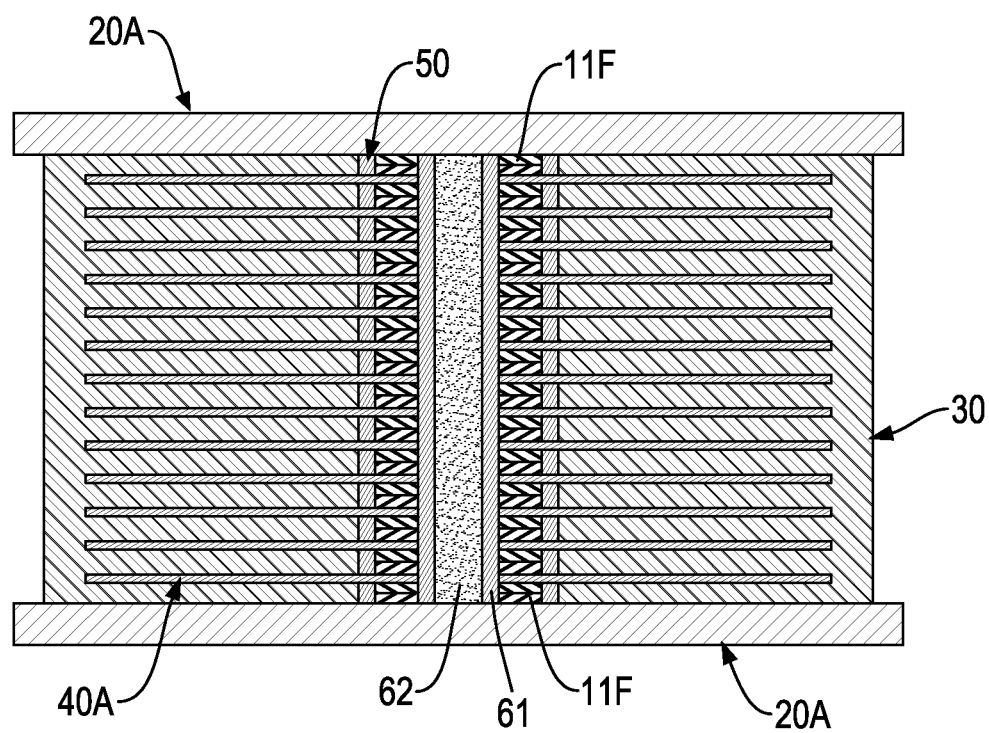
FIG. 87 is a cross sectional side view of a seventy-fifth embodiment of a friction-damping energy absorber in accordance with the present invention.
Figure 88:
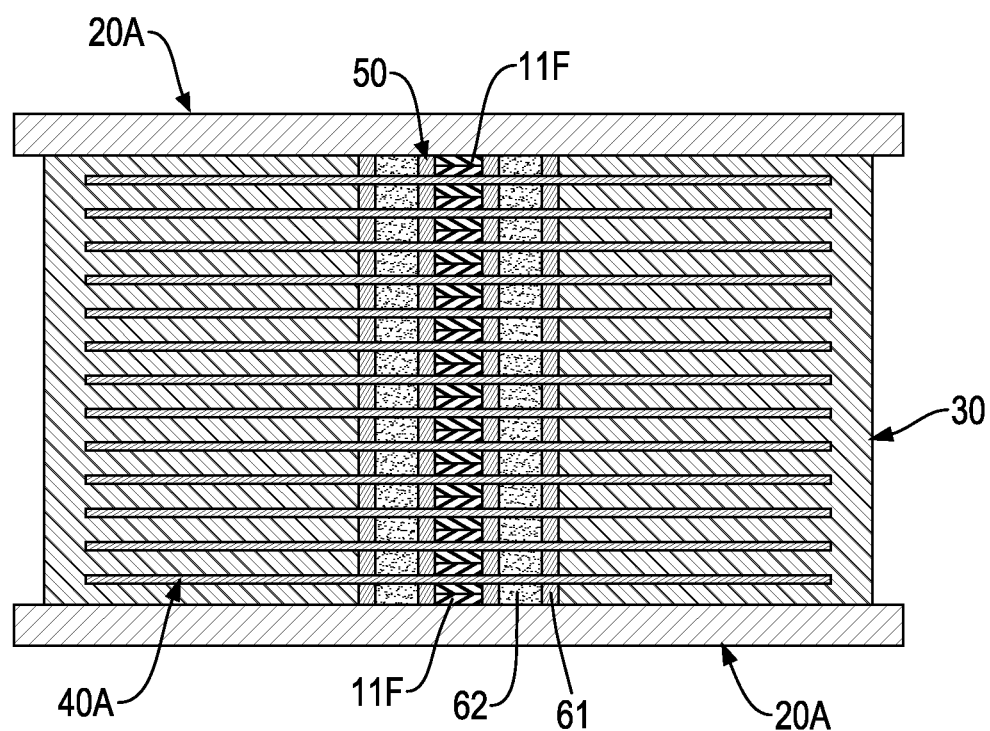
FIG. 88 is a cross sectional side view of a seventy-sixth embodiment of a friction-damping energy absorber in accordance with the present invention.
Figure 89:
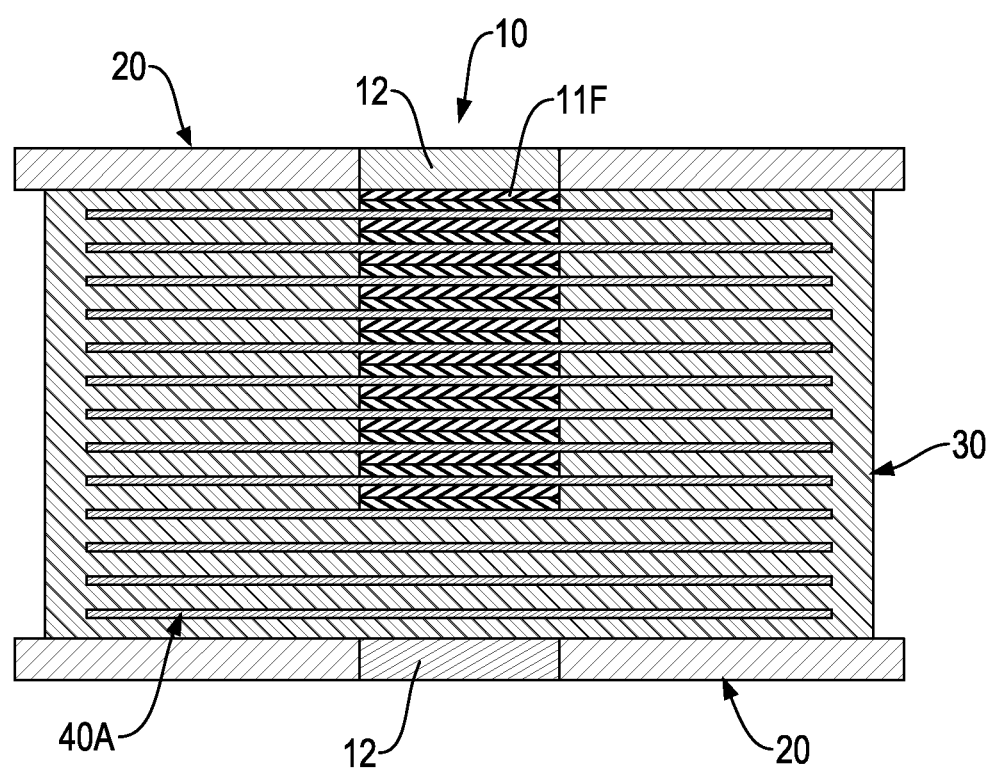
FIG. 89 is a cross sectional side view of a seventy-seventh embodiment of a friction-damping energy absorber in accordance with the present invention.
Figure 90:
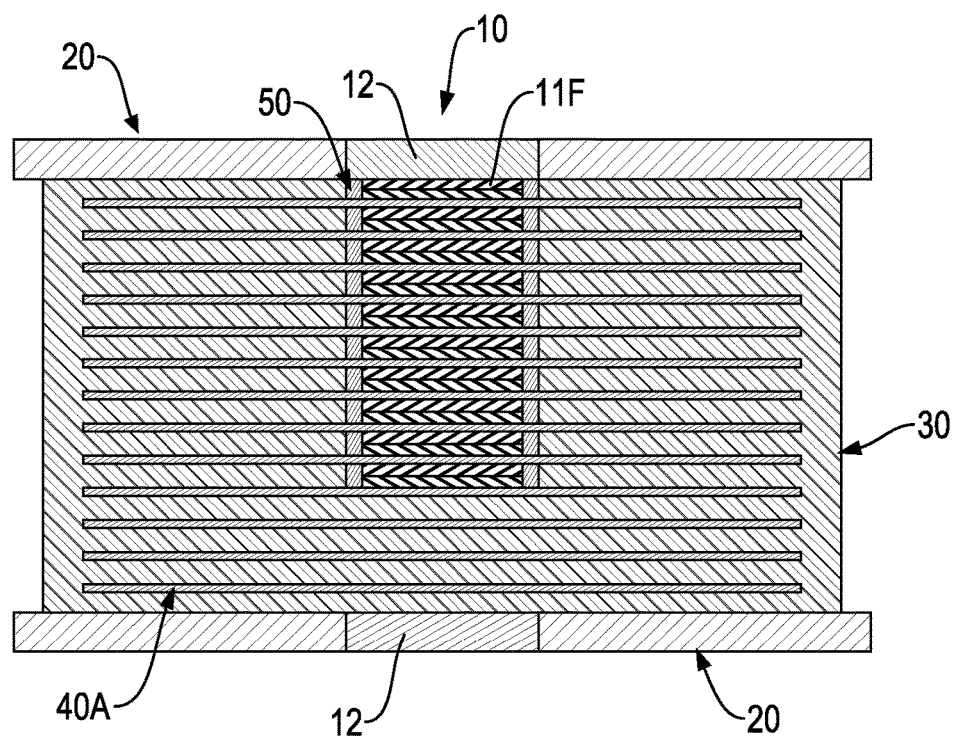
FIG. 90 is a cross sectional side view of a seventy-eighth embodiment of a friction-damping energy absorber in accordance with the present invention.
Figure 91:
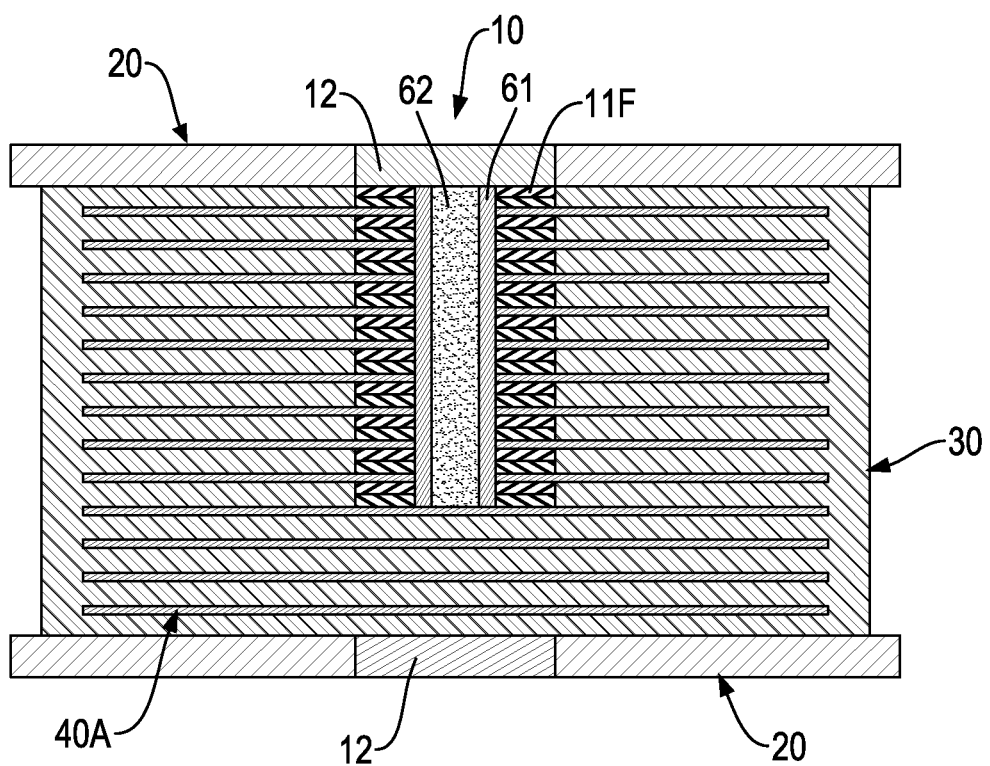
FIG. 91 is a cross sectional side view of a seventy-ninth embodiment of a friction-damping energy absorber in accordance with the present invention.
Figure 92:
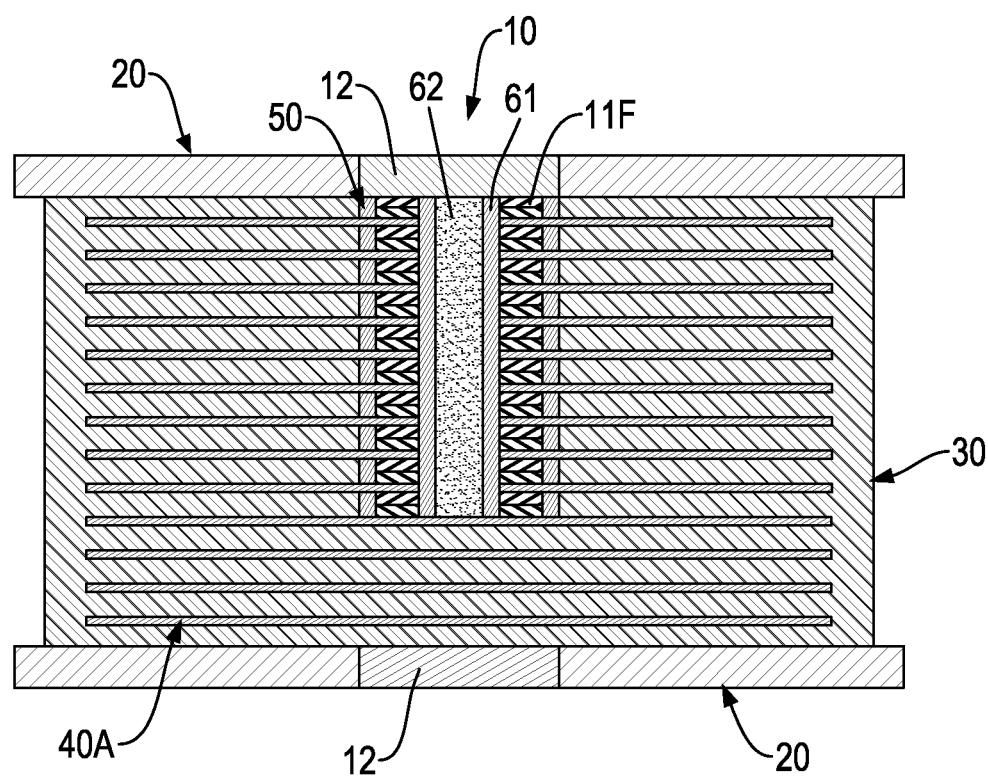
FIG. 92 is a cross sectional side view of an eightieth embodiment of a friction-damping energy absorber in accordance with the present invention.
Figure 93:
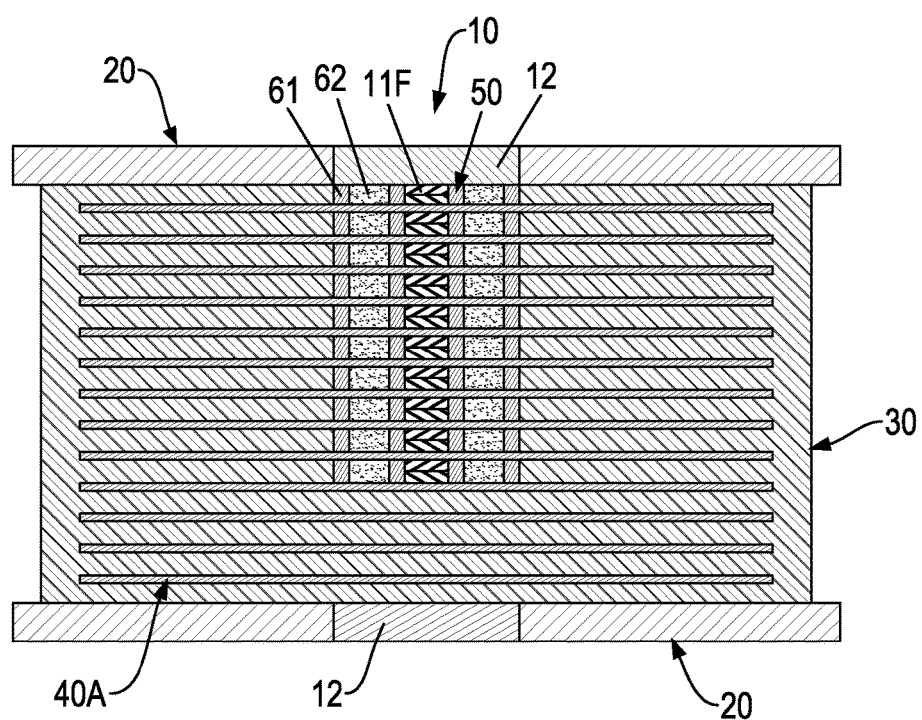
FIG. 93 is a cross sectional side view of an eighty-first embodiment of a friction-damping energy absorber in accordance with the present invention.
Figure 94:
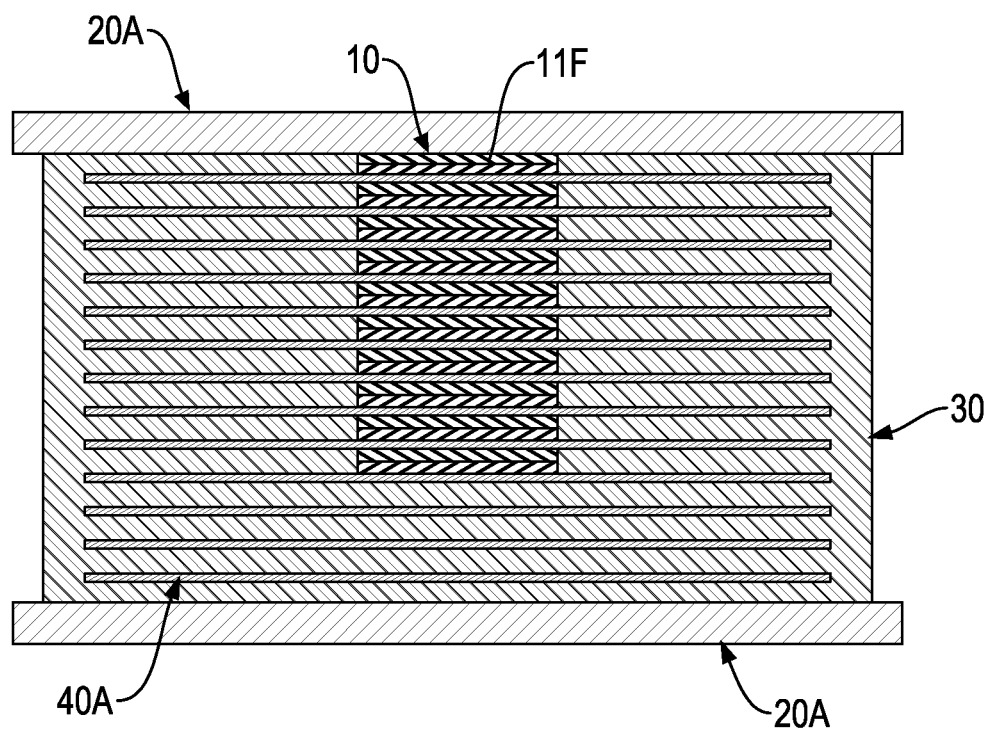
FIG. 94 is a cross sectional side view of an eighty-second embodiment of a friction-damping energy absorber in accordance with the present invention.
Figure 95:
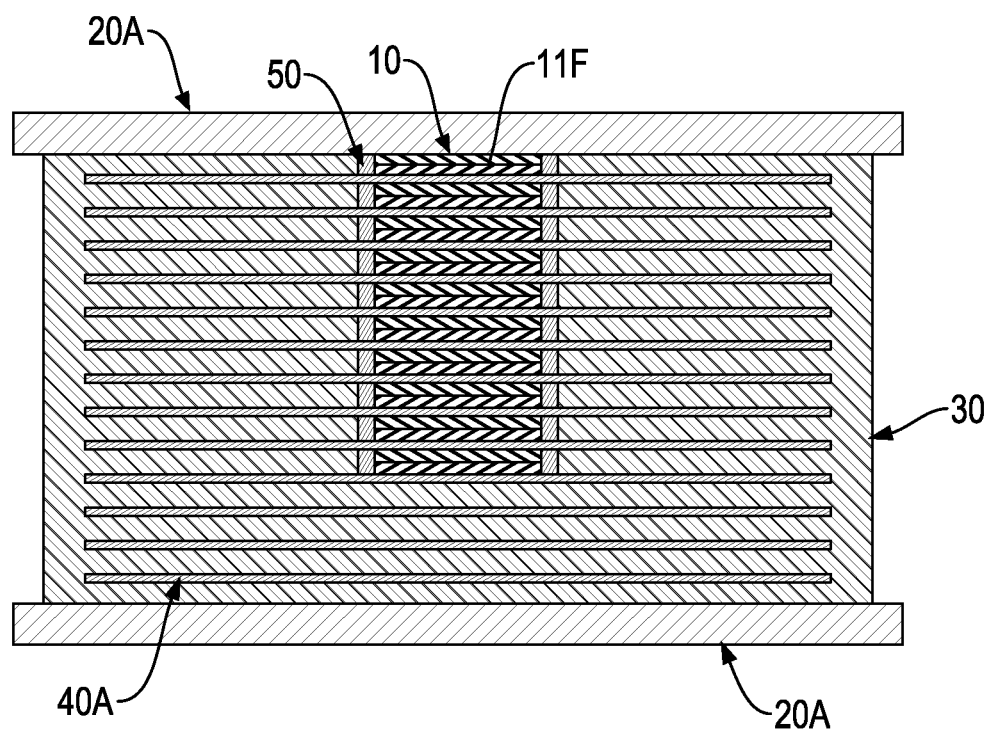
FIG. 95 is a cross sectional side view of an eighty-third embodiment of a friction-damping energy absorber in accordance with the present invention.
Figure 96:
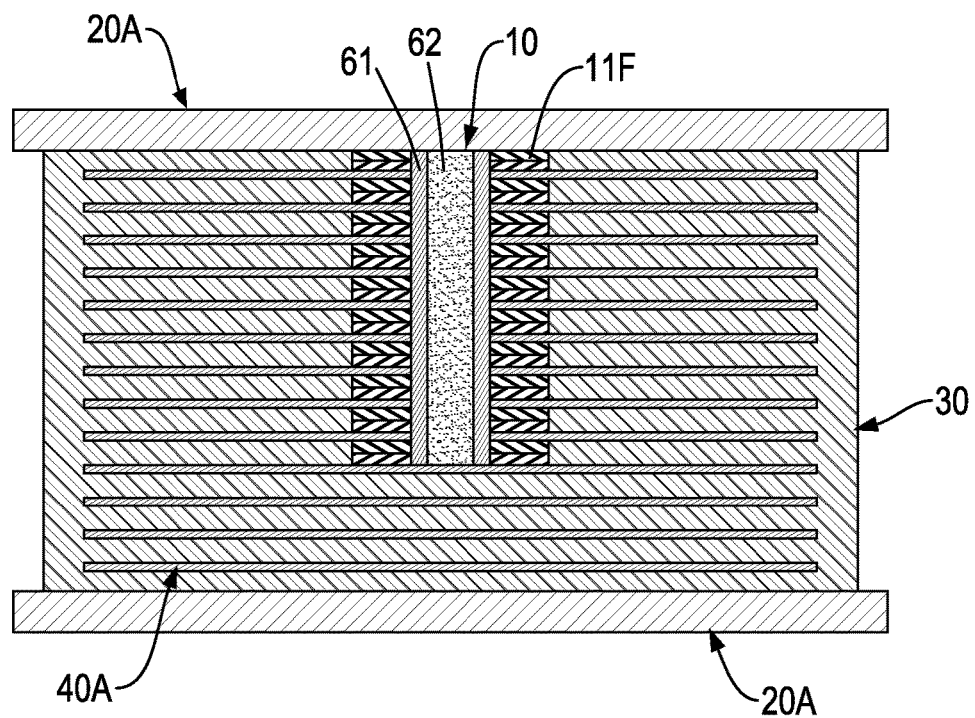
FIG. 96 is a cross sectional side view of an eighty-fourth embodiment of a friction-damping energy absorber in accordance with the present invention.
Figure 97:
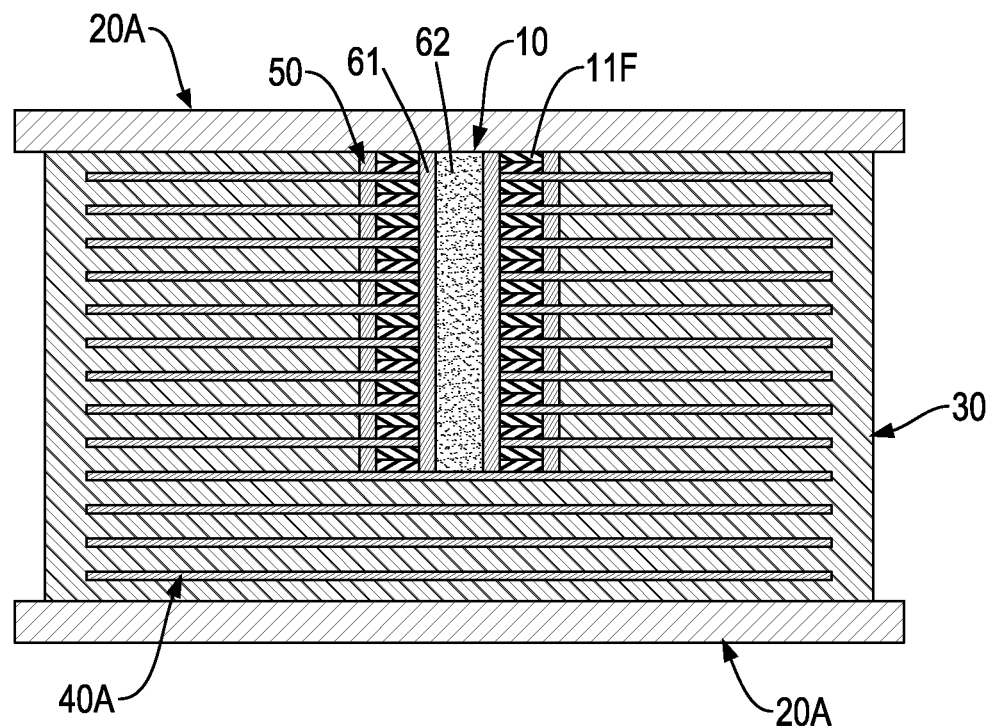
FIG. 97 is a cross sectional side view of an eighty-fifth embodiment of a friction-damping energy absorber in accordance with the present invention.
Figure 98:
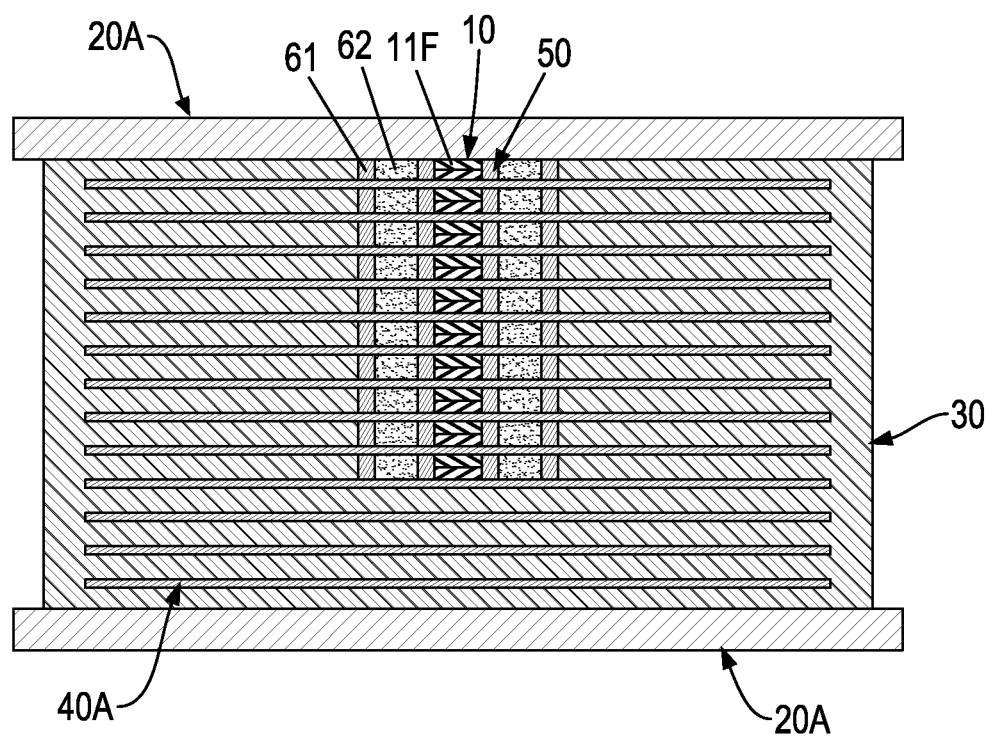
FIG. 98 is a cross sectional side view of an eighty-sixth embodiment of a friction-damping energy absorber in accordance with the present invention.
Figure 99:
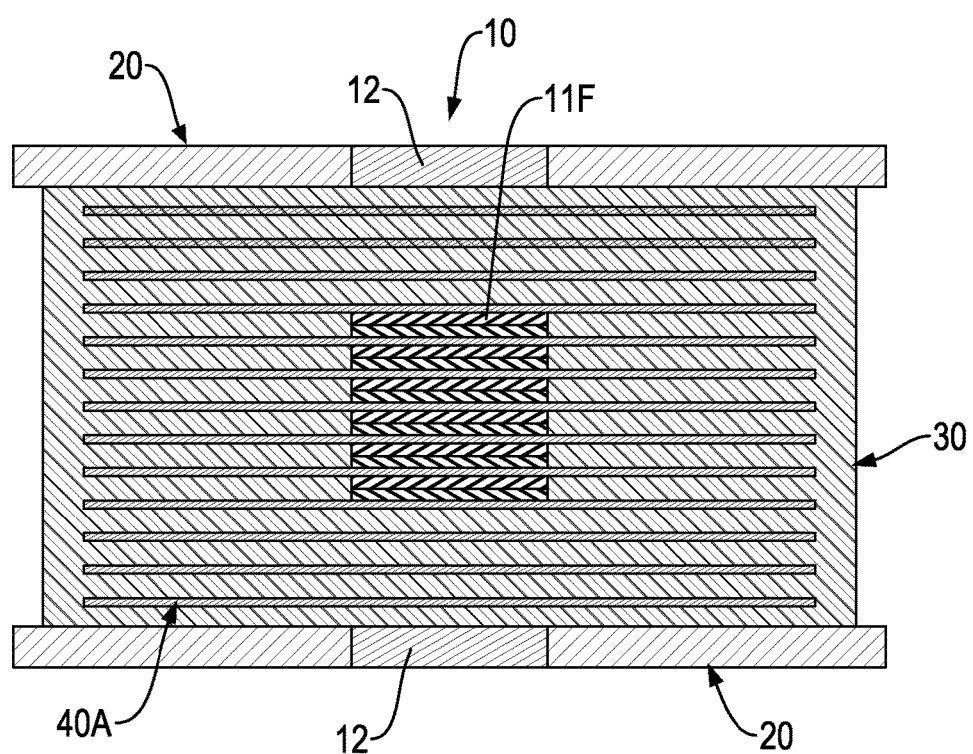
FIG. 99 is a cross sectional side view of an eighty-seventh embodiment of a friction-damping energy absorber in accordance with the present invention.
Figure 100:
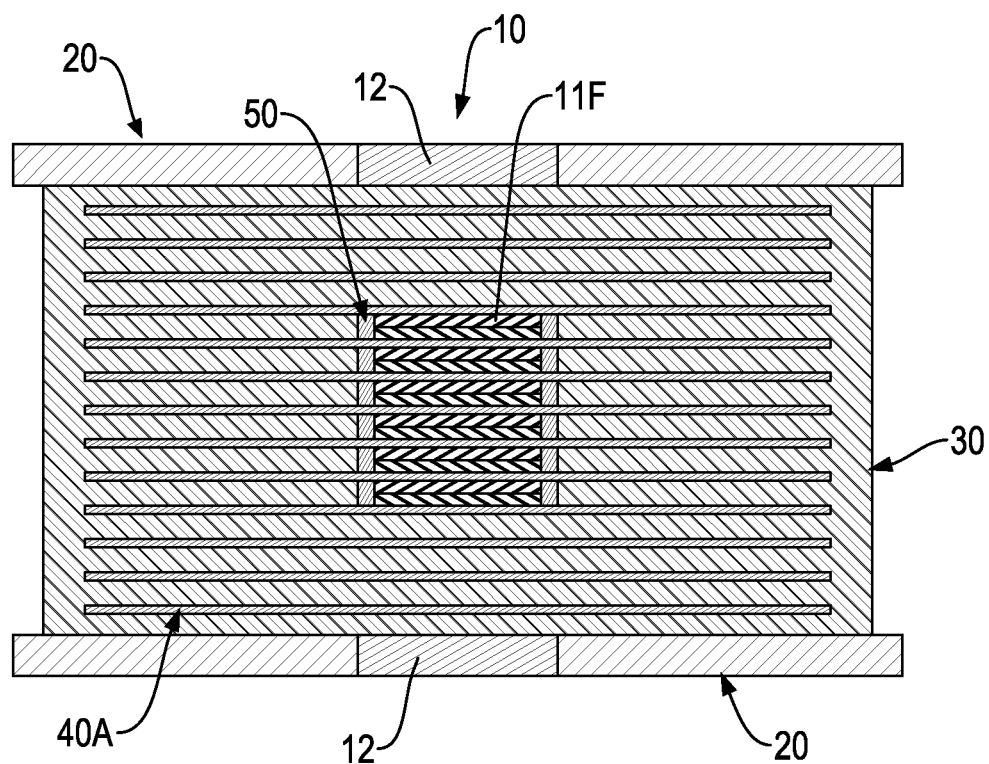
FIG. 100 is a cross sectional side view of an eighty-eighth embodiment of a friction-damping energy absorber in accordance with the present invention.
Figure 101:
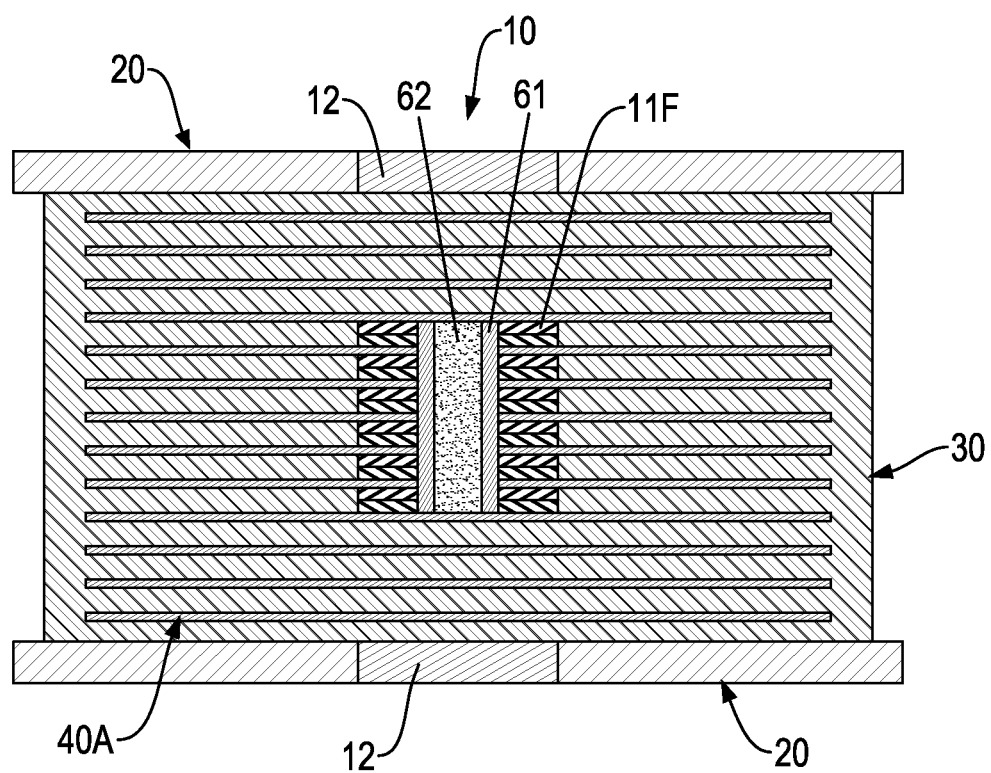
FIG. 101 is a cross sectional side view of an eighty-ninth embodiment of a friction-damping energy absorber in accordance with the present invention.
Figure 102:
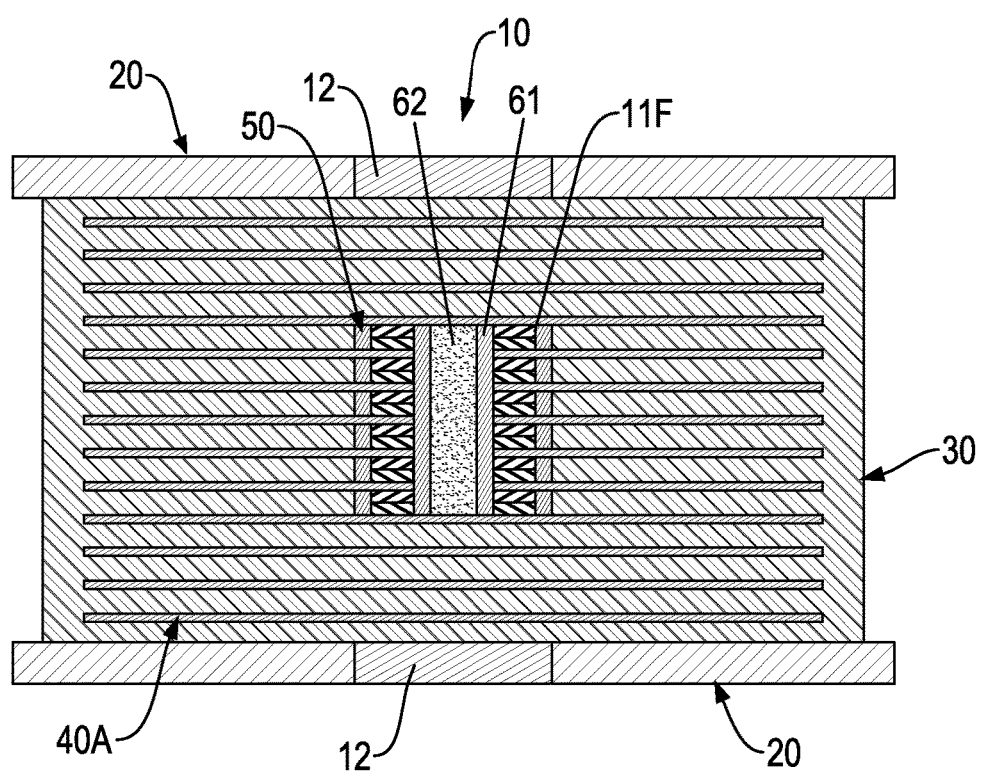
FIG. 102 is a cross sectional side view of a ninetieth embodiment of a friction-damping energy absorber in accordance with the present invention.
Figure 103:
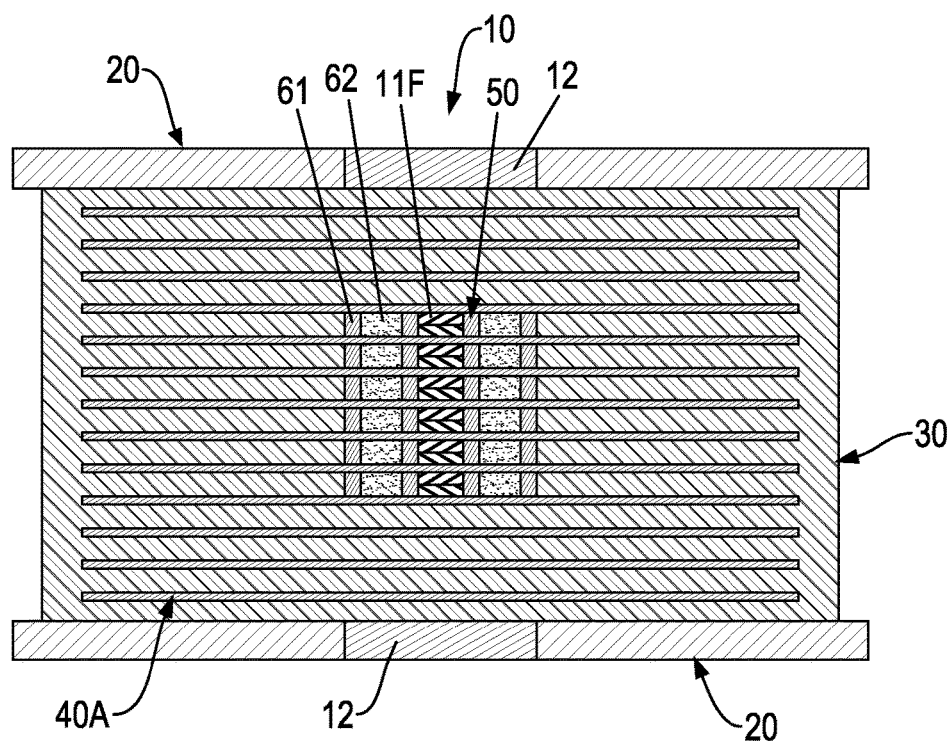
FIG. 103 is a cross sectional side view of a ninety-first embodiment of a friction-damping energy absorber in accordance with the present invention.
Figure 104:
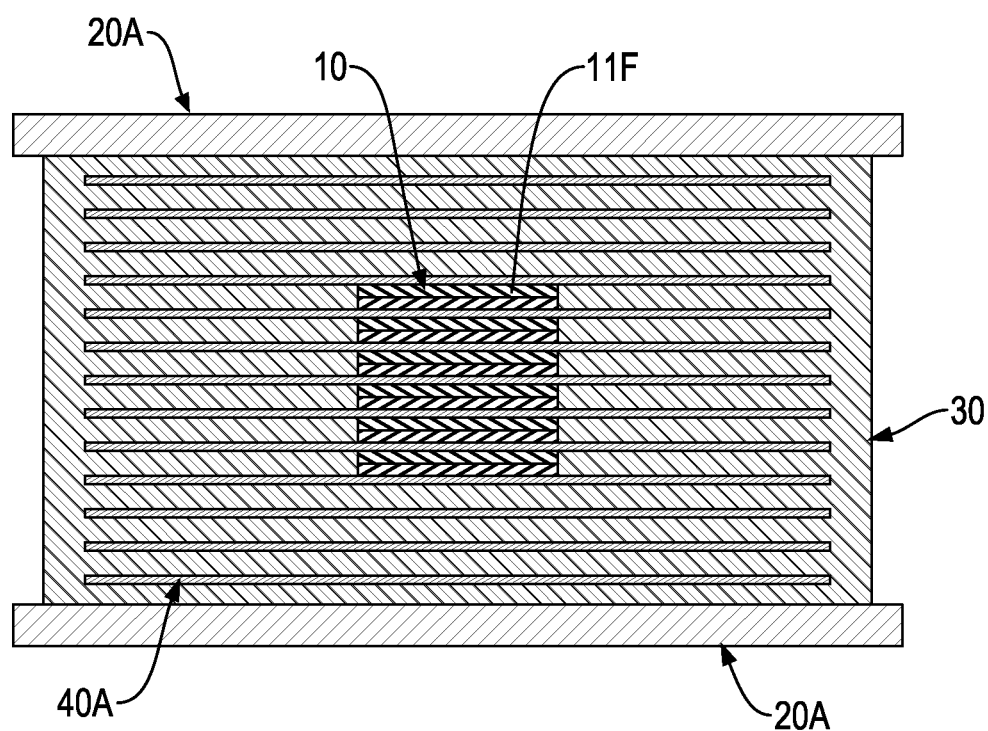
FIG. 104 is a cross sectional side view of a ninety-second embodiment of a friction-damping energy absorber in accordance with the present invention.
Figure 105:
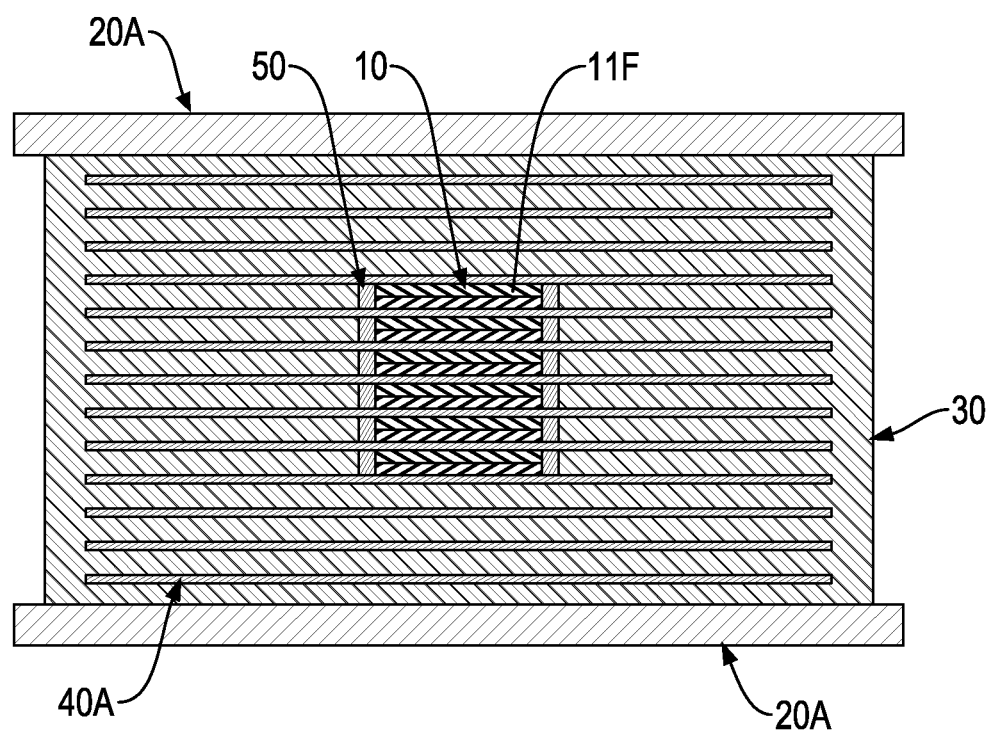
FIG. 105 is a cross sectional side view of a ninety-third embodiment of a friction-damping energy absorber in accordance with the present invention.
Figure 106:
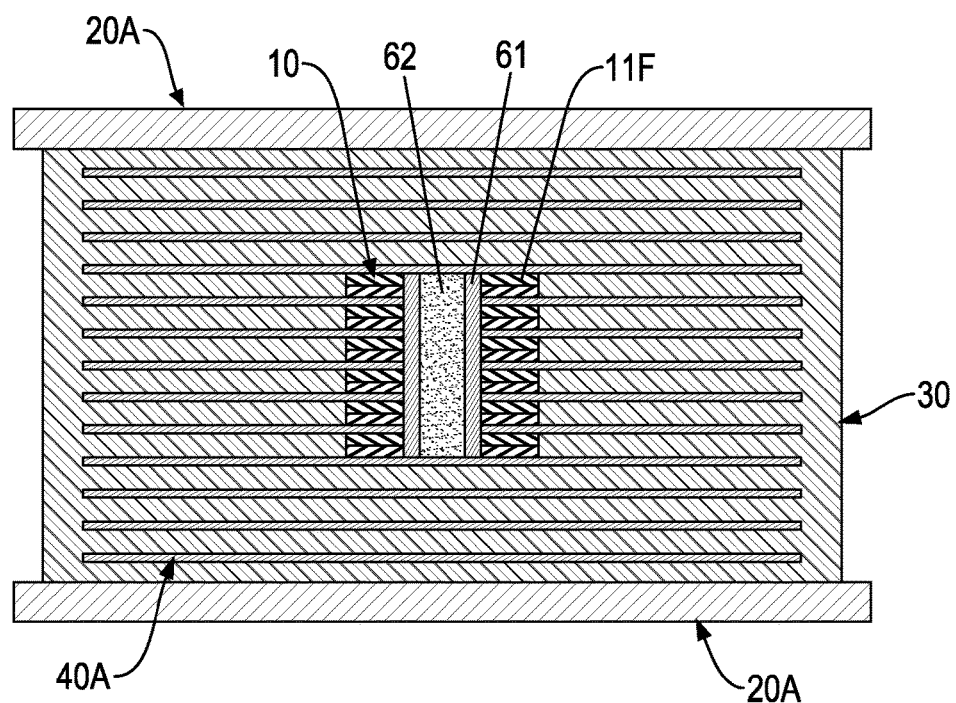
FIG. 106 is a cross sectional side view of a ninety-fourth embodiment of a friction-damping energy absorber in accordance with the present invention.
Figure 107:
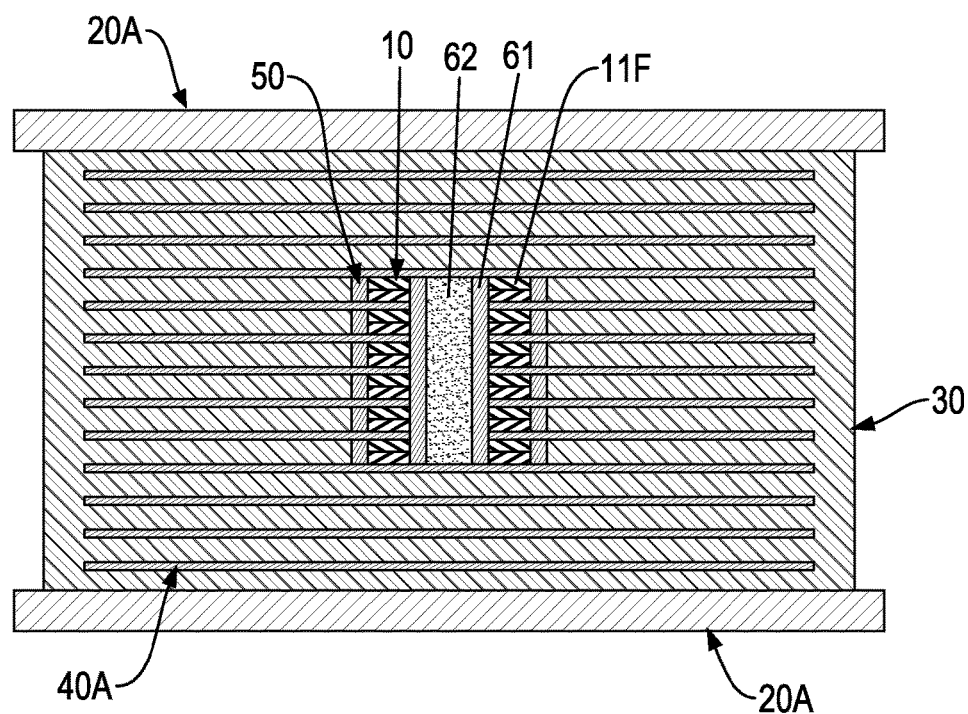
FIG. 107 is a cross sectional side view of a ninety-fifth embodiment of a friction-damping energy absorber in accordance with the present invention.
Figure 108:
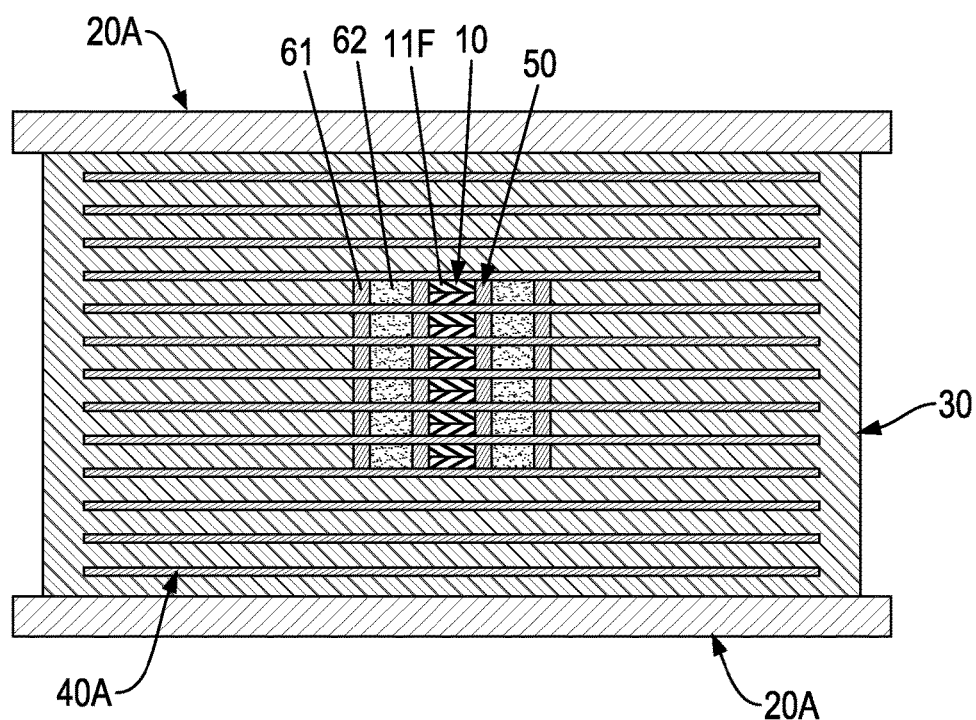
FIG. 108 is a cross sectional side view of a ninety-sixth embodiment of a friction-damping energy absorber in accordance with the present invention.
Figure 109:
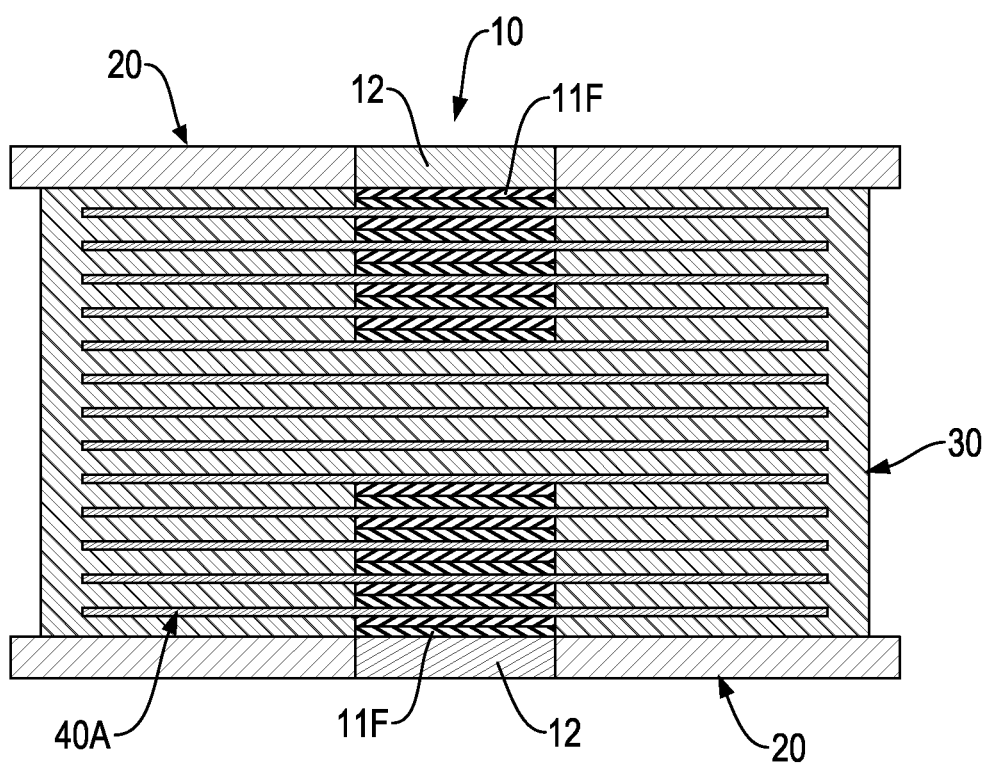
FIG. 109 is a cross sectional side view of a ninety-seventh embodiment of a friction-damping energy absorber in accordance with the present invention.
Figure 110:
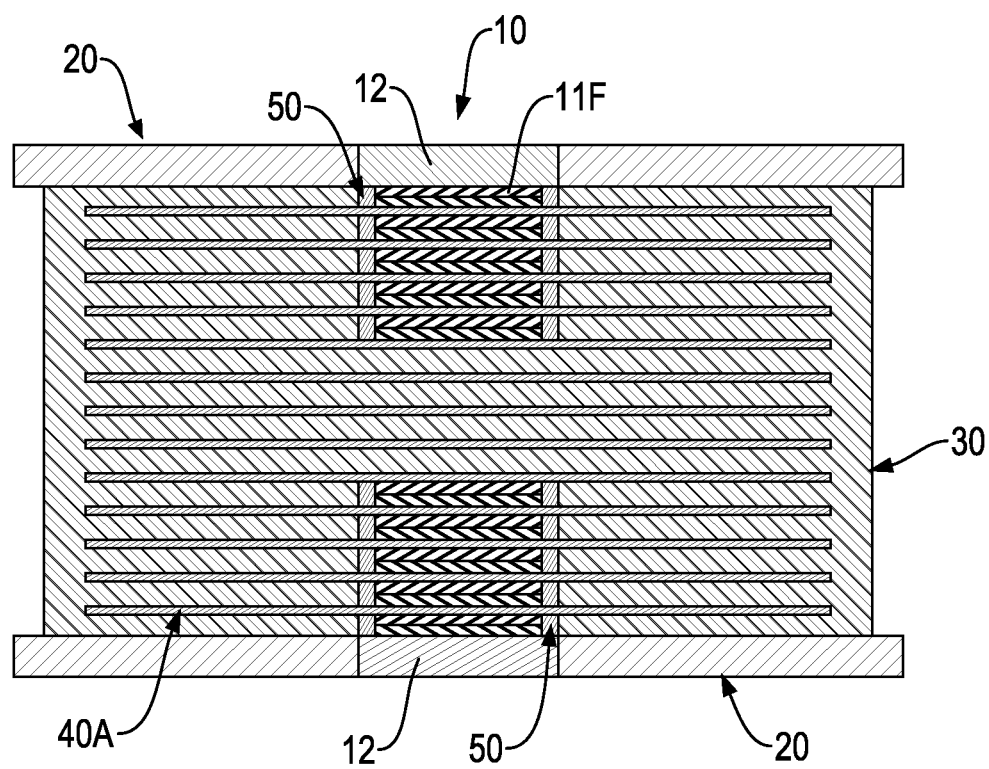
FIG. 110 is a cross sectional side view of a ninety-eighth embodiment of a friction-damping energy absorber in accordance with the present invention.
Figure 111:
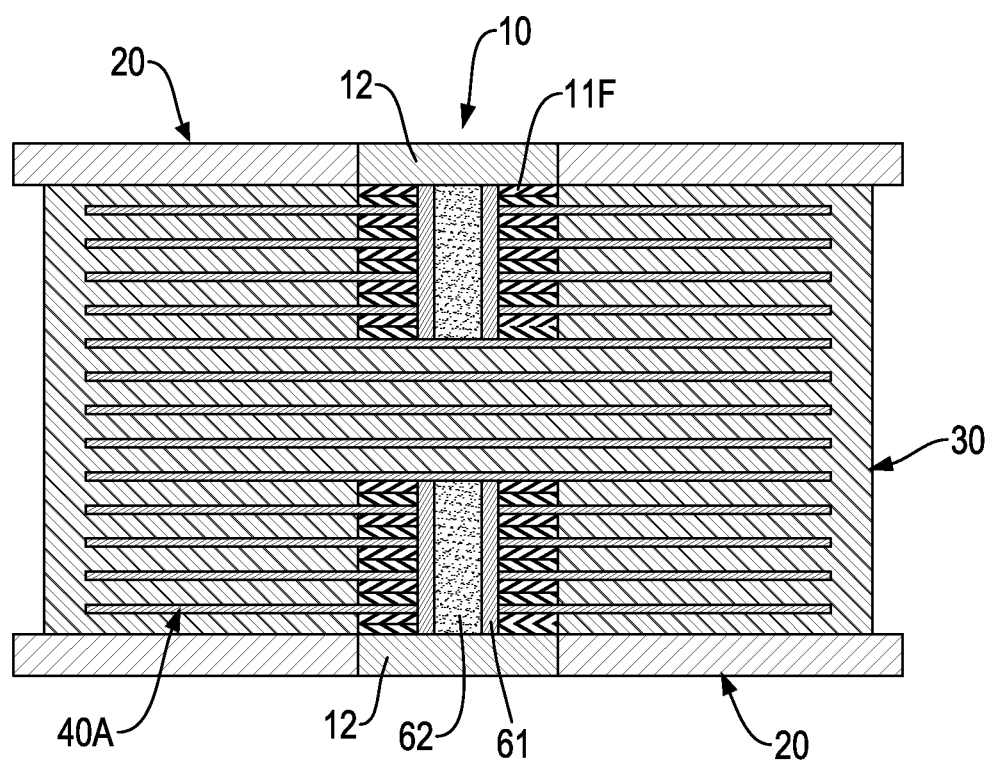
FIG. 111 is a cross sectional side view of a ninety-ninth embodiment of a friction-damping energy absorber in accordance with the present invention.
Figure 112:
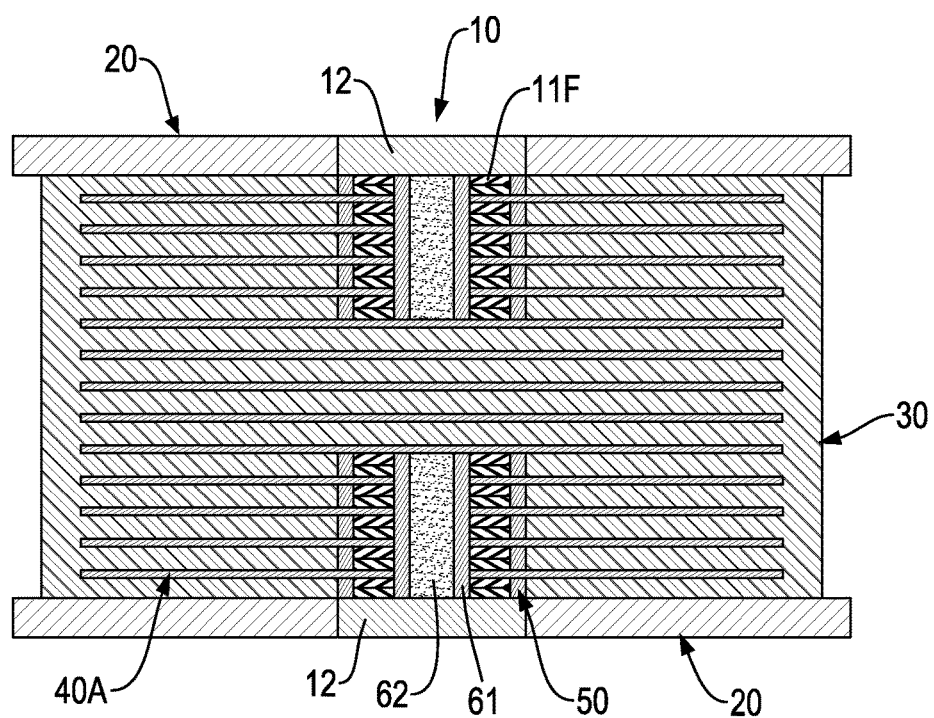
FIG. 112 is a cross sectional side view of a hundredth embodiment of a friction-damping energy absorber in accordance with the present invention.
Figure 113:
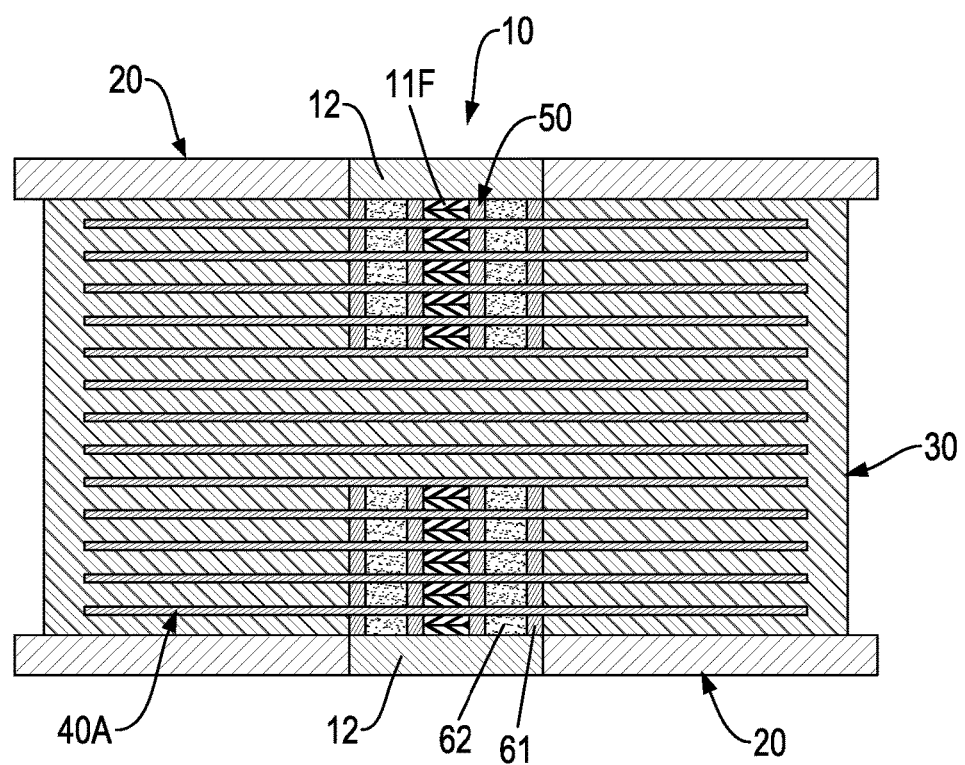
FIG. 113 is a cross sectional side view of a one hundred and first embodiment of a friction-damping energy absorber in accordance with the present invention.
Figure 114:
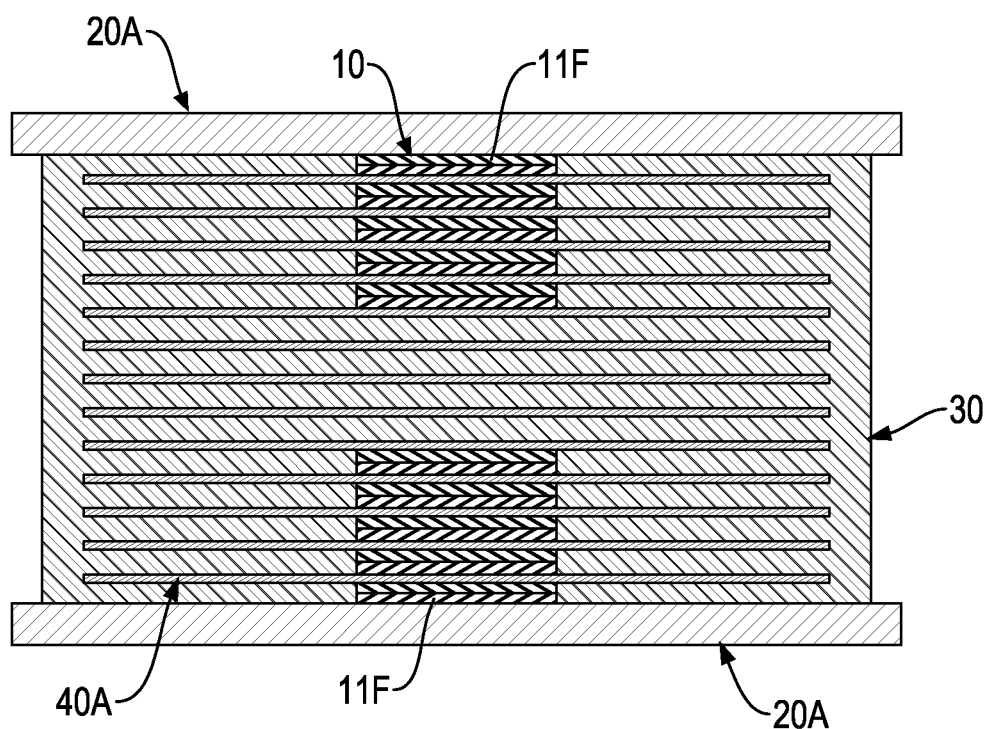
FIG. 114 is a cross sectional side view of a one hundred and second embodiment of a friction-damping energy absorber in accordance with the present invention.
Figure 115:
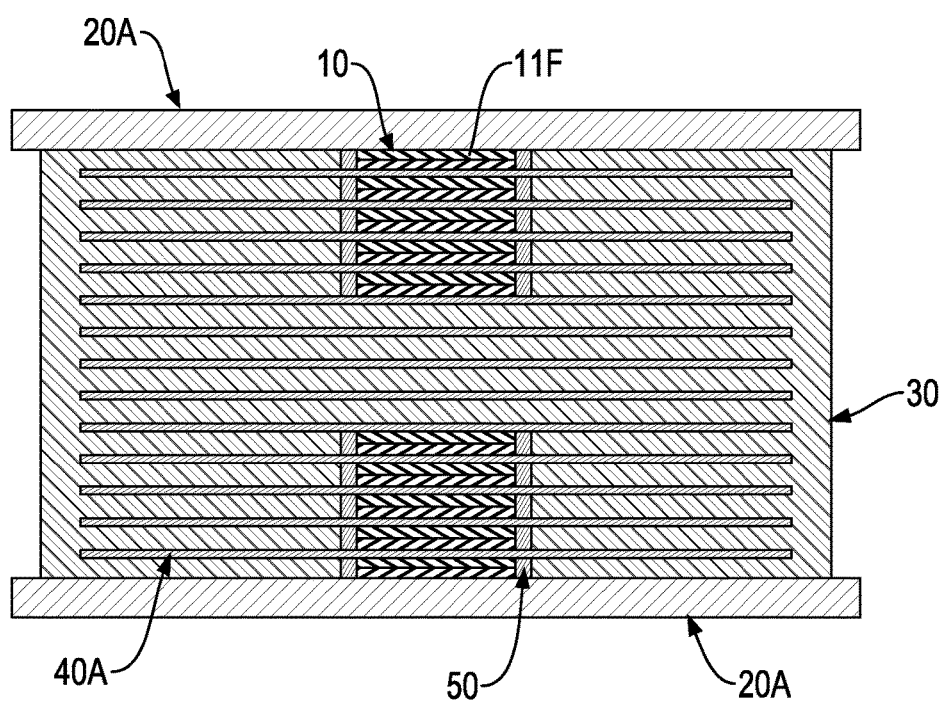
FIG. 115 is a cross sectional side view of a one hundred and third embodiment of a friction-damping energy absorber in accordance with the present invention.
Figure 116:
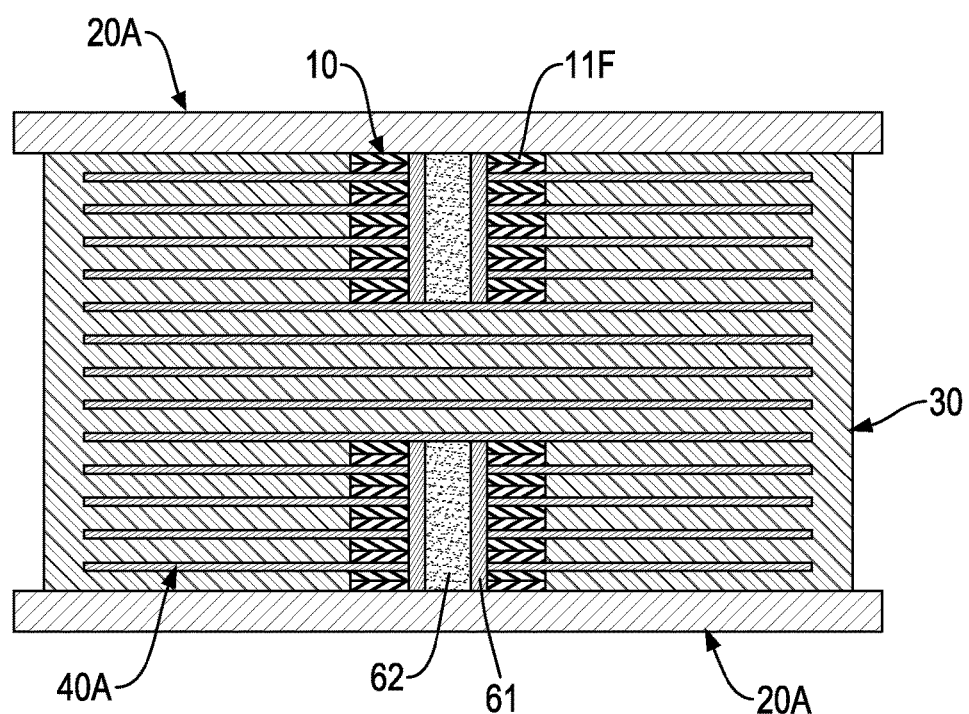
FIG. 116 is a cross sectional side view of a one hundred and fourth embodiment of a friction-damping energy absorber in accordance with the present invention.
Figure 117:
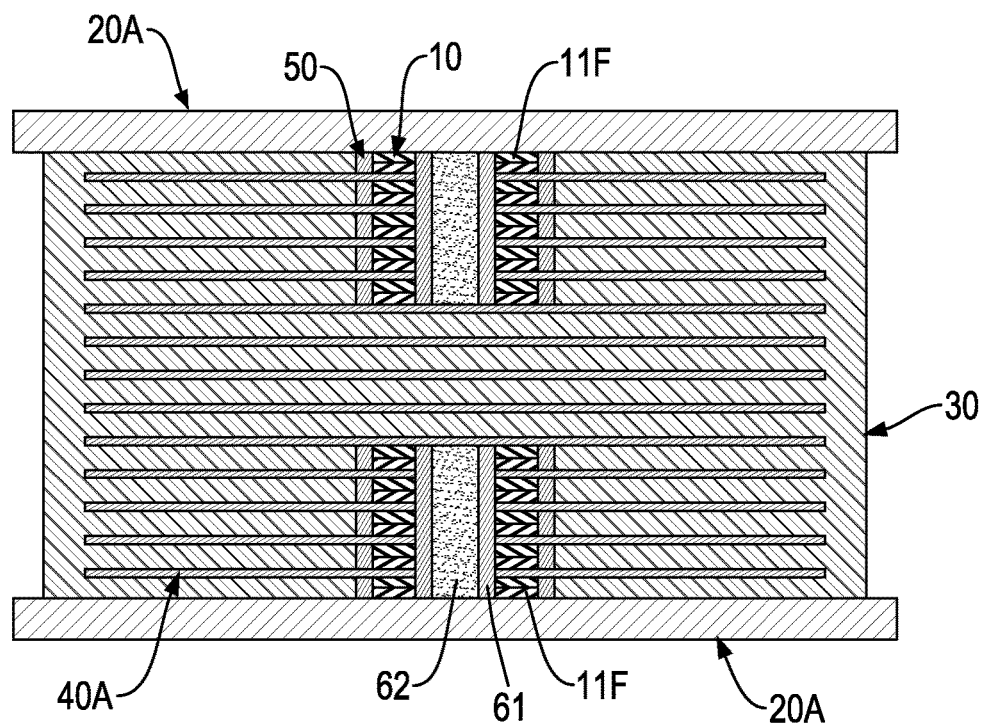
FIG. 117 is a cross sectional side view of a one hundred and fifth embodiment of a friction-damping energy absorber in accordance with the present invention.
Figure 118:
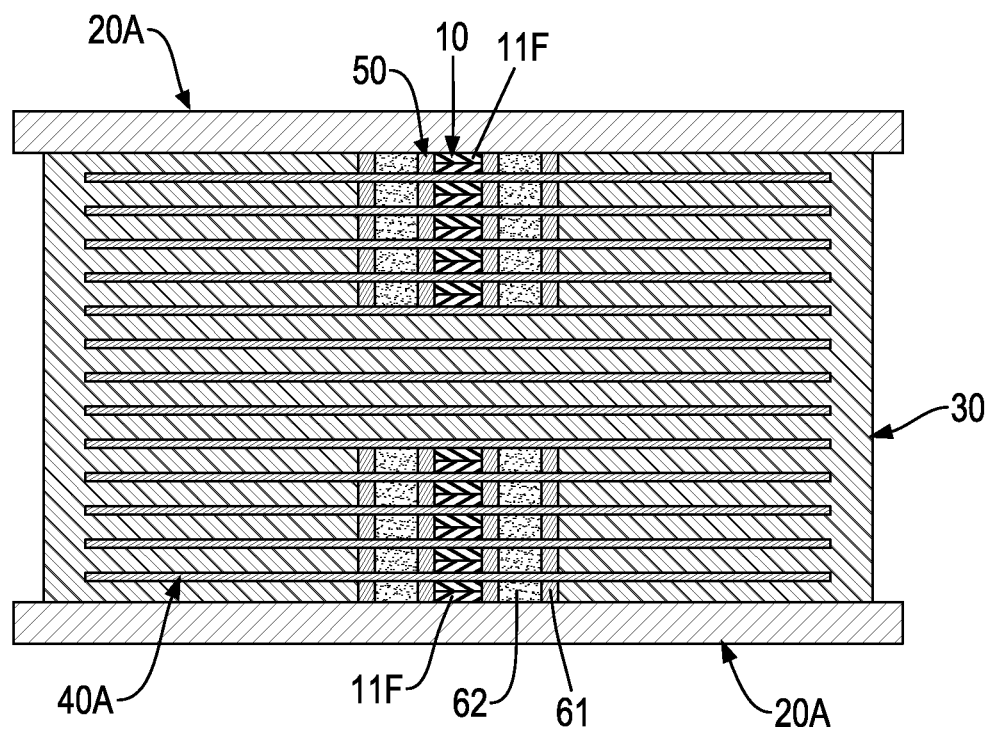
FIG. 118 is a cross sectional side view of a one hundred and sixth embodiment of a friction-damping energy absorber in accordance with the present invention.

With reference to FIG. 78, a sixty-sixth embodiment of a friction-damping energy absorber in accordance with the present invention is substantially the same as the thirty-seventh embodiment as shown in FIG. 49 except for the following features. A part of the material layers 30, 40A extends in a middle segment of the core post 10 to hold the sliding sheets 11 and the stiffness-adjusting column 70 respectively in a top half and a bottom half of the core post 10.

With reference to FIGS. 79 to 88, a sixty-seventh embodiment to a seventy-sixth embodiment of a friction-damping energy absorber in accordance with the present invention are respectively and substantially the same as the sixteenth embodiment to the twenty-fifth embodiment as shown in FIGS. 27 to 36 except for the following features. The core post 10 has two sliding sheets 11F abutting each other between two adjacent second material layers 40A. Furthermore, the sliding sheets 11 have different diameters or lengths. Therefore, the sliding sheets 11 can slide in condition of different frictional forces and at different time points by the different friction coefficients of the sliding sheets 11.

With reference to FIGS. 89 to 98, a seventy-seventh embodiment to an eighty-sixth embodiment of a friction-damping energy absorber in accordance with the present invention are respectively and substantially the same as the sixty-seventh embodiment to the seventy-sixth embodiment as shown in FIGS. 79 to 88 except for the following features. A part of the material layers 30, 40A extends in a bottom half of the core post 10.

When the friction-damping energy absorber has sustained a small horizontal force (small displacement), only the material layers 30, 40A mounted on the bottom half of the core post 10 are deformed to provide a damping effect, the damping function of the material layers 30, 40 mounted on the top half of the core post 10 and the sliding sheets 11F isn't provided. Therefore, the stiffness and the damping of the friction-damping energy absorber are provided by the material layers 30, 40A that are mounted on the bottom half of the core post 10. When the horizontal force reaches the degree to overcome the friction forces between the sliding sheets 11F, the sliding sheets 11F that are mounted in the top half of the core post 10 begin to slide. At the same time, the material layers 30, 40 that are mounted on the top half of the core post 10 begin to deform to provide a damping effect, and the material layers 30, 40A that are mounted on the bottom half of the core post 10 are also deformed to provide a damping effect. Consequently, the stiffness of the friction-damping energy absorber is provided by a series result that is formed from the material layers 30, 40, 40A mounted on the top half and the bottom half of the core post 10, and the damping of the friction-damping energy absorber is provided by a sum of damping between the deformation of the material layers 30, 40, 40A and the sliding friction of the sliding sheets 11A, 11B.

Therefore, the changes of the stiffness can be very smooth from the small horizontal force (small displacement) to the large horizontal force (large displacement) and the stiffness doesn't drastically change to cause high frequency oscillation. Furthermore, the reducing amount of the damping ratio is relatively mild from the small horizontal force (small displacement) to the large horizontal force (large displacement), and this can enable the materials of the friction-damping energy absorber to have a preferred combination and application.

Furthermore, in the seventy-seventh embodiment to the eighty-sixth embodiment as shown in FIGS. 89 to 98, the positions of the material layers 30, 40A and the sliding sheets 11F can be exchanged and the friction-damping energy absorbers can provide the same damping functions. In addition, the friction-damping energy absorbers of the seventy-seventh embodiment to eighty-sixth embodiment in accordance with the present invention as shown in FIGS. 89 to 98 also can be connected to other kinds of core posts 90 (such as Lead Rubber Bearing disclosed by the referenced case and made of lead or high damping materials) in parallel to form the above-mentioned damping function to control the position and time of the deformation of the other kinds of core posts 90. Then, the changes of stiffness and frequency can be automatically controlled from the small horizontal force (small displacement) to the large horizontal force (large displacement) to enhance the shock-suppressing effect of the friction-damping energy absorber.

With reference to FIGS. 99 to 108, an eighty-seventh embodiment to a ninety-sixth embodiment of a friction-damping energy absorber in accordance with the present invention are respectively and substantially the same as the seventy-seventh embodiment to the eighty-sixth embodiment as shown in FIGS. 89 to 98 except for the following features. A part of the material layers 30, 40A extends in a top half and a bottom half of the core post 10 to hold the sliding sheets 11F in a middle segment of the core post 10.

With reference to FIGS. 109 to 118, a ninety-seventh embodiment to a one hundred and sixth embodiment of a friction-damping energy absorber in accordance with the present invention are respectively and substantially the same as the sixty-seventh embodiment to the seventy-sixth embodiment as shown in FIGS. 79 to 88 except for the following features. A part of the material layers 30, 40A extends in a middle segment of the core post 10 to hold the sliding sheets 11F in a top half and a bottom half of the core post 10.

Figure 119:
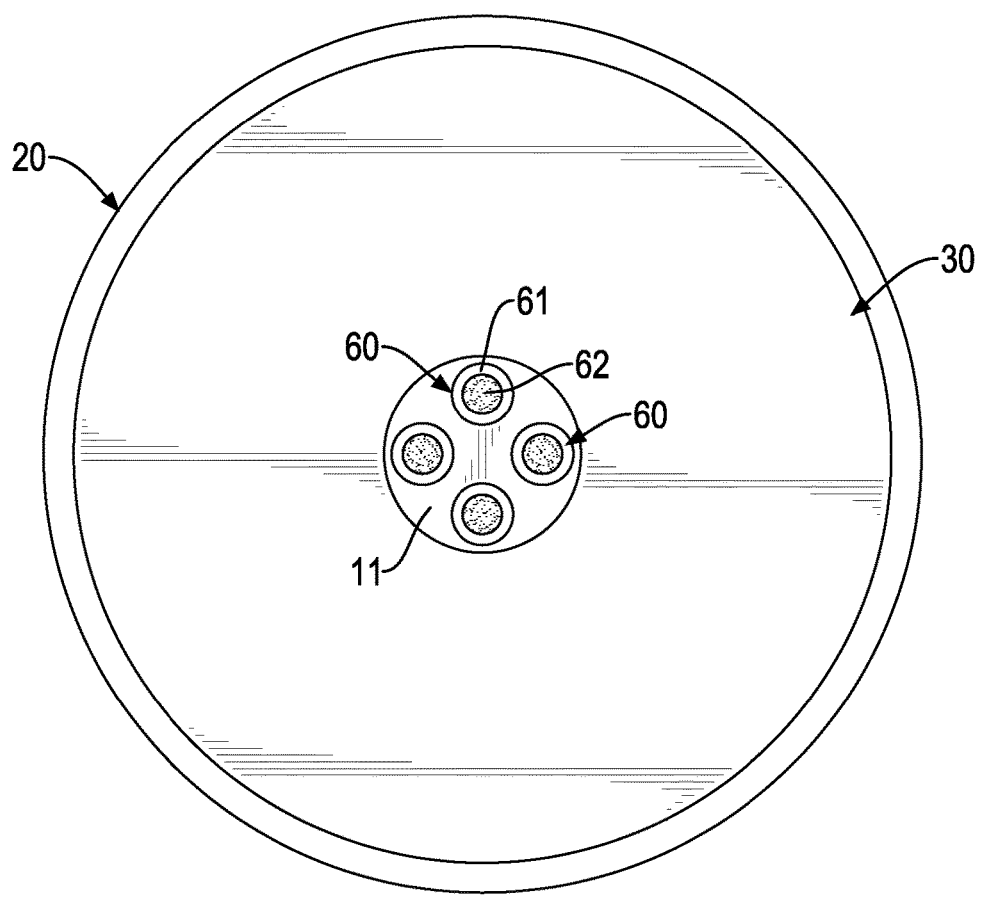
FIG. 119 is a cross sectional top view of a one hundred and seventh embodiment of a friction-damping energy absorber in accordance with the present invention.

With reference to FIG. 119, a one hundred and seventh embodiment in accordance with the present invention is substantially the same as the sixth embodiment as shown in FIGS. 11 to 13 except for the following features. The friction-damping energy absorber has multiple cooling modules 60 mounted in the core post 10 at intervals between the two end covers 12.

Figure 120:
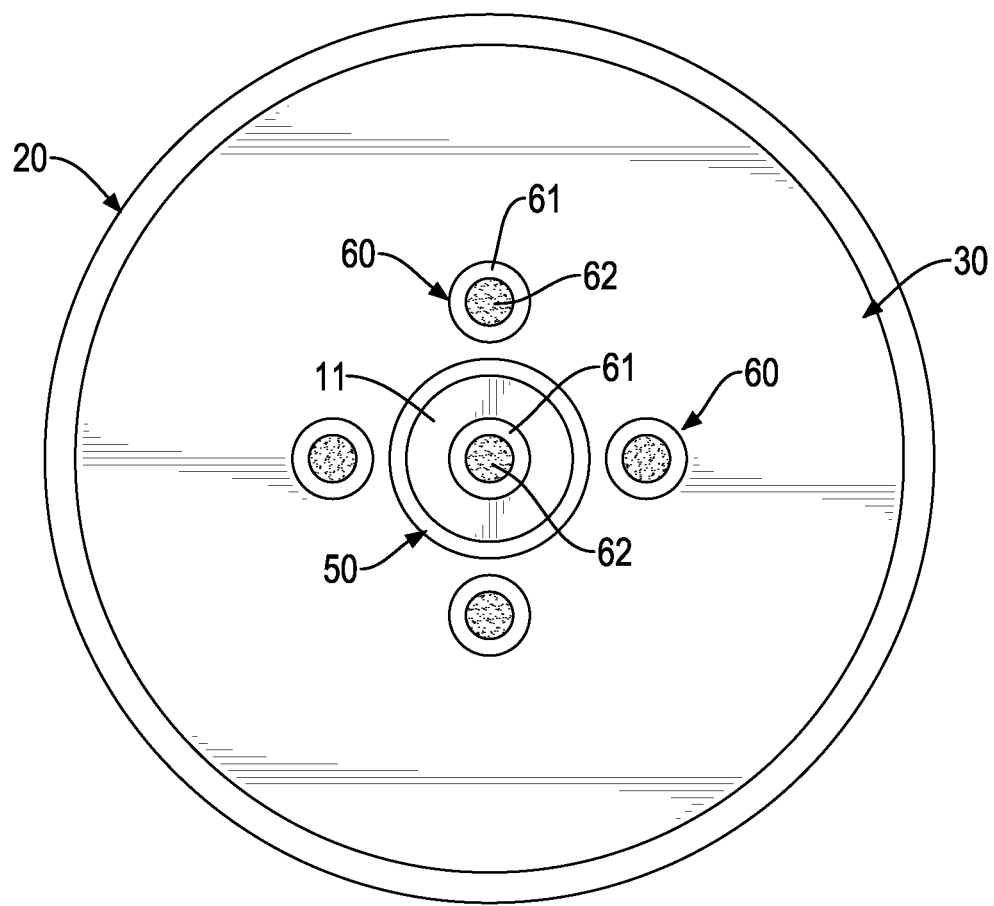

With reference to FIG. 120, a one hundred and eighth embodiment in accordance with the present invention is substantially the same as the eighth embodiment as shown in FIGS. 15 and 16 except for the following features. The friction-damping energy absorber has multiple cooling modules 60 annularly mounted around the restricting module 50 at intervals between the supporting boards 20.

Figure 121:
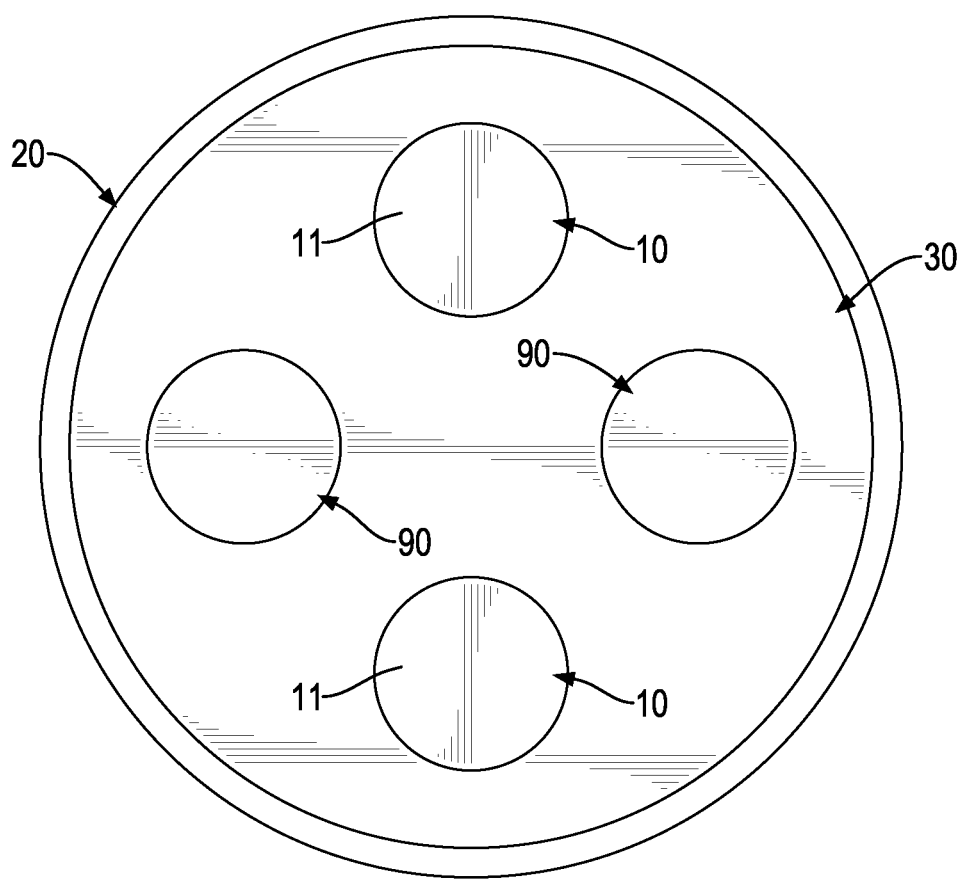

With reference to FIG. 121, a one hundred and ninth embodiment in accordance with the present invention is substantially the same as the second embodiment as shown in FIG. 4 except for the following features. The friction-damping energy absorber has multiple core posts 10 and multiple other kinds of core posts 90 (such as Lead Rubber Bearing disclosed by the referenced case and made of lead or high damping materials). The core posts 10, 90 are connected to each other in parallel. The sliding sheets 11 can slide in a condition of different friction and at different time points by the different friction coefficients of the sliding sheets 11, and acted in concert with the position and time of the deformation of the other kinds of core posts 90. Then, the changes of stiffness and frequency can be automatically controlled from the small horizontal force (small displacement) to the large horizontal force (large displacement) to enhance the shock-suppressing effect of the friction-damping energy absorber. Furthermore, the reducing amount of the damping ratio is relatively mild from the small horizontal force (small displacement) to the large horizontal force (large displacement), and this can enable the materials of the friction-damping energy absorber to have a preferred combination and application.

Figure 122:
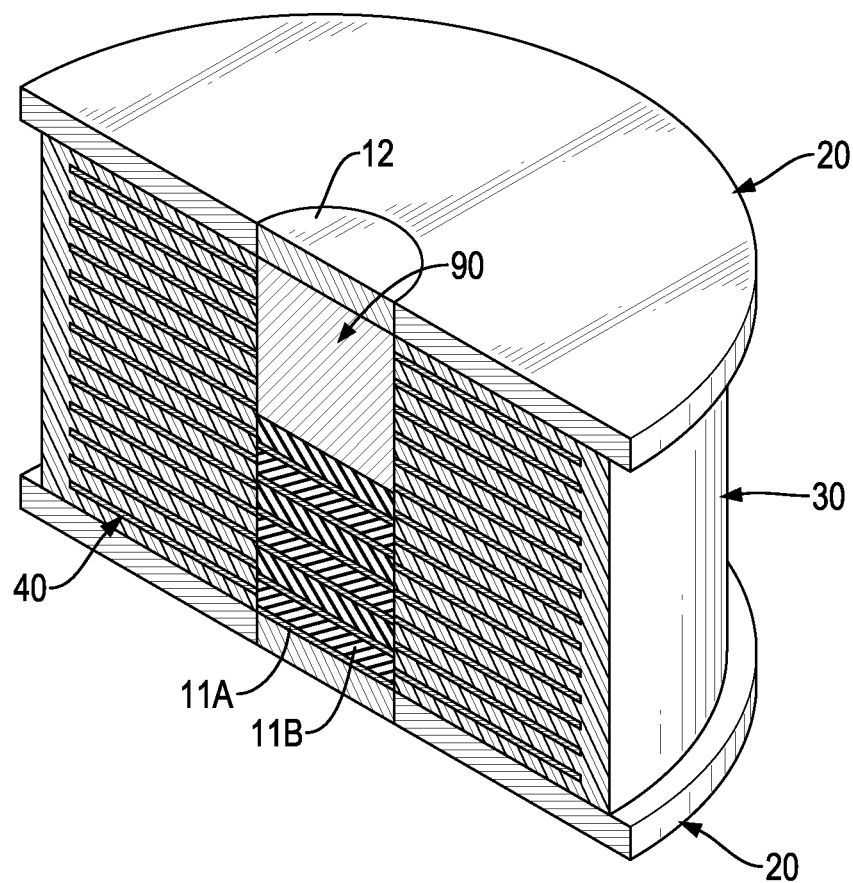

With reference to FIG. 122, a one hundred and tenth embodiment in accordance with the present invention is substantially the same as the fortieth embodiment as shown in FIG. 52 except for the following features. The friction-damping energy absorber is connected to other kind of core post 90 (such as Lead Rubber Bearing disclosed by the referenced case and made of lead or high damping materials) in series to hold the core post 10 above the core post 90. The sliding sheets 11A, 11B can slide in condition of different friction and at different time points by the different friction coefficients of the sliding sheets 11A, 11B, and acted in concert with the position and time of the deformation of the other kind of core post 90. Then, the changes of stiffness and frequency can be automatically controlled from the small horizontal force (small displacement) to the large horizontal force (large displacement) to enhance the shock-suppressing effect of the friction-damping energy absorber. Furthermore, the reducing amount of the damping ratio is relatively mild from the small horizontal force (small displacement) to the large horizontal force (large displacement), and this can enable the materials of the friction-damping energy absorber to have a preferred combination and application. Additionally, the positions of the core post 10 and the other kind of core post 90 can be exchanged to provide the same function.

Figure 123:
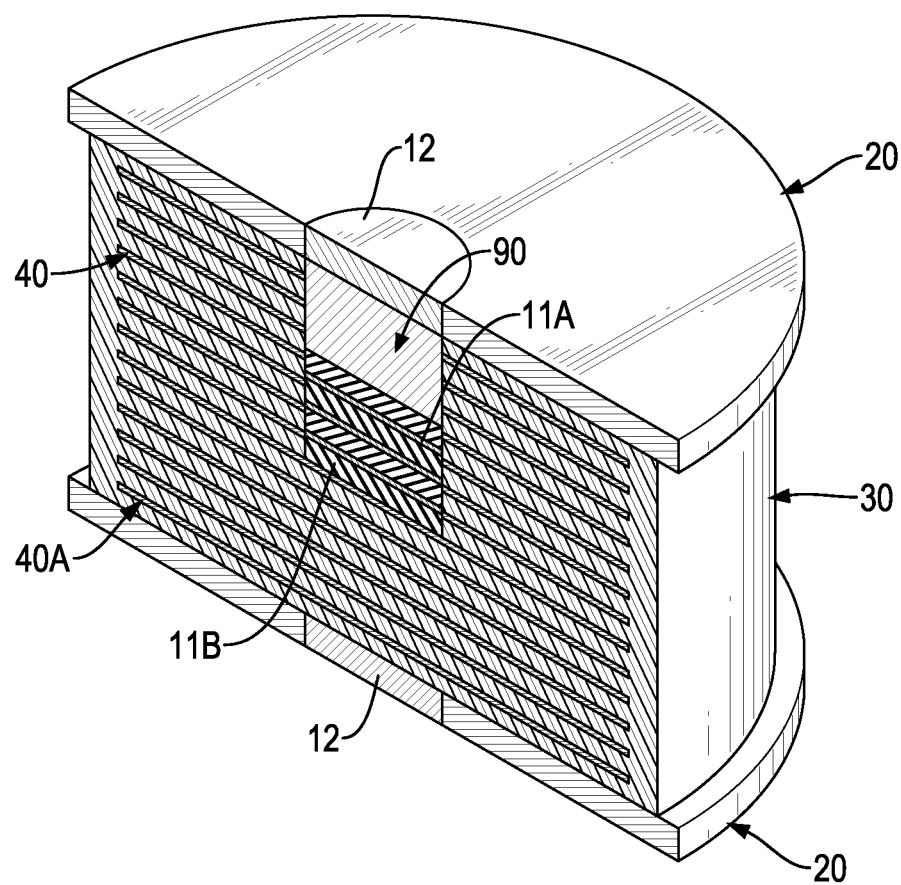

With reference to FIG. 123, a one hundred and eleventh embodiment in accordance with the present invention is substantially the same as the one hundred and tenth embodiment as shown in FIG. 122 except for the following features. A part of the material layers 30, 40A extends in a bottom half of the core post 10 to hold the sliding sheets 11A, 11B in a middle segment of the core post 10 under the other kind of core post 90. Additionally, the positions of the other kind of core post 90, the sliding sheets 11A, 11B, and the material layers 30, 40A can be exchanged to provide the same function.

Figure 124:
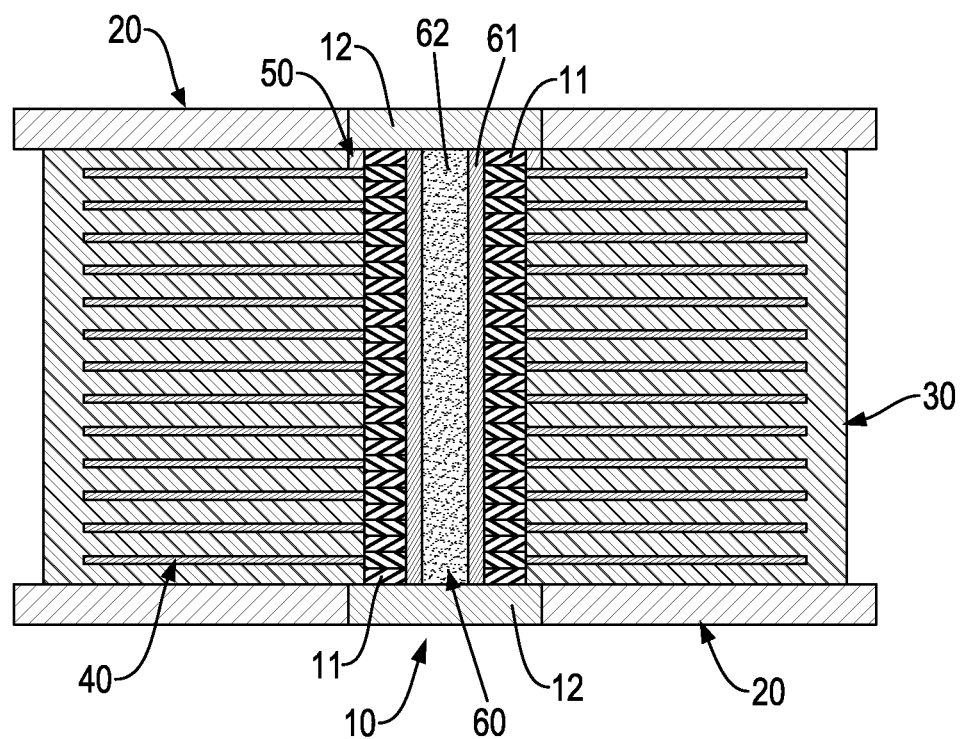

With reference to FIG. 124, a one hundred and twelfth embodiment in accordance with the present invention is substantially the same as the eighth embodiment as shown in FIGS. 15 and 16 except for the following features. The restricting module 50 is only mounted around one of the sliding sheets 11 of the core post 10.

According to the above-mentioned features and structural relationships of the friction-damping energy absorber in accordance with the present invention, the sliding sheets 11, 11A, 11B, 11C, 11D, 11E, 11F are stacked in the core post 10. During earthquakes, the sliding sheets 11, 11A, 11B, 11C, 11D, 11E, 11F can slide and rub against each other to provide a damping effect, and the material layers 30, 40, 40A can be deformed to provide a shock-absorbing effect to prevent the earthquake shock and energy directly transmitting to the object such as the buildings, bridges, other large objects, facilities or equipments. Furthermore, the non-lead sliding sheets 11, 11A, 11B, 11C, 11D, 11E, 11F can prevent the temperature rise induced by the heat that is generated by the repeated deformation from impairing the function of the core post 10 or even melting the core post 10 to form a significant impact and pollution to the environment.

Additionally, the restricting module 50 is mounted in the core post 10 to provide a restricting effect and a deforming space to the sliding sheets 11, 11A, 11B, 11C, 11D, 11E, 11F of the core post 10. Furthermore, at least one cooling module 60 is mounted in the core post 10 to reduce the temperatures of the core post 10 and the friction-damping energy absorber to prevent the temperature rise induced by the heat that is generated by the repeated deformation from impairing the function of the core post 10 and the material layers 30, 40, 40A or even melting the core post 10. Further, at least one stiffness-adjusting column 70 and the end covers 12 can be mounted in the core post 10 to adjust the sustained loading and stiffness of the core post 10. Then, the friction force and the damping force between the sliding sheets 11, 11A, 11B, 11C, 11D, 11E, 11F can be adjusted according to the sustained loading and stiffness of the core post 10, and the deformation differences in the vertical direction between the core post 10 and the material layers 30, 40, 40A can be reduced to enable the sliding sheets 11, 11A, 11B, 11C, 11D, 11E, 11F to slide smoothly in the horizontal direction. In addition, the sliding sheets 11, 11A, 11B, 11C, 11D, 11E, 11F with different thickness, inner diameters, and outer diameters can form the annular gaps 13, 13E between the core post 10 and the material layers 30, 40, 40A, and gas can be filled in the annular gaps 13, 13E to form a restricting effect to the sliding sheets 11, 11A, 11B, 11C, 11D, 11E, 11F.

Consequently, the friction-damping energy absorber in accordance with the present invention can be used flexibly and conveniently according to the users or the types of the buildings, bridges, machines, facilities or equipments by the embodiments of the present invention to provide a preferred structural strength and shock-absorbing effect to the friction-damping energy absorber. In addition, the sliding sheets 11, 11A, 11B, 11C, 11D, 11E, 11F can slide in a condition of different friction and at different time points by the different friction coefficients of the sliding sheets 11, 11A, 11B, 11C, 11D, 11E, 11F to automatically adjust the damping and the stiffness of the friction-damping energy absorber.

Furthermore, each one of the sliding sheets 11, 11A, 11B, 11C, 11D, 11E, 11F is limited between two adjacent second material layers 40, 40A to reduce the deformation differences in the vertical direction between the core post 10 and the material layers 30, 40, 40A to enable each one of the sliding sheets 11, 11A, 11B, 11C, 11D, 11E, 11F to slide smoothly in the horizontal direction. Additionally, the core post 10 with the sliding sheets 11, 11A, 11B, 11C, 11D, 11E, 11F can be connected to the other kind of core post 90 (such as Lead Rubber Bearing disclosed by the referenced case and made of lead or high damping materials) in parallel or in series to control the position and time of deformation of the other kind of core post 90. Then, the changes of stiffness and frequency can be automatically controlled from the small horizontal force (small displacement) to the large horizontal force (large displacement) to enhance the shock-suppressing effect of the friction-damping energy absorber. At the same time, the reducing amount of the damping ratio is relatively mild from the small horizontal force (small displacement) to the large horizontal force (large displacement), and this can enable the materials of the friction-damping energy absorber to have a preferred combination and application.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A friction-damping energy absorber comprising:
   two ends;
   at least one core post, and the at least one core post having two ends; and
      multiple sliding sheets arranged in a stacked manner and mounted in the at least one core post between the two ends of the at least one core post;
   two supporting boards mounted on the two ends of the friction-damping energy absorber; and
   multiple first material layers and multiple second material layers, the first material layers and second material layers alternately mounted between the two supporting boards and surrounding the at least one core post, and at least one of the second material layers continuously extending between the sliding sheets and through the at least one core post.

2. The friction-damping energy absorber as claimed in claim 1, wherein a single one core post is implemented.

3. The friction-damping energy absorber as claimed in claim 1, wherein multiple core posts are implemented, and at least one of the core posts has multiple sliding sheets, and the sliding sheets of the at least one of the core posts are stacked with each other.

4. The friction-damping energy absorber as claimed in claim 1, wherein
   the friction-damping energy absorber has at least one cooling module mounted in the at least one core post; and
   the at least one cooling module has
      a sealed pipe being a hollow tube, and mounted through at least one of the sliding sheets of the at least one core post; and
      a cooling agent filled in the sealed pipe.

5. The friction-damping energy absorber as claimed in claim 1, wherein the friction-damping energy absorber has
   a restricting module mounted around the at least one core post; and
   at least one cooling module mounted around the restricting module and having
      a sealed pipe mounted around the restricting module; and
      a cooling agent filled between the sealed pipe and the restricting module.

6. The friction-damping energy absorber as claimed in claim 1, wherein
   the at least one core post has at least one stiffness-adjusting column; and
   the at least one stiffness-adjusting column of the at least one core post is deformable and is stacked with the sliding sheets of the at least one core post.

7. The friction-damping energy absorber as claimed in claim 4, wherein
   the at least one core post has at least one stiffness-adjusting column; and
   the at least one stiffness-adjusting column of the at least one core post is deformable and is stacked with the sliding sheets of the at least one core post.

8. The friction-damping energy absorber as claimed in claim 1, wherein
   the at least one core post has at least one end cover closing one of the two ends of the at least one core post; and
   one of the supporting boards has a receiving hole formed through the corresponding supporting board to receive the at least one end cover of the at least one core post.

9. The friction-damping energy absorber as claimed in claim 1, wherein at least two sliding sheets of the at least one core post have different outer diameters.

10. The friction-damping energy absorber as claimed in claim 4, wherein at least two adjacent sliding sheets of the at least one core post have different outer diameters to form an annular gap between the at least two adjacent sliding sheets, the first material layers, and the second material layers.

11. The friction-damping energy absorber as claimed in claim 1, wherein the friction-damping energy absorber has at least one cooling module mounted in the at least one core post.

12. The friction-damping energy absorber as claimed in claim 11, wherein the at least one cooling module has
- a sealed pipe being a hollow tube and mounted through at least one of the sliding sheets of the at least one core post; and
- a cooling agent filled in the sealed pipe.

13. The friction-damping energy absorber as claimed in claim 1, wherein the friction-damping energy absorber has a restricting module mounted around at least one of the sliding sheets of the at least one core post.

14. The friction-damping energy absorber as claimed in claim 13, wherein the friction-damping energy absorber has at least one cooling module mounted in at least one of the sliding sheets of the at least one core post.

15. The friction-damping energy absorber as claimed in claim 14, wherein the at least one cooling module has
- a sealed pipe being a hollow tube and mounted through at least one of the sliding sheets of the at least one core post; and
- a cooling agent filled in the sealed pipe.

16. The friction-damping energy absorber as claimed in claim 13, wherein the friction-damping energy absorber has at least one cooling module mounted around the restricting module.

17. The friction-damping energy absorber as claimed in claim 16, wherein the at least one cooling module has
- a sealed pipe mounted around the restricting module; and
- a cooling agent filled between the sealed pipe and the restricting module.

18. The friction-damping energy absorber as claimed in claim 13, wherein
- the at least one core post has at least one stiffness-adjusting column; and
- the at least one stiffness-adjusting column of the at least one core post is deformable and is stacked with the sliding sheets of the at least one core post.

19. The friction-damping energy absorber as claimed in claim 14, wherein
- the at least one core post has at least one stiffness-adjusting column; and
- the at least one stiffness-adjusting column of the at least one core post is deformable and is stacked with the sliding sheets of the at least one core post.

20. The friction-damping energy absorber as claimed in claim 16, wherein
- the at least one core post has at least one stiffness-adjusting column; and
- the at least one stiffness-adjusting column of the at least one core post is deformable and is stacked with the sliding sheets of the at least one core post.

21. The friction-damping energy absorber as claimed in claim 1, wherein
- the at least one core post has at least one stiffness-adjusting column; and
- the at least one stiffness-adjusting column of the at least one core post is deformable and is stacked with the sliding sheets of the at least one core post.

22. The friction-damping energy absorber as claimed in claim 1, wherein at least one of the sliding sheets of the at least one core post has friction different from friction of the other sliding sheets of the at least one core post to enable the sliding sheets to slide in a condition of different friction and at different time points to form an automatic adjusting effect on damping and stiffness to the friction-damping energy absorber.

23. The friction-damping energy absorber as claimed in claim 2, wherein at least one of the sliding sheets of the at least one core post has friction different from friction of the other sliding sheets of the at least one core post to enable the sliding sheets to slide in a condition of different friction and at different time points to form an automatic adjusting effect on damping and stiffness to the friction-damping energy absorber.

24. The friction-damping energy absorber as claimed in claim 3, wherein at least one of the sliding sheets of the at least one core post has friction different from friction of the other sliding sheets of the at least one core post to enable the sliding sheets to slide in a condition of different friction and at different time points to form an automatic adjusting effect on damping and stiffness to the friction-damping energy absorber.

25. The friction-damping energy absorber as claimed in claim 1, wherein the stacked sliding sheets of the at least one core post form a vertical stiffness to share a vertical load of the friction-damping energy absorber.

26. The friction-damping energy absorber as claimed in claim 1, wherein the at least one core post has a height lower than a total height of the first material layers and the second material layers.

27. The friction-damping energy absorber as claimed in claim 2, wherein at least one of the second material layers extends in the sliding sheets of the at least one core post.

28. The friction-damping energy absorber as claimed in claim 3, wherein at least one of the second material layers extends in the sliding sheets of the at least one core post.

29. The friction-damping energy absorber as claimed in claim 1, wherein each one of the second material layers extends in the sliding sheets of the at least one core post.

30. The friction-damping energy absorber as claimed in claim 2, wherein each one of the second material layers extends in the sliding sheets of the at least one core post.

31. The friction-damping energy absorber as claimed in claim 3, wherein each one of the second material layers extends in the sliding sheets of the at least one core post.

32. The friction-damping energy absorber as claimed in claim 1, wherein at least one of the sliding sheets of the at least one core post is mounted between at least two adjacent second material layers.

33. The friction-damping energy absorber as claimed in claim 27, wherein at least one of the sliding sheets of the at least one core post is mounted between at least two adjacent second material layers.

34. The friction-damping energy absorber as claimed in claim 28, wherein at least one of the sliding sheets of the at least one core post is mounted between at least two adjacent second material layers.

35. The friction-damping energy absorber as claimed in claim 29, wherein at least one of the sliding sheets of the at least one core post is mounted between at least two adjacent second material layers.

36. The friction-damping energy absorber as claimed in claim 30, wherein at least one of the sliding sheets of the at least one core post is mounted between at least two adjacent second material layers.

37. The friction-damping energy absorber as claimed in claim 31, wherein at least one of the sliding sheets of the at least one core post is mounted between at least two adjacent second material layers.

38. The friction-damping energy absorber as claimed in claim 1, wherein the friction-damping energy absorber has at least one cooling module mounted in the at least one core post.

39. The friction-damping energy absorber as claimed in claim 27, wherein the friction-damping energy absorber has at least one cooling module mounted in the at least one core post.

40. The friction-damping energy absorber as claimed in claim 28, wherein the friction-damping energy absorber has at least one cooling module mounted in the at least one core post.

41. The friction-damping energy absorber as claimed in claim 29, wherein the friction-damping energy absorber has at least one cooling module mounted in the at least one core post.

42. The friction-damping energy absorber as claimed in claim 30, wherein the friction-damping energy absorber has at least one cooling module mounted in the at least one core post.

43. The friction-damping energy absorber as claimed in claim 31, wherein the friction-damping energy absorber has at least one cooling module mounted in the at least one core post.

44. The friction-damping energy absorber as claimed in claim 1, wherein at least one of the first material layers extends in the sliding sheets of the at least one core post.

45. The friction-damping energy absorber as claimed in claim 2, wherein at least one of the first material layers extends in the sliding sheets of the at least one core post.

46. The friction-damping energy absorber as claimed in claim 3, wherein at least one of the first material layers extends in the sliding sheets of the at least one core post.

47. The friction-damping energy absorber as claimed in claim 44, wherein at least one of the sliding sheets of the at least one core post is mounted between at least two adjacent second material layers.

48. The friction-damping energy absorber as claimed in claim 45, wherein at least one of the sliding sheets of the at least one core post is mounted between at least two adjacent second material layers.

49. The friction-damping energy absorber as claimed in claim 46, wherein at least one of the sliding sheets of the at least one core post is mounted between at least two adjacent second material layers.

50. The friction-damping energy absorber as claimed in claim 47, wherein the friction-damping energy absorber has at least one cooling module mounted in the at least one core post.

51. The friction-damping energy absorber as claimed in claim 48, wherein the friction-damping energy absorber has at least one cooling module mounted in the at least one core post.

52. The friction-damping energy absorber as claimed in claim 49, wherein the friction-damping energy absorber has at least one cooling module mounted in the at least one core post.

53. The friction-damping energy absorber as claimed in claim 3, wherein
at least one of the core posts has multiple sliding sheets;
the other core posts are formed by lead or high damping materials; and
the core posts are connected to each other in parallel.

54. The friction-damping energy absorber as claimed in claim 3, wherein
at least one of the core posts has multiple sliding sheets;
the other core posts are formed by lead or high damping materials; and
the core posts are connected to each other in series.

55. The friction-damping energy absorber as claimed in claim 21, wherein the friction-damping energy absorber has at least one cooling module mounted in the at least one core post.

56. The friction-damping energy absorber as claimed in claim 22, wherein the friction-damping energy absorber has at least one cooling module mounted in the at least one core post.

57. The friction-damping energy absorber as claimed in claim 23, wherein the friction-damping energy absorber has at least one cooling module mounted in the at least one core post.

58. The friction-damping energy absorber as claimed in claim 24, wherein the friction-damping energy absorber has at least one cooling module mounted in the at least one core post.

59. The friction-damping energy absorber as claimed in claim 32, wherein the friction-damping energy absorber has at least one cooling module mounted in the at least one core post.

60. The friction-damping energy absorber as claimed in claim 33, wherein the friction-damping energy absorber has at least one cooling module mounted in the at least one core post.

61. The friction-damping energy absorber as claimed in claim 34, wherein the friction-damping energy absorber has at least one cooling module mounted in the at least one core post.

62. The friction-damping energy absorber as claimed in claim 35, wherein the friction-damping energy absorber has at least one cooling module mounted in the at least one core post.

63. The friction-damping energy absorber as claimed in claim 36, wherein the friction-damping energy absorber has at least one cooling module mounted in the at least one core post.

64. The friction-damping energy absorber as claimed in claim 37, wherein the friction-damping energy absorber has at least one cooling module mounted in the at least one core post.

65. The friction-damping energy absorber as claimed in claim 53, wherein the friction-damping energy absorber has at least one cooling module mounted in the at least one core post.

66. The friction-damping energy absorber as claimed in claim 54, wherein the friction-damping energy absorber has at least one cooling module mounted in the at least one core post.

67. The friction-damping energy absorber as claimed in claim 1, wherein the friction-damping energy absorber has a restricting module mounted around at least one of the sliding sheets of the at least one core post.

68. The friction-damping energy absorber as claimed in claim 27, wherein the friction-damping energy absorber has a restricting module mounted around at least one of the sliding sheets of the at least one core post.

69. The friction-damping energy absorber as claimed in claim 28, wherein the friction-damping energy absorber has a restricting module mounted around at least one of the sliding sheets of the at least one core post.

70. The friction-damping energy absorber as claimed in claim 29, wherein the friction-damping energy absorber has a restricting module mounted around at least one of the sliding sheets of the at least one core post.

71. The friction-damping energy absorber as claimed in claim 30, wherein the friction-damping energy absorber has 72. The friction-damping energy absorber as claimed in claim 31, wherein the friction-damping energy absorber has a restricting module mounted around at least one of the sliding sheets of the at least one core post.

73. The friction-damping energy absorber as claimed in claim 32, wherein the friction-damping energy absorber has a restricting module mounted around at least one of the sliding sheets of the at least one core post.

74. The friction-damping energy absorber as claimed in claim 33, wherein the friction-damping energy absorber has a restricting module mounted around at least one of the sliding sheets of the at least one core post.

75. The friction-damping energy absorber as claimed in claim 34, wherein the friction-damping energy absorber has a restricting module mounted around at least one of the sliding sheets of the at least one core post.

76. The friction-damping energy absorber as claimed in claim 35, wherein the friction-damping energy absorber has a restricting module mounted around at least one of the sliding sheets of the at least one core post.

77. The friction-damping energy absorber as claimed in claim 36, wherein the friction-damping energy absorber has a restricting module mounted around at least one of the sliding sheets of the at least one core post.

78. The friction-damping energy absorber as claimed in claim 37, wherein the friction-damping energy absorber has a restricting module mounted around at least one of the sliding sheets of the at least one core post.

79. The friction-damping energy absorber as claimed in claim 38, wherein the friction-damping energy absorber has a restricting module mounted around at least one of the sliding sheets of the at least one core post.

80. The friction-damping energy absorber as claimed in claim 39, wherein the friction-damping energy absorber has a restricting module mounted around at least one of the sliding sheets of the at least one core post.

81. The friction-damping energy absorber as claimed in claim 40, wherein the friction-damping energy absorber has a restricting module mounted around at least one of the sliding sheets of the at least one core post.

82. The friction-damping energy absorber as claimed in claim 41, wherein the friction-damping energy absorber has a restricting module mounted around at least one of the sliding sheets of the at least one core post.

83. The friction-damping energy absorber as claimed in claim 42, wherein the friction-damping energy absorber has a restricting module mounted around at least one of the sliding sheets of the at least one core post.

84. The friction-damping energy absorber as claimed in claim 43, wherein the friction-damping energy absorber has a restricting module mounted around at least one of the sliding sheets of the at least one core post.

85. The friction-damping energy absorber as claimed in claim 44, wherein the friction-damping energy absorber has a restricting module mounted around at least one of the sliding sheets of the at least one core post.

86. The friction-damping energy absorber as claimed in claim 45, wherein the friction-damping energy absorber has a restricting module mounted around at least one of the sliding sheets of the at least one core post.

87. The friction-damping energy absorber as claimed in claim 46, wherein the friction-damping energy absorber has a restricting module mounted around at least one of the sliding sheets of the at least one core post.

88. The friction-damping energy absorber as claimed in claim 47, wherein the friction-damping energy absorber has a restricting module mounted around at least one of the sliding sheets of the at least one core post.

89. The friction-damping energy absorber as claimed in claim 48, wherein the friction-damping energy absorber has a restricting module mounted around at least one of the sliding sheets of the at least one core post.

90. The friction-damping energy absorber as claimed in claim 49, wherein the friction-damping energy absorber has a restricting module mounted around at least one of the sliding sheets of the at least one core post.

91. The friction-damping energy absorber as claimed in claim 50, wherein the friction-damping energy absorber has a restricting module mounted around at least one of the sliding sheets of the at least one core post.

92. The friction-damping energy absorber as claimed in claim 51, wherein the friction-damping energy absorber has a restricting module mounted around at least one of the sliding sheets of the at least one core post.

93. The friction-damping energy absorber as claimed in claim 52, wherein the friction-damping energy absorber has a restricting module mounted around at least one of the sliding sheets of the at least one core post.

94. The friction-damping energy absorber as claimed in claim 1, wherein the friction-damping energy absorber has at least one cooling module mounted around the at least one core post.

95. The friction-damping energy absorber as claimed in claim 21, wherein the friction-damping energy absorber has at least one cooling module mounted around the at least one core post.

96. The friction-damping energy absorber as claimed in claim 22, wherein the friction-damping energy absorber has at least one cooling module mounted around the at least one core post.

97. The friction-damping energy absorber as claimed in claim 23, wherein the friction-damping energy absorber has at least one cooling module mounted around the at least one core post.

98. The friction-damping energy absorber as claimed in claim 24, wherein the friction-damping energy absorber has at least one cooling module mounted around the at least one core post.

99. The friction-damping energy absorber as claimed in claim 32, wherein the friction-damping energy absorber has at least one cooling module mounted around the at least one core post.

100. The friction-damping energy absorber as claimed in claim 33, wherein the friction-damping energy absorber has at least one cooling module mounted around the at least one core post.

101. The friction-damping energy absorber as claimed in claim 34, wherein the friction-damping energy absorber has at least one cooling module mounted around the at least one core post.

102. The friction-damping energy absorber as claimed in claim 35, wherein the friction-damping energy absorber has at least one cooling module mounted around the at least one core post.

103. The friction-damping energy absorber as claimed in claim 36, wherein the friction-damping energy absorber has at least one cooling module mounted around the at least one core post.

104. The friction-damping energy absorber as claimed in claim 37, wherein the friction-damping energy absorber has at least one cooling module mounted around the at least one core post.

105. The friction-damping energy absorber as claimed in claim 53, wherein the friction-damping energy absorber has at least one cooling module mounted around the at least one core post.

106. The friction-damping energy absorber as claimed in claim 54, wherein the friction-damping energy absorber has at least one cooling module mounted around the at least one core post.

107. The friction-damping energy absorber as claimed in claim 1, wherein at least two sliding sheets of the at least one core post have different thicknesses.

* * * * *